(12) United States Patent
Truc et al.

(10) Patent No.: US 6,421,079 B1
(45) Date of Patent: Jul. 16, 2002

(54) FILM SCANNER

(75) Inventors: James A. Truc, Eden Prairie; Doug Peterson, Minneapolis; James Anderson, Lake Elmo; Gregg J. Ovsak, Minneapolis; Rob McLean, Minneapolis; James A. Hogenson, Minneapolis; Bradley Johnson, Minneapolis; Dennis Deutsch, Hastings; Peter Wolter, New Brighton, all of MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/149,612

(22) Filed: Sep. 8, 1998

Related U.S. Application Data

(63) Continuation-in-part of application No. 08/604,330, filed on Feb. 21, 1996, now Pat. No. 5,872,591.

(51) Int. Cl.[7] .......................... H04N 3/36; H04N 5/253
(52) U.S. Cl. .......................... 348/96; 348/207; 382/299
(58) Field of Search .................. 348/96, 207; 382/299; H04N 5/253

(56) References Cited

U.S. PATENT DOCUMENTS

| | | | |
|---|---|---|---|
| 1,972,555 A | 9/1934 | Fear | 226/78 |
| 2,295,000 A | 9/1942 | Morse | 348/96 |
| 3,767,852 A | 10/1973 | Horowitz et al. | 348/103 |
| 4,390,257 A | 6/1983 | Fernekes et al. | 353/95 |
| 4,482,924 A | 11/1984 | Brownstein | 358/302 |
| 4,639,787 A | 1/1987 | Isogai et al. | 348/96 |
| 4,656,525 A | 4/1987 | Norris | 358/532 |
| 4,667,228 A | 5/1987 | Kawamura et al. | 358/519 |
| 4,864,149 A | 9/1989 | Matsumoto | 250/559.02 |
| 5,010,410 A | 4/1991 | Bernstein | 348/97 |
| 5,088,813 A | 2/1992 | Wakefield | 352/183 |
| 5,091,963 A | 2/1992 | Litt et al. | 382/199 |
| 5,101,286 A | 3/1992 | Patton | 358/487 |
| 5,157,482 A | 10/1992 | Cosgrove | 348/97 |
| 5,249,056 A | 9/1993 | Foung et al. | 200/1 B |
| 5,282,036 A | 1/1994 | Worley, Jr. et al. | 348/674 |
| 5,293,432 A * | 3/1994 | Gonser et al. | 382/299 |
| 5,309,242 A | 5/1994 | Asami et al. | 348/97 |
| 5,412,773 A | 5/1995 | Carlucci et al. | 348/97 |
| 5,440,403 A | 8/1995 | Hasimoto et al. | 358/444 |
| 5,469,209 A | 11/1995 | Gunday et al. | 348/96 |
| 5,541,644 A | 7/1996 | Nanba | 348/96 |
| 5,565,912 A | 10/1996 | Easterly et al. | 348/96 |

FOREIGN PATENT DOCUMENTS

| | | |
|---|---|---|
| DE | 36 14 611 | 11/1987 |
| EP | 0 588 293 | 3/1994 |
| EP | 0 635 966 | 1/1995 |
| EP | 0 690 608 | 1/1996 |
| WO | 95/28052 | 10/1995 |

\* cited by examiner

*Primary Examiner*—Howard Britton
(74) *Attorney, Agent, or Firm*—Kinney & Lange

(57) ABSTRACT

A photographic film scanner for scanning a film strip containing a plurality of photographic images is disclosed. The film strip is advanced through the scanner and a digital image of the film strip is created. Individual images contained in the digital image of the film strip are located and displayed. The film strip is scanned at any of a variety of resolutions.

41 Claims, 35 Drawing Sheets

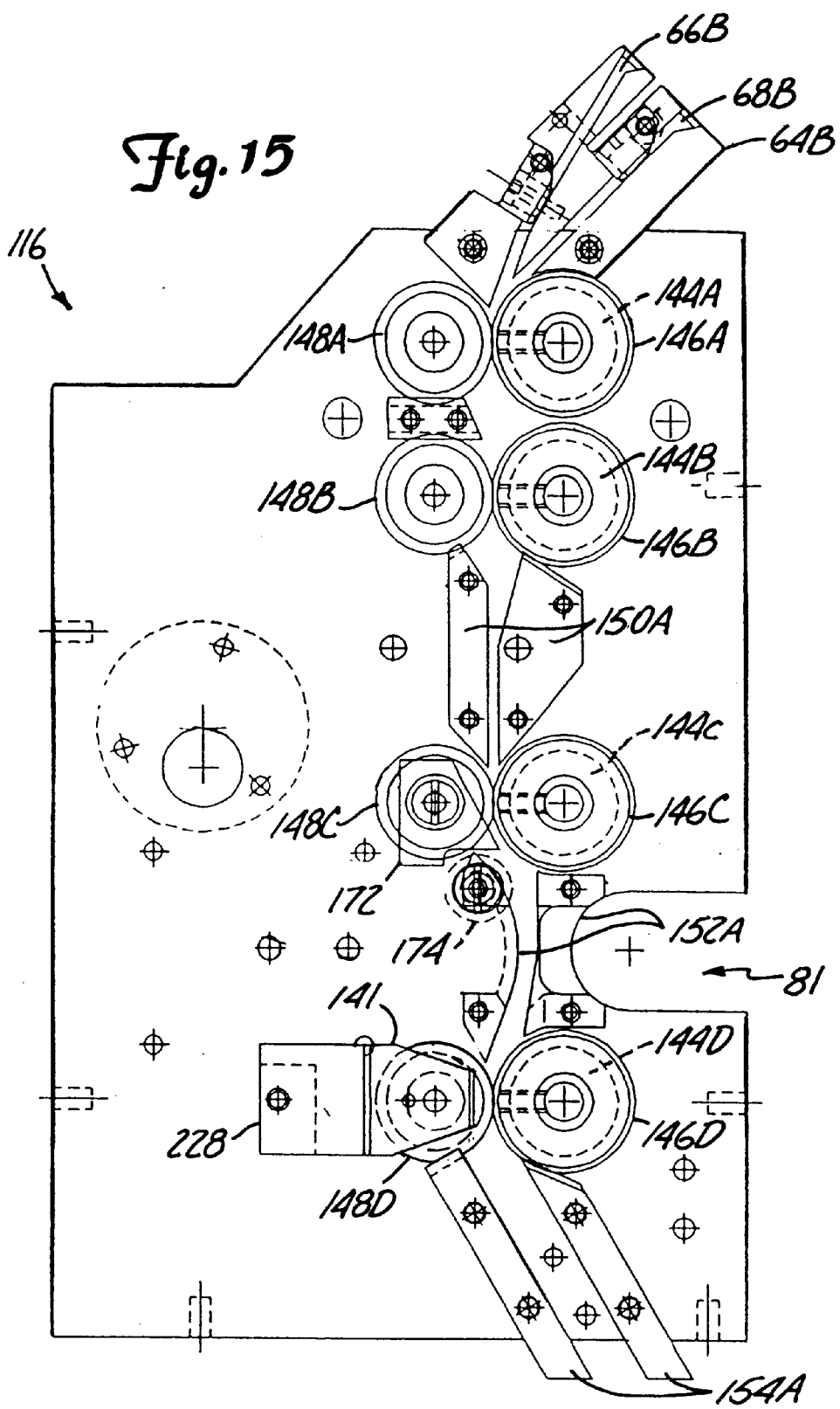

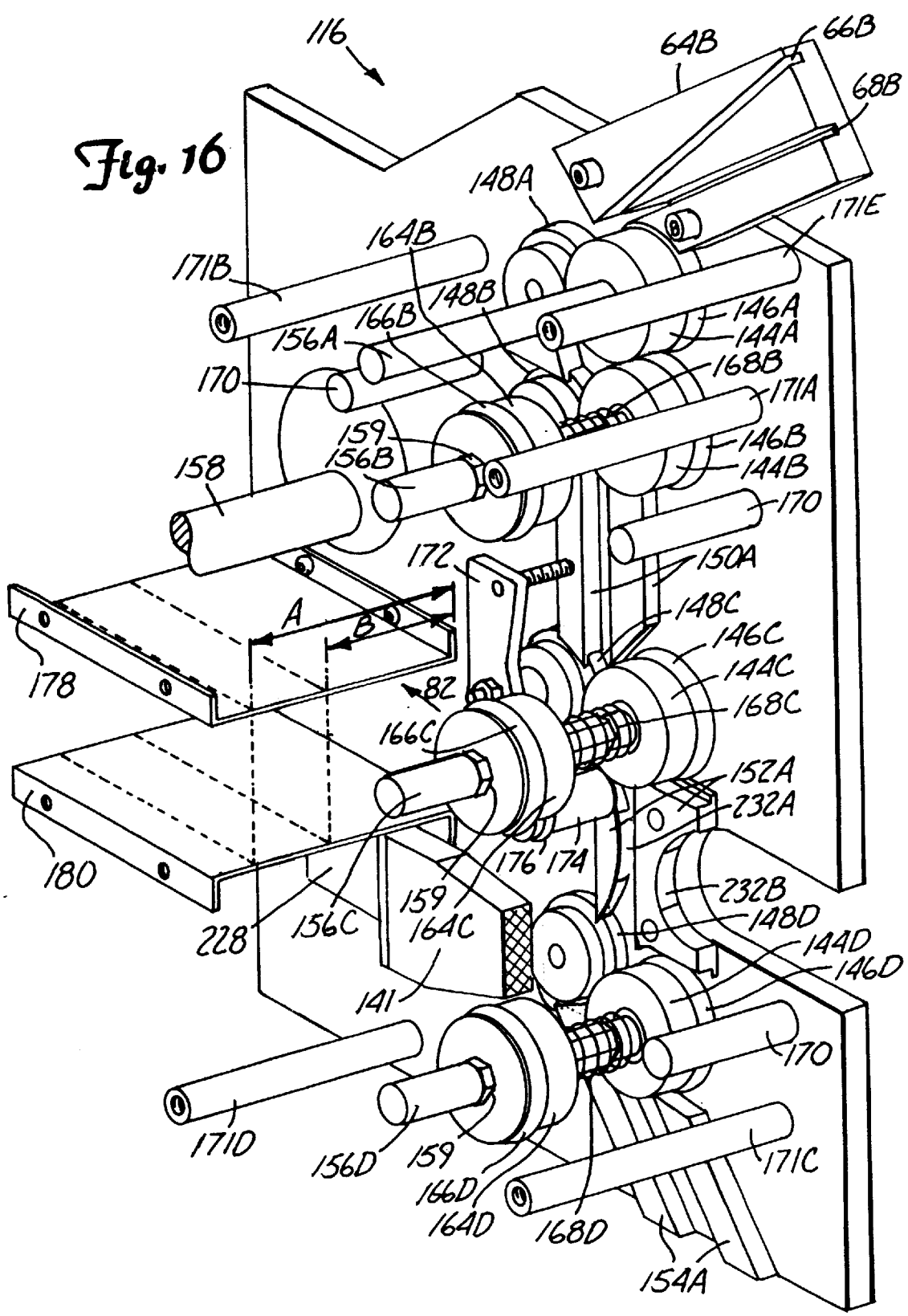

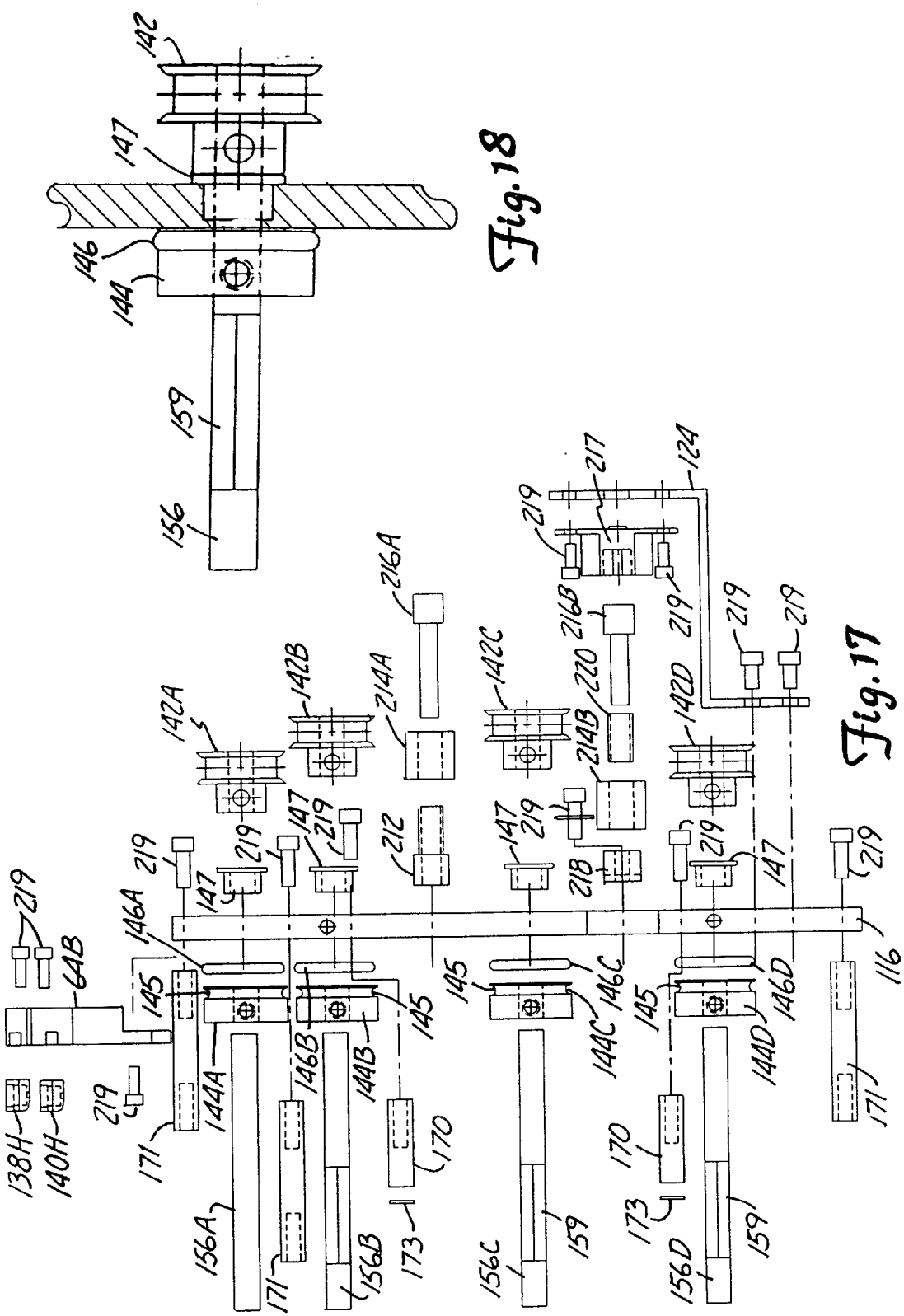

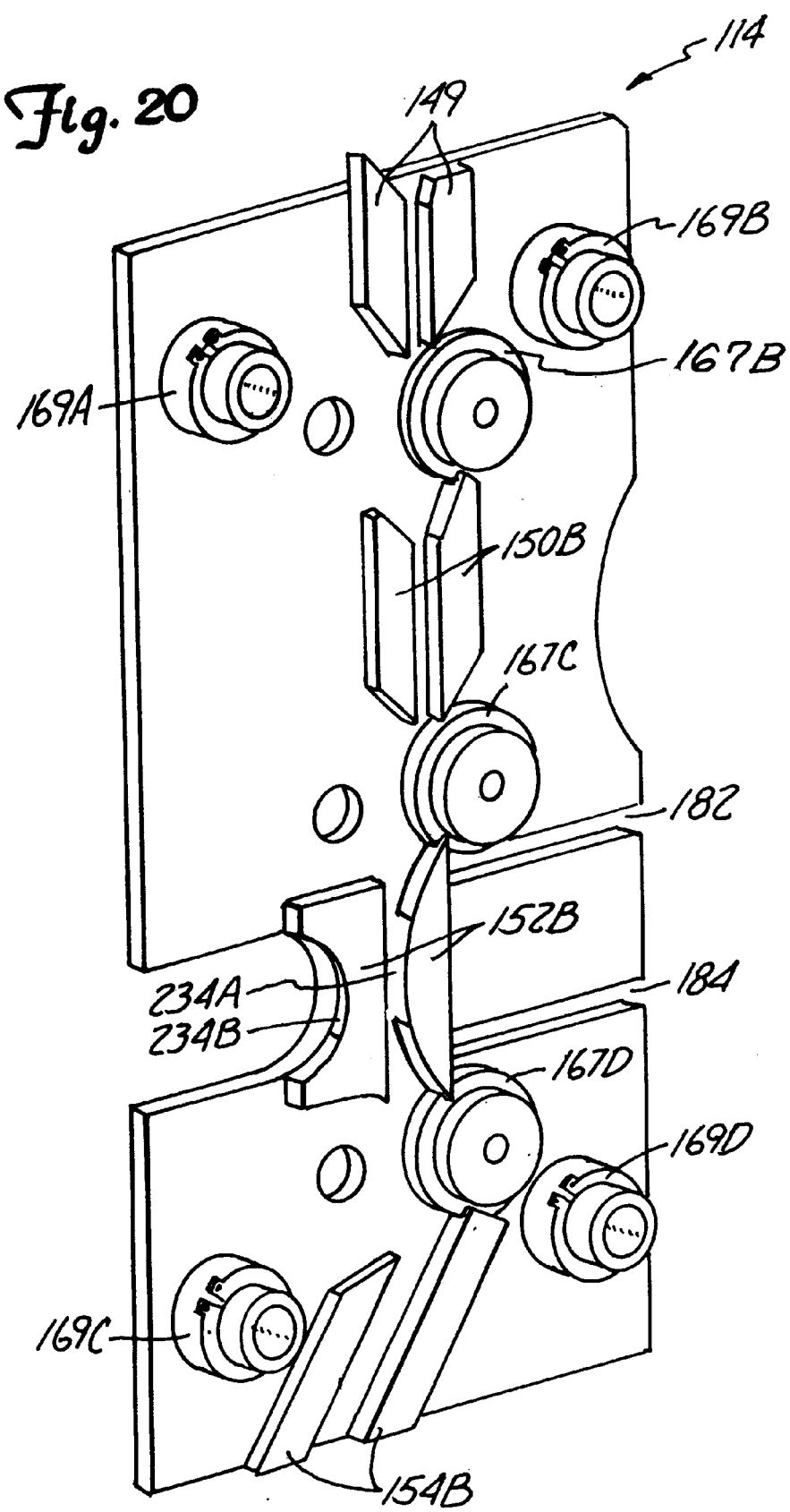

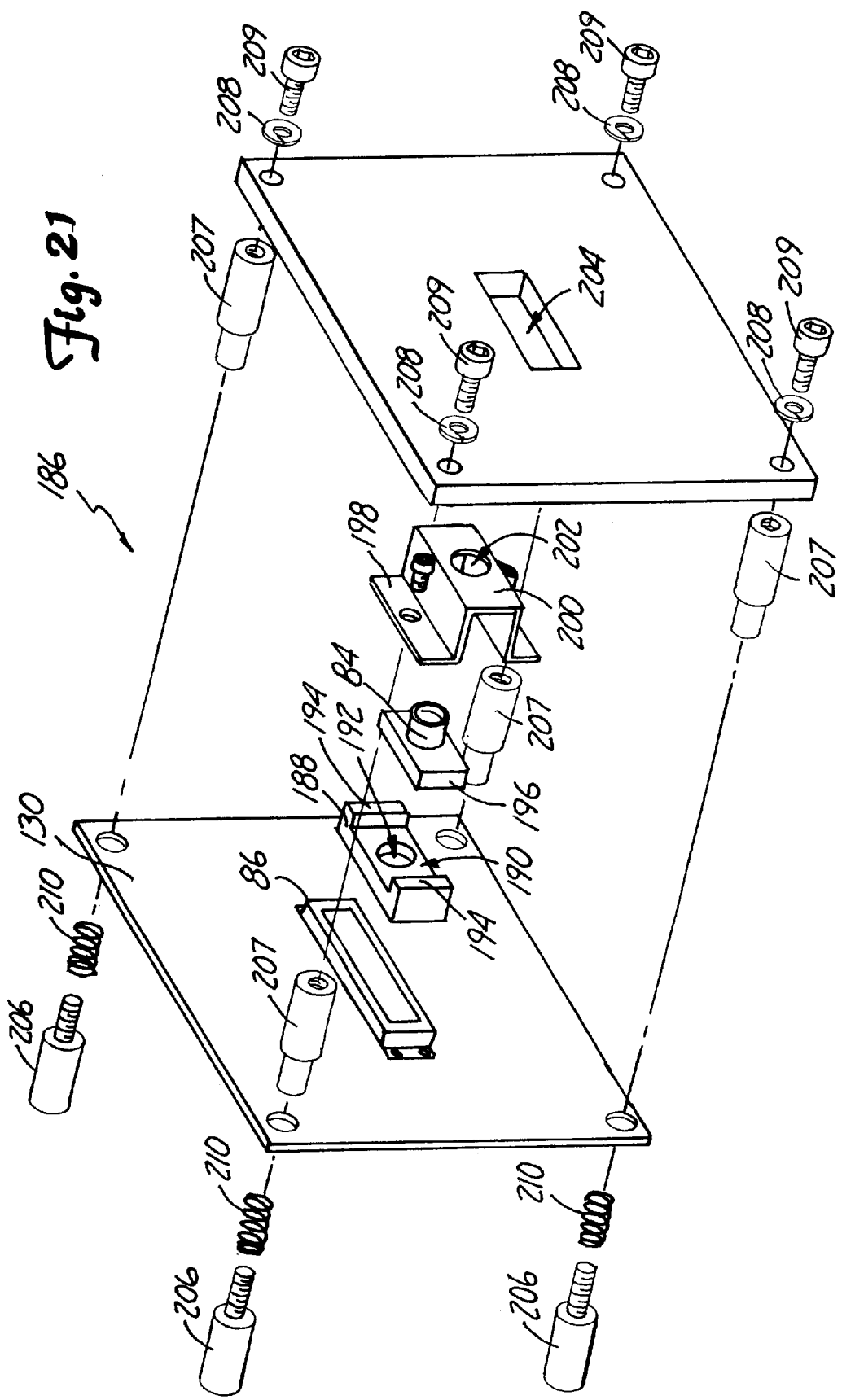

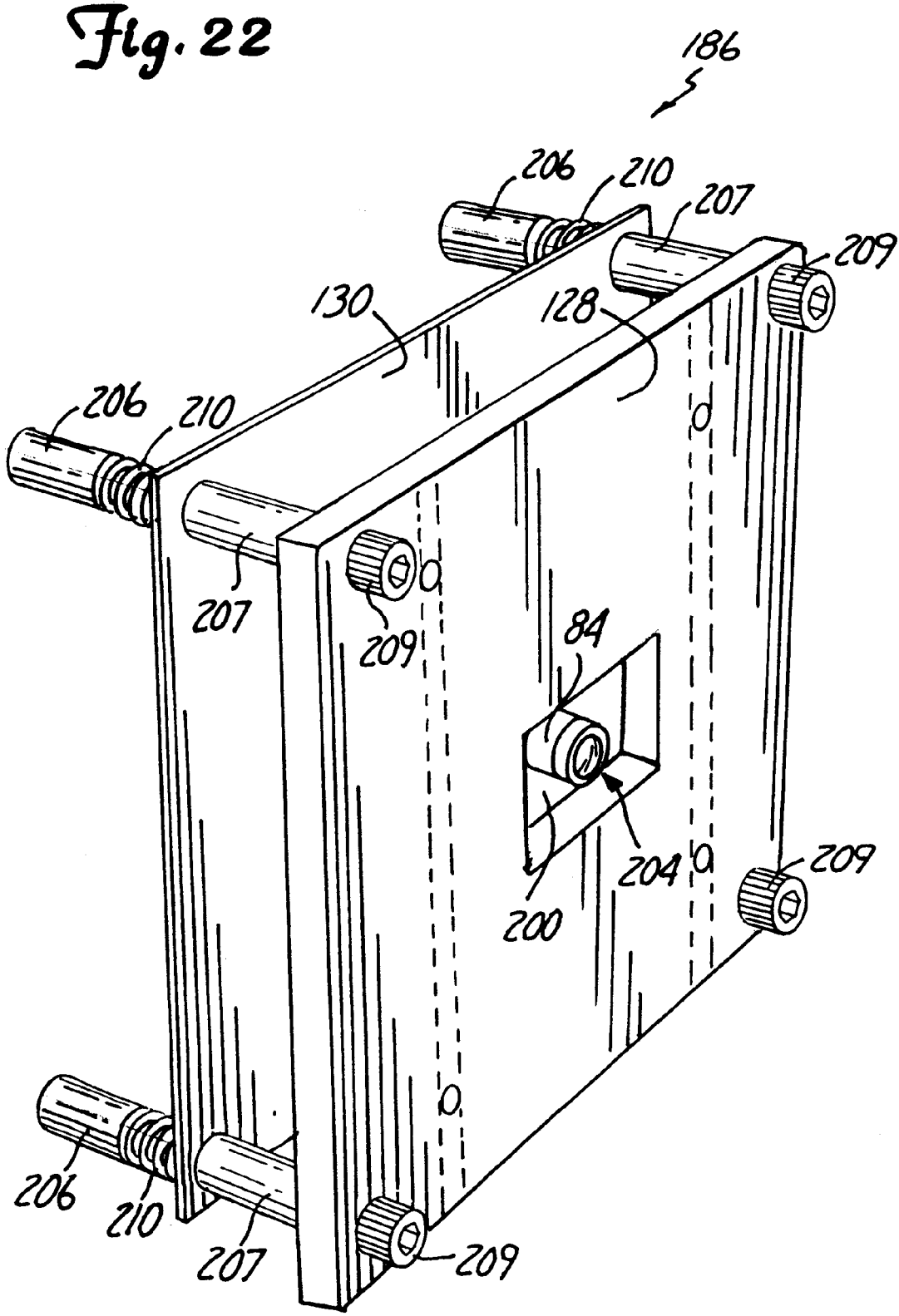

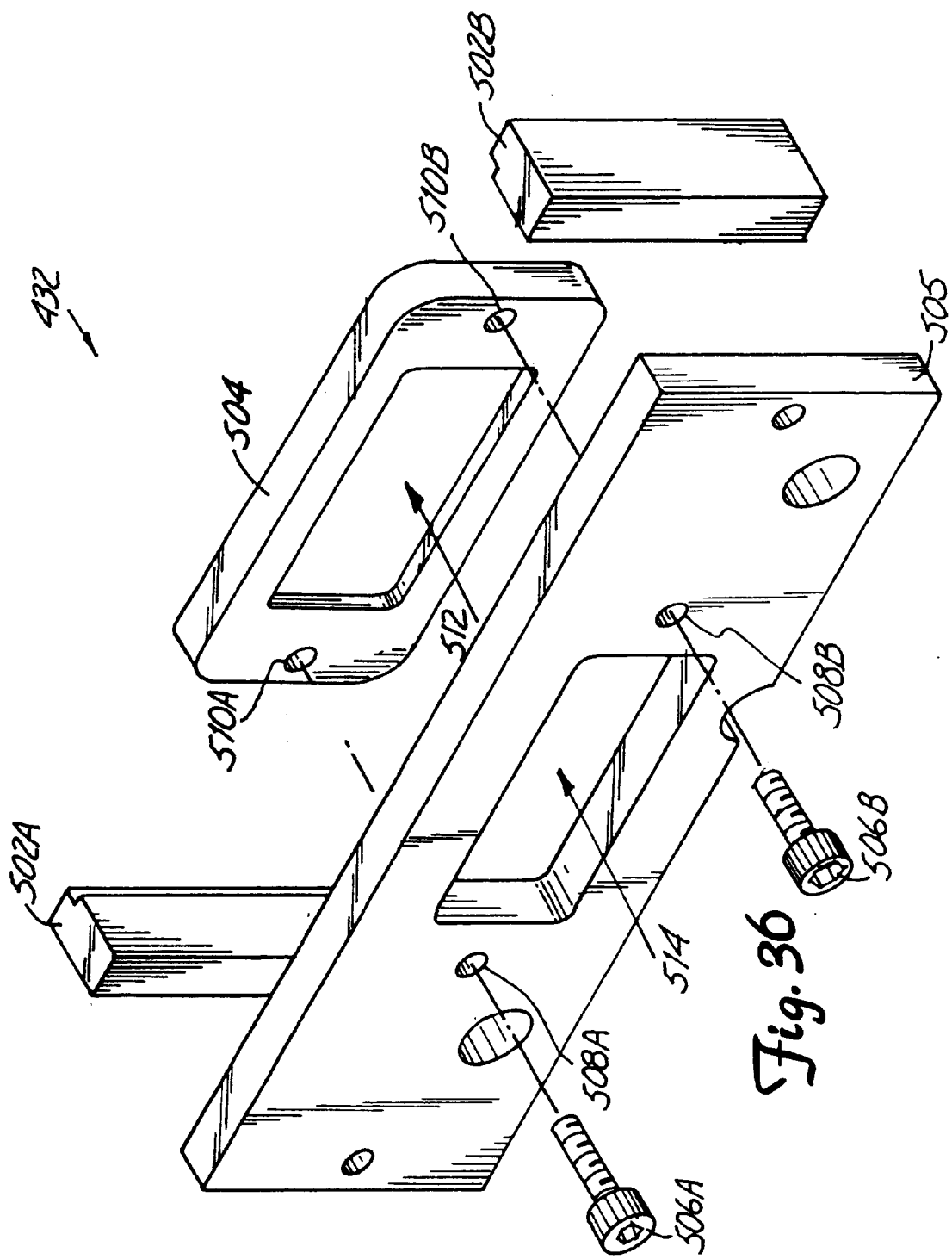

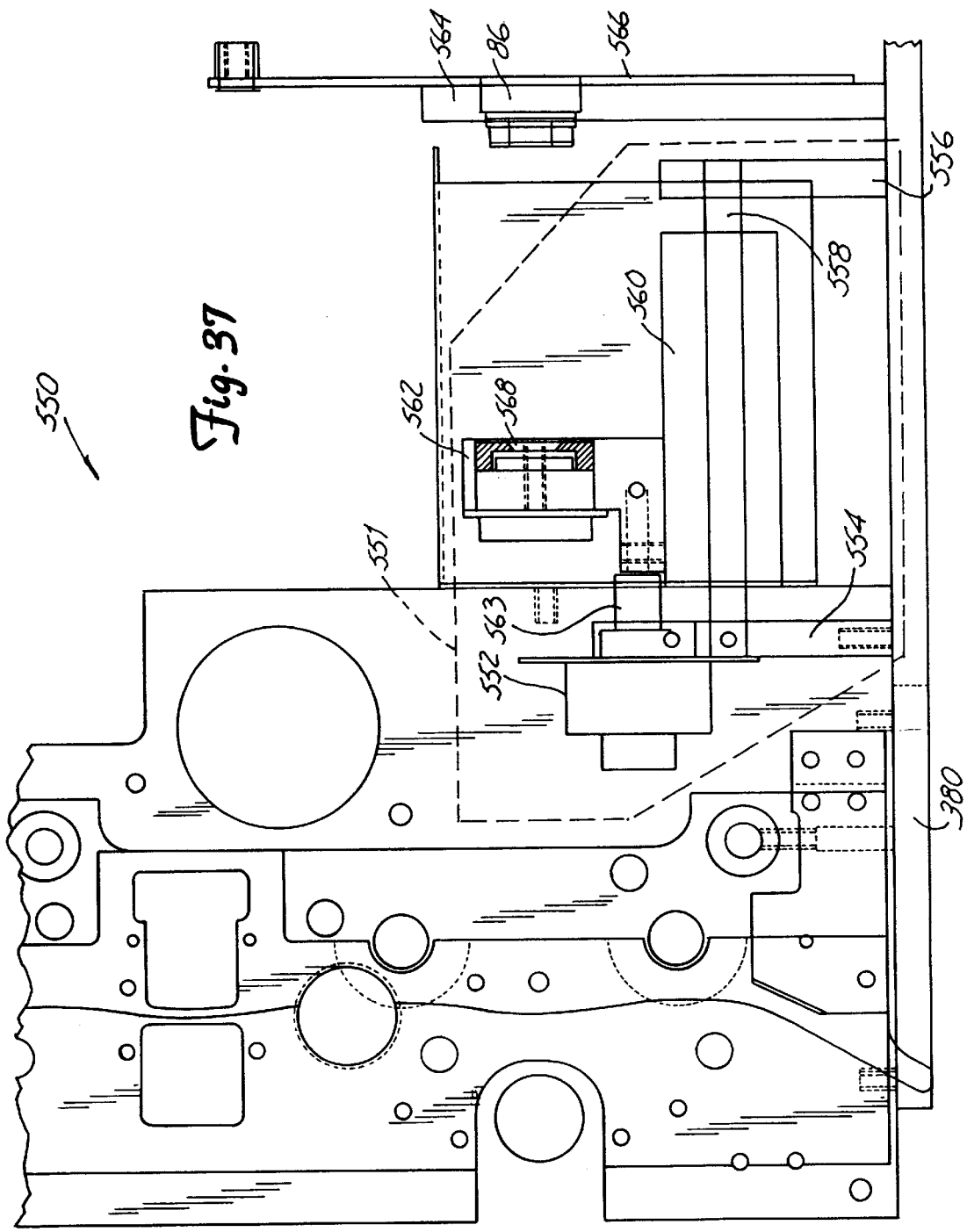

FILM SCANNER

This application is a continuation-in-part of commonly assigned and U.S. patent application Ser. No. 08/604,330, filed Feb. 21, 1996 now U.S. Pat. No. 5,872,591 entitled "FILM SCANNER".

BACKGROUND OF THE INVENTION

The present invention relates to an image scanning system, and particularly to a system that scans a strip of photographic film containing multiple images, and creates digital representations of those images.

Currently, scanning of photographic images is accomplished with flatbed scanners and drum scanners. With these scanners, only one image can be scanned at a time. If a new image is to be scanned, the old image must be physically removed from the scanner and replaced by the new image. One disadvantage to using such scanners is that it is a slow process to scan multiple images.

Other available scanners scan a roll of film by advancing the film until the first image is aligned with a scanning station, stopping and scanning the first image, advancing the film until the next image is aligned with the scanning station, stopping and scanning that image, and then continuing this process through the roll of film. Again, this is a slow process as the film must be stopped each time an image is scanned.

In addition to speed limitations, another disadvantage of prior art scanners is that they are typically limited to scanning only one type of film. With the variety of films that are available today, it would be useful to have a single scanner that can scan many types of film.

A further disadvantage of prior art scanners is the inability to efficiently locate previously scanned images and rescan them at a higher resolution. Typically, as the resolution increases, so does the time it takes to scan an image. Thus, it would be very advantageous to be able to quickly scan multiple images at a low resolution, and then after examining the digital representations of the images, locating and rescanning selected images at a higher resolution.

SUMMARY OF THE INVENTION

The image scanning system of the present invention scans a photographic film containing a plurality of photographic images and creates a corresponding plurality of digital representations of the photographic images. The system includes a touch screen monitor, a computer, a scanner and a printer.

In one embodiment, the scanner has a light tunnel, and a light source for projecting light down the light tunnel. The scanner has a film drive for engaging a strip of film and advancing it between the light source and the light tunnel. When the film comes between the light source and the light tunnel, light is projected through the film, thereby creating an image of the film which is projected down the light tunnel. A lens directs the projected image of the film onto a light sensor. The light sensor receives the image of the film and outputs pixel data to a buffer. The pixel data is then transferred from the buffer to a computer memory, virtual memory or hard drive. A computer creates a digital image of the film from the stored pixel data After a digital image of the film is created, the computer finds individual images in the digital image of the film, converts these images into positive images, and color corrects the images. The positive, color-corrected images are then displayed on the monitor and may also be printed out.

In a preferred embodiment, the scanner is oriented vertically so that film is inserted through an inlet at the top of the scanner, and the film exits through an outlet at the bottom of the scanner. Also in a preferred embodiment, the scanner has multiple inlet tracks to accommodate different type of films. Further preferred embodiments include means for adjusting the scanning resolution and an autofocus feature.

BRIEF DESCRIPTION OF THE DRAWINGS

FIG. 15 shows the right side plate of the scanner viewed along section 15—15 of FIG. 12.

FIG. 16 shows a perspective view of the right side plate of the scanner.

FIG. 17 is an exploded assembly drawing of the right side plate.

FIG. 18 shows an assembled pulley, shaft, and roller, used in the scanner.

FIG. 20 shows a perspective view of the slide plate of the scanner.

FIG. 21 is an exploded perspective view of the lens assembly of the scanner.

FIG. 22 is a perspective view of a completed lens assembly.

FIG. 36 is an exploded perspective view of the light sensor assembly of the scanner with adjustable resolution.

FIG. 37 is a side view of a preferred embodiment of the film scanner with fixed resolution and an autofocus feature.

DETAILED DESCRIPTION OF THE PREFERRED EMBODIMENTS

The image scanning system of the present invention scans a film strip and creates pixel data that is representative of the film strip. The system performs various operations on the pixel data to obtain color-corrected, positive digital images which are displayed on a monitor. The scanning process will be discussed first to show how the scanner creates pixel data from a strip of film. Following the discussion of the scanning process is a discussion of the various operations performed on the pixel data which are needed to create color-corrected, positive digital images. The mechanical construction of the scanner is discussed third, followed by a description of the adjustable resolution features and the DX-code recognition features of the scanner. The detailed description then has a description of further embodiments that use a movable lens and a movable light sensor to obtain adjustable resolution. The detailed description concludes with a description of an embodiment that has fixed resolution and an autofocus feature.

I. THE SCANNING PROCESS

Figure 1:
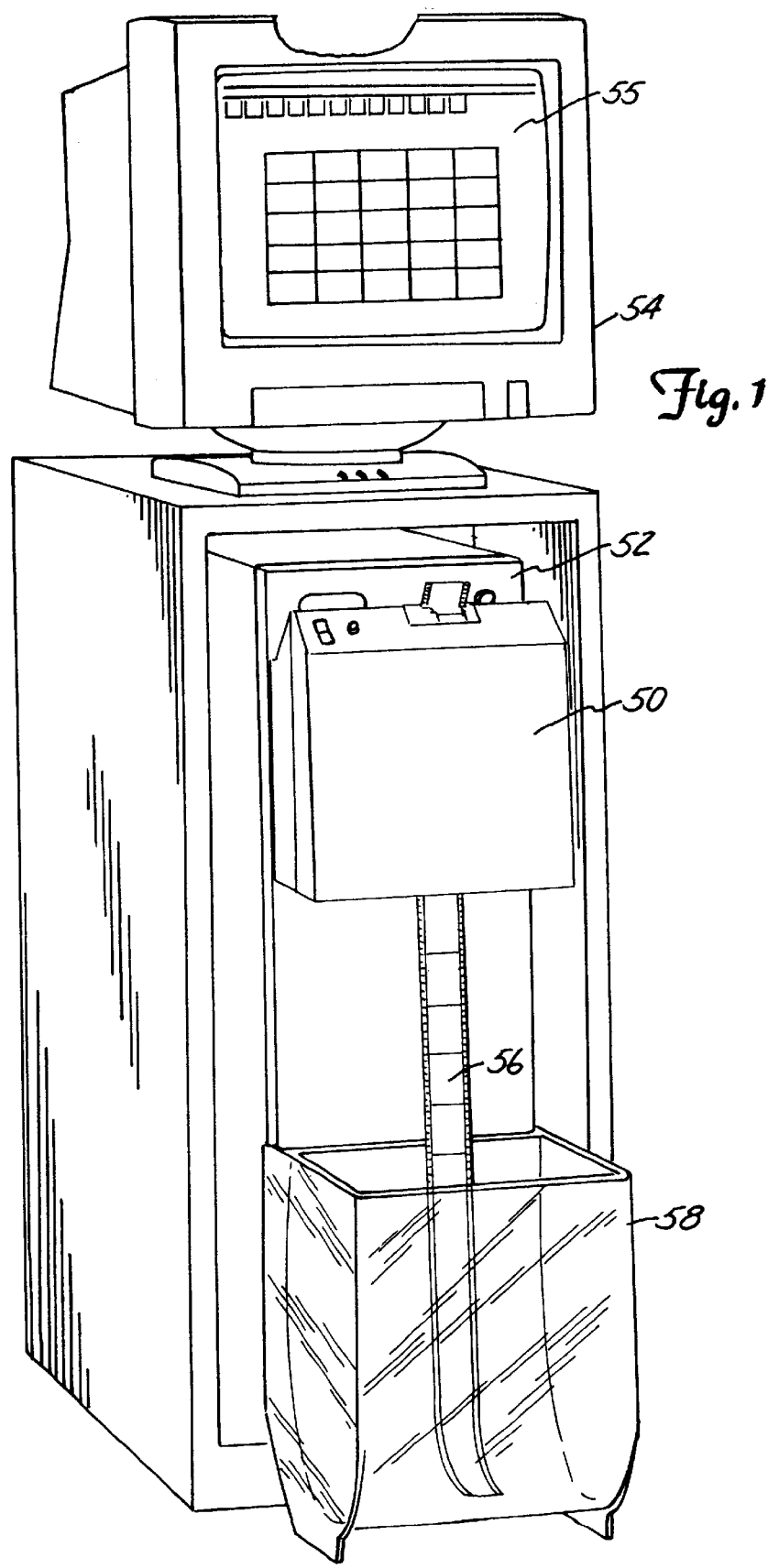
FIG. 1 shows a preferred embodiment of the image scanning system of the present invention.

FIG. 1 shows the image scanning system of the present invention. The system includes scanner 50, computer 52, and monitor 54. Monitor 54 is preferably an interactive touch screen monitor which allows commands to be input to computer 52 by touching screen 55. Alternatively, commands may be entered through keyboard 98 (shown in FIG. 4). Scanner 50 is mounted on a front face of computer 52. Film 56 is being scanned, and when scanning is complete, film 56 will fall into basket 58. Film 56 can be any type of film including 35 mm film, APS film, black and white film, or a positive film such as E6 slide film. Also, film 56 can be either a complete roll of film, or a smaller strip of film, such as one containing only three or four images.

Figure 2:
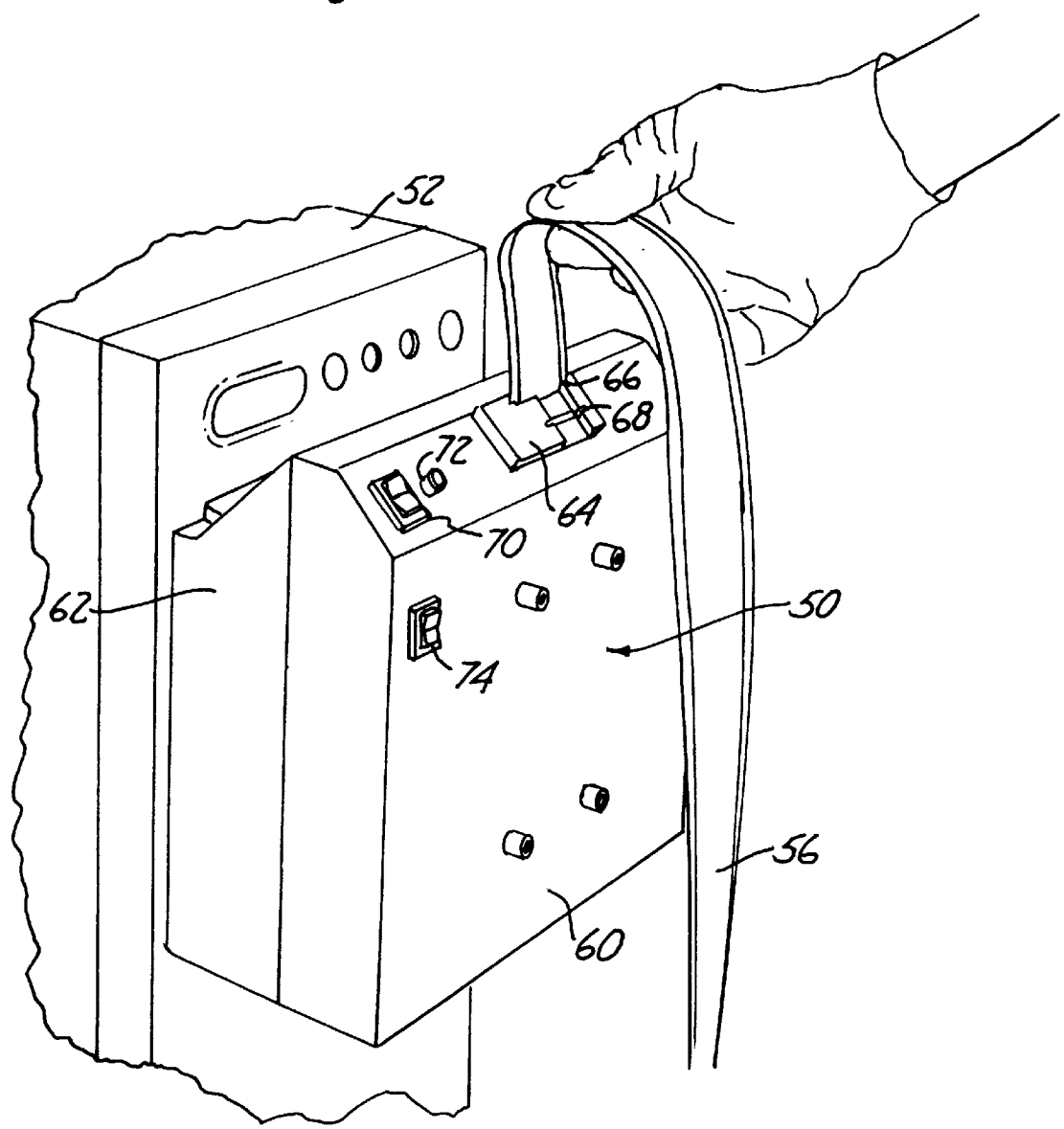
FIG. 2 is a perspective view of the scanner and computer used in a preferred embodiment.

FIG. 2 shows scanner 50 attached to computer 52. The scanner has front cover 60 and rear cover 62. Film loading platform 64 extends out from front cover 60 and has inlet tracks 66 and 68. Inlet track 66 of the scanner is for inserting 35 mm film, and inlet track 68 is for inserting APS film. On/stop switch 70 is used to turn the power of scanner 50 on and off. Film transport switch 74 controls the direction that film 56 is transported through scanner 50. Wait indicator light 72 indicates when scanner 50 is ready for film 56 to be inserted.

Figure 3:
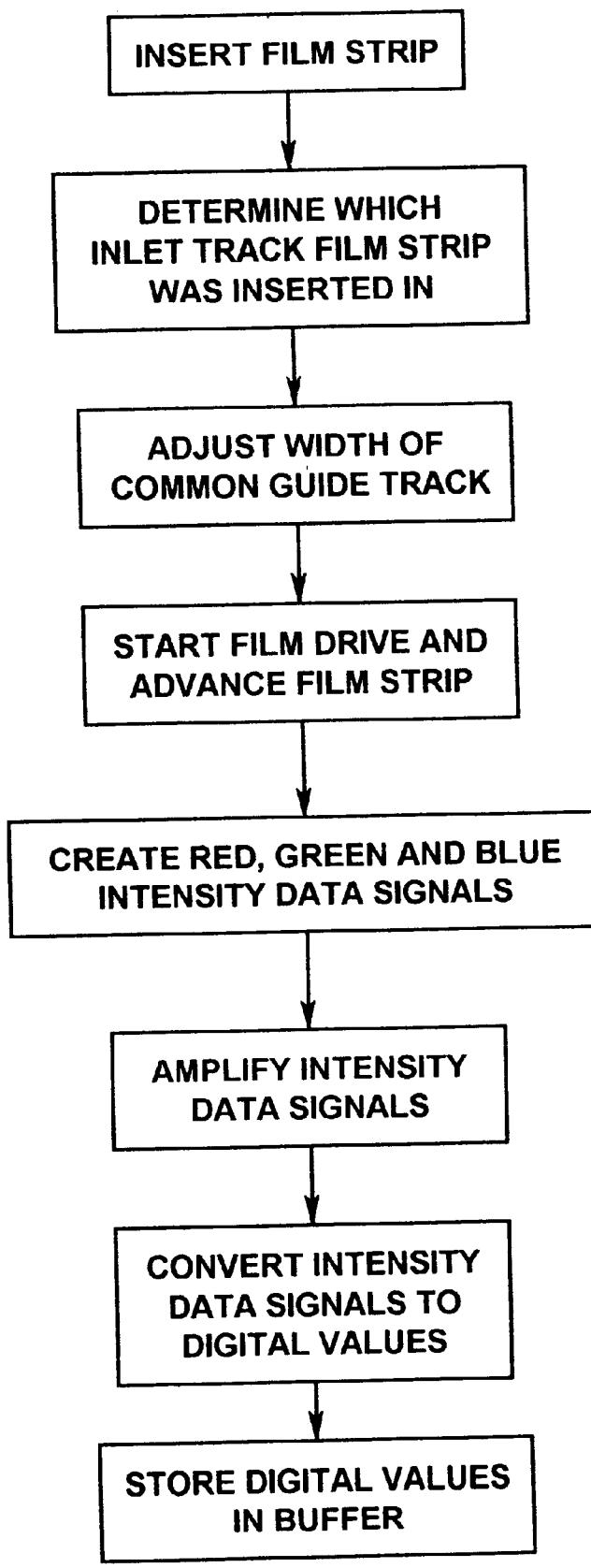
FIG. 3 is a flowchart of the functions performed by a preferred embodiment of the scanner.

FIG. 3 shows a flowchart of the film scanning process. The first step in the process is to enter a strip of film into the scanner. The film is entered either in inlet track 66 or in inlet track 68 (both shown in FIG. 2). Optical sensors 136, 138, and 140 (shown in FIG. 10) detect which track the film was inserted. Inlet track 66 and inlet track 68 merge together at common guide track 76 (shown in FIG. 10 and FIG. 19). The common guide track consists of guides 150A, 152A, and 154A (shown in FIG. 10) that guide the right edge of the film, and guides 149, 150B, 152B, and 154B (shown in FIG. 19), that guide the left edge of the film. The width of the common guide track is electromechanically adjustable to accommodate films having different widths. If the optical sensors detect that 35 mm film has entered inlet track 66, a signal is sent to solenoid 118 (shown in FIG. 10), which responds by adjusting the width of the common guide track so that it is the same as the width of the 35 mm film. If the optical sensors detect that APS film was entered in inlet track 68, a signal is sent to the solenoid which responds by adjusting the width of the common guide track so that it is the same width as the APS film. Thus, the first three steps shown in the flowchart of FIG. 3 have been completed. The remainder of the steps will be discussed with reference to FIG. 4.

Figure 4:
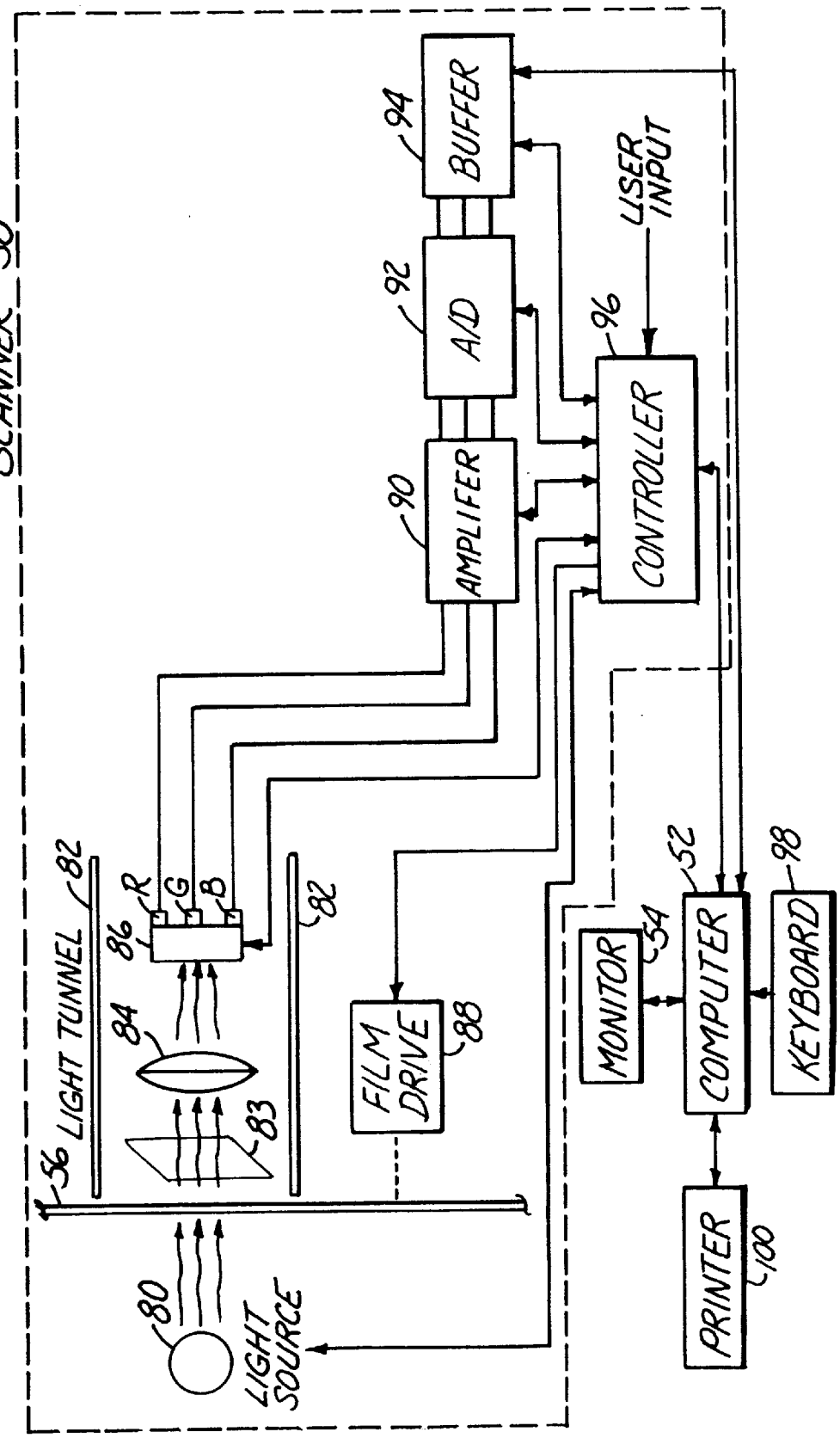
FIG. 4 is a block diagram of a preferred embodiment of the image scanning system.

FIG. 4 shows a block diagram of the scanning system. The scanning system includes scanner 50, computer 52, monitor 54, keyboard 98, and printer 100. Scanner 50 includes light source 80, light tunnel 82, lens 84, light sensor 86, film drive 88, amplifier 90, analog-to-digital (A/D) converter 92, buffer 94 and controller 96. After the width of the common guide track has been adjusted, film drive 88 engages film strip 56 and advances it through scanner 50. As film 56 is advanced through scanner 50, it passes between a light source 80 and a light tunnel 82 (both shown in FIG. 14 also). Light source 80 projects light through film 56 and down light tunnel 82. Film 56 is continuously advanced in front of the light tunnel at a substantially constant velocity by film drive 88. The light projected through film 56 creates film image 83. Lens 84 directs film image 83 onto light sensor 86. Light sensor 86 and lens 84 make up a part of lens assembly 186 shown in FIG. 21. Preferably, light sensor 86 is a Kodak KLI-2103 image sensor.

Light sensor 86 has three parallel linear photodiode arrays. Each linear photodiode array consists of 2,098 photosites. Depending on the lens used, film image 83 can be focused on all 2098 of the photosites of each array, or any subset of the photosites, such as the 300 photosites in the middle of each array. One array is covered with a red filter stripe, the second array is covered with a green filter stripe, and the third array is covered with a blue filter stripe. Each photosite covered by a red filter stripe will output a signal that varies according to the intensity of red light incident on that photo site. Similarly, each photosite covered by a green or blue filter stripe will output a signal that varies according to the intensity of green or blue light, respectively, incident on the photosite. Each photosite has a charge coupled device (CCD) that produces the signal for that photosite. The amplitude of the signal for each photosite builds up during a specified integration period, and at the end of that period, the signals are output to CCD registers. There is a separate CCD register for each array of photosites. Thus, each CCD register holds intensity data for a single color. Light sensor 86 has three outputs to output the intensity data stored in the CCD registers. In FIG. 4 the three outputs for light sensor 86 are marked R, G, and B, which signify red intensity data, green intensity data, and blue intensity data, respectively. As film 56 is advanced in front of the light tunnel, film image 83 changes and new red, green, and blue intensity data is output from the light sensor.

In operation, the scanner essentially divides film image 83 into a matrix of pixels. As the film advances, the first row of pixels of the film image passes the first array of photosites of the light sensor, and the red intensity data for each pixel in the first row is obtained. As the film advances further, the first row of pixels of the film image passes the second array of photosites of the light sensor, and the green intensity data for each pixel in the first row is obtained. As the film advances further, the first row of pixels of the film image passes the third array of photosites of the light sensor, and the blue intensity data for each pixel in the first row is obtained. This process applies to each row of pixels of the film image so that, when scanning is complete, red, green, and blue intensity data has been obtained for each pixel in the matrix.

The red, green, and blue intensity data coming from light sensor 86 is amplified by amplifier 90. Amplifier 90 is actually three separate amplifiers, one for each intensity data signal coming from the light sensor. Amplifier 90 is preferably located on circuit board 130 (shown in FIG. 10). After amplification, the red, green, and blue intensity data signals are converted to digital values by A/D converter 92. These digital values are then stored in buffer 94. A/D converter 92 and buffer 94 are preferably located on circuit board 132 (shown in FIG. 10).

Controller 96 controls the advancement of film 56 by sending control signals to film drive 88. Controller 96 also controls the operation of light sensor 86 and light source 80. Any input signals initiated by a user, such as using on/stop switch 70 or film transport switch 74 (both shown in FIG. 2), will be interpreted by controller 96 and appropriate control signals will be output. Controller 96 is preferably located on circuit board 134 (shown in FIG. 10).

II. IMAGE DATA MANIPULATION AND IMAGE DISPLAY

Figure 5:
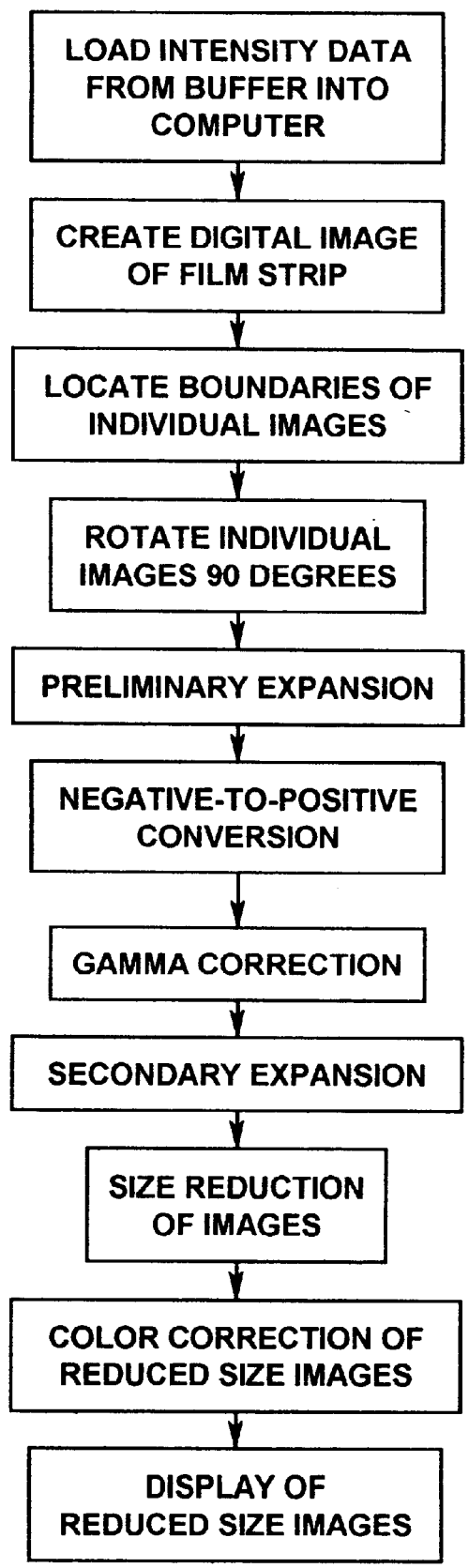
FIG. 5 is a flowchart of the operations performed by the computer on the image data.

After the intensity data for a film strip is stored in buffer 94 (shown in FIG. 4), computer 52 performs a series of operations on the intensity data. FIG. 5 shows a flowchart of the computer operations performed on the intensity data. After scanning is complete, the intensity data stored in buffer 94 is loaded into RAM of computer 52. Computer 52 organizes the intensity data and creates a digital image of the entire film strip. The digital image of the film strip is not displayed, but the data for the image is analyzed to locate individual images.

Individual images are extracted from the digital image of the film strip by first finding the boundaries between individual images. When individual images on the film are created, varying densities of silver are deposited on a substrate layer. In the area between images, there is only the substrate layer with no silver deposits. Thus, when light is projected through the film, the light going through the area between the images will have a high intensity because there are no silver deposits to block the light. These boundaries between individual images are determined, then, by calculating the average intensity of each row of pixels in the digital image of the film strip. A high average intensity will indicate that the row is a film boundary. In addition, since the boundaries occur at regularly spaced intervals, the location of each boundary is compared to the locations of earlier boundaries and later boundaries, to ensure that the boundary is in fact a boundary and not a portion of an image that was unexposed.

In addition to the boundaries between images (which are the left and right boundaries of the images), the top and bottom boundaries of the images must also be found. The location of the top and bottom boundaries indicates what type of image is present. For example, in a panoramic image, the top and bottom boundaries will be closer together than a normal image. The top and bottom boundaries are found using a process similar to that used in finding the boundaries between images. To find the top and bottom boundaries, the average intensity of each column of pixels in each digital image is calculated. A high average intensity indicates that the column is a boundary.

After the individual images are located, a separate data set is created for each image, and each image is then rotated 90 degrees. The rotation is necessary because when an image is scanned, it is scanned from one side of the image to the other, rather than from the top of the image to the bottom. Thus, the first row of pixels in the data set for each image will represent a left or right edge of the image rather than the top of the image. In order to display the image upright, the first row must be changed to the first column, the second row to the second column, etc., until the last row is changed to the last column.

After the individual images are located and rotated, the image data is analyzed to determine what color corrections are needed. The color correction analysis is a four step process. The first step in the color correction analysis is a preliminary expansion, the second is a negative-to-positive conversion, the third is a gamma correction, and the fourth is a secondary expansion. The order of the steps in the color correction analysis can be changed. Color correction data is created and stored during the color correction analysis, but color corrections are not actually made to the image data until the images are either displayed on the monitor or printed out.

The first step in the color correction analysis is a preliminary expansion. Each image is made up of a series of pixels with each pixel having three intensity values (red, green, and blue) associated with it. Each intensity value can range from "0" to "255", but will typically be found somewhere near the middle of this range. The intensity values for all pixels in all images are examined to find the lowest intensity value for each color, and the highest intensity value for each color. This color correction data is then stored. When it is time to make the color correction, the range of intensity values for each color is expanded by mapping the lowest intensity value to "0", the highest intensity value to "255", and linearly mapping all other values between "0" and "255". For example, if the lowest red intensity value were "100" and the highest red intensity value were "200", "100" would be change to "0", and "200" would be changed to "255". If there were a red intensity value of "150", it would be changed to "127". Similarly, all other values in the range "100" to "200" would be linearly mapped to the range "0" to "255".

After the preliminary expansion, the next step in the color correction analysis is a negative-to-positive conversion. This conversion involves creating three sets of positive intensity data from the three sets of negative intensity data. Each intensity value ranges from "0" to "255". To convert a negative intensity value to a positive intensity value, the value is simply shifted from one end of the range to the other. For example, if a red negative intensity value were "0", this would be shifted to the other end of the range which would be "255". Each intensity value is shifted, then, according to the equation, P=255−N, where P represents a positive intensity value and N represents a negative intensity value. If a positive film such as E6 slide film is being scanned, the negative-to-positive conversion is not performed.

Figure 6:
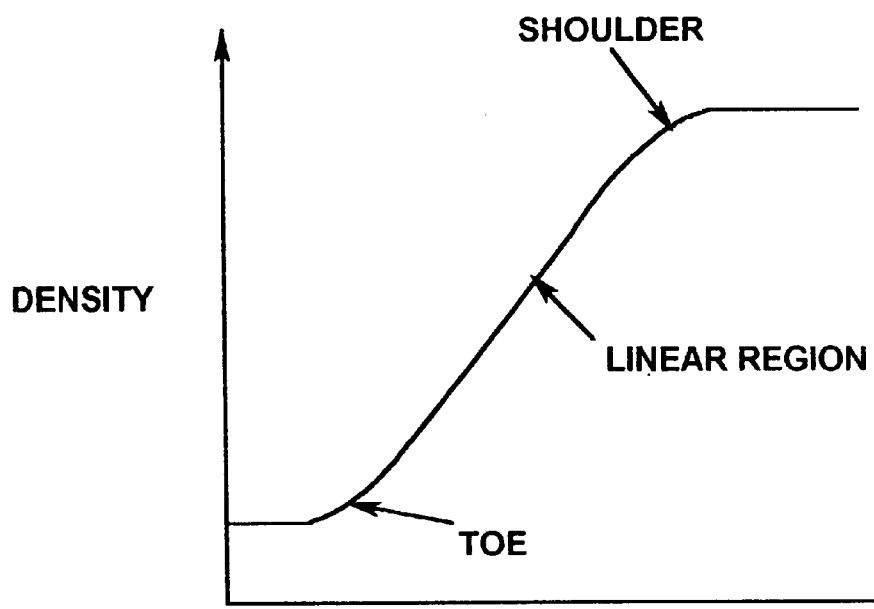
FIG. 6 is a graph of a typical D log E curve for a film.
Figure 7:
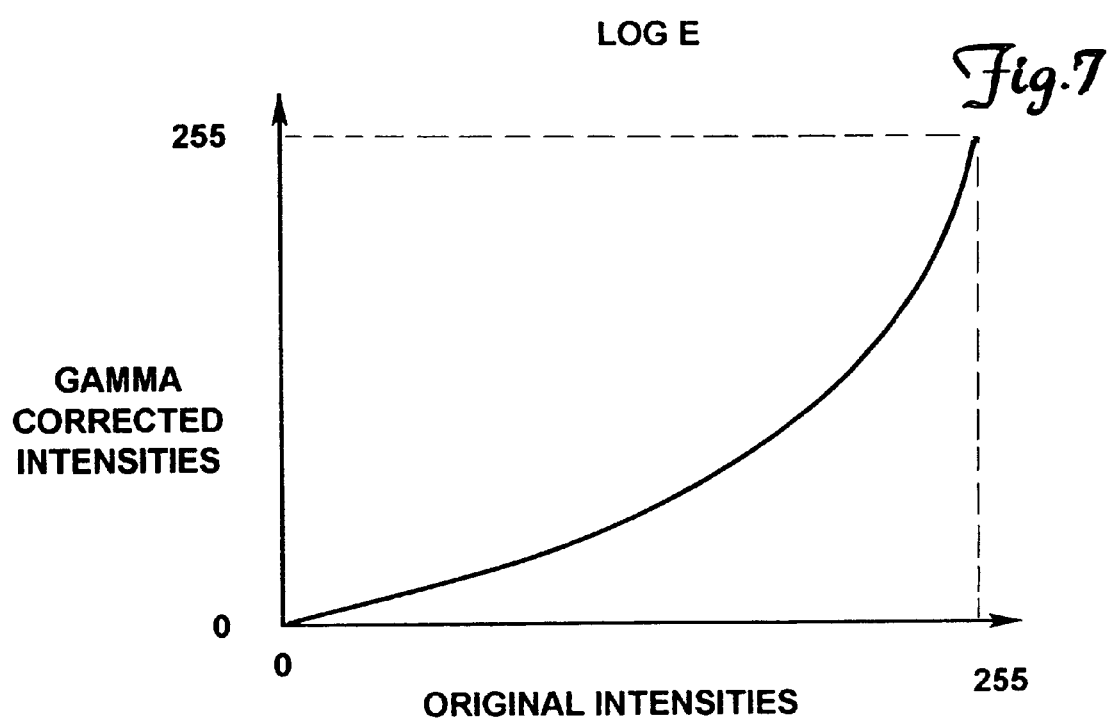
FIG. 7 is a graph of a gamma correction curve.

The third step in the color correction analysis is a gamma correction. The exposure (E) to which film is subjected is defined as the incident intensity (I) multiplied by the exposure time (T). A popular way to describe the photosensitive properties of photographic film is to plot the density (D) of silver deposited on a film versus the logarithm of E. Such a curve is called a characteristic curve or a "D log E" curve of a film. An example of a typical D log E curve for a photographic negative is shown in FIG. 6. As can be seen from FIG. 6, as E increases, so does the density of silver deposited. However, D peaks at the shoulder region and a further increase in E will not increase D. Similarly, at low values of E, D remains essentially constant until E reaches the toe region, at which point D begins to increase. The region of the curve between the toe and the shoulder is linear, and the slope of this portion of the curve is commonly referred to as "gamma" The greater the value of gamma, the higher the contrast of the film. Since there is a nonlinear relation between density and exposure, the intensity data must be adjusted to compensate for this nonlinearity. This adjustment is called a gamma correction. In the present invention, there are three gamma corrections calculated. One gamma correction is calculated for each set of intensity data (red, green, and blue). The gamma correction is simply a mapping of the intensity data according to the gamma correction curve shown in FIG. 7. The horizontal axis of the curve represents the range of original intensity values, and the vertical axis represents what the original values are mapped to (i.e., the gamma corrected intensity values). Since the value of gamma tends to vary from film to film, a different gamma correction curve may be used for each type of film. Alternatively, a gamma correction curve can be generated using a typical or average value of gamma, and the same curve can be used for all types of film.

The final step in the color correction analysis is a secondary expansion. The secondary expansion is essentially the same process as the preliminary expansion, except that the process is performed on each individual image separately rather than all images together. The secondary expansion involves finding, in each image, the lowest and the highest intensity values of each of the three colors. The lowest value for each color is mapped to "0", the highest value is mapped to "255", and all other values are linearly mapped between "0" and "255".

After the color correction data is obtained in the color correction analysis, each image is reduced in size, the color correction data is used to perform a color correction on the reduced images, and the reduced images are then displayed on the monitor along with their corresponding frame numbers.

If the film that is scanned is black and white film, an additional step must be performed prior to display of the images. The three sets of intensity data must be converted to a single set of intensity data, with the single set of intensity data representing varying levels of gray in the film image.

Once the reduced images are displayed on the monitor, various changes can be made to the images such as changes in contrast, color and intensity. If changes are made to the reduced images, these changes are stored so that the changes can later be applied to the full size images. When the desired changes have been made to the reduced images, they may be printed out to printer 100 (shown in FIG. 4). the full size images may also be displayed or printed out. Prior to displaying or printing out the full size images, the stored color corrections are applied to the image data.

Figure 8:
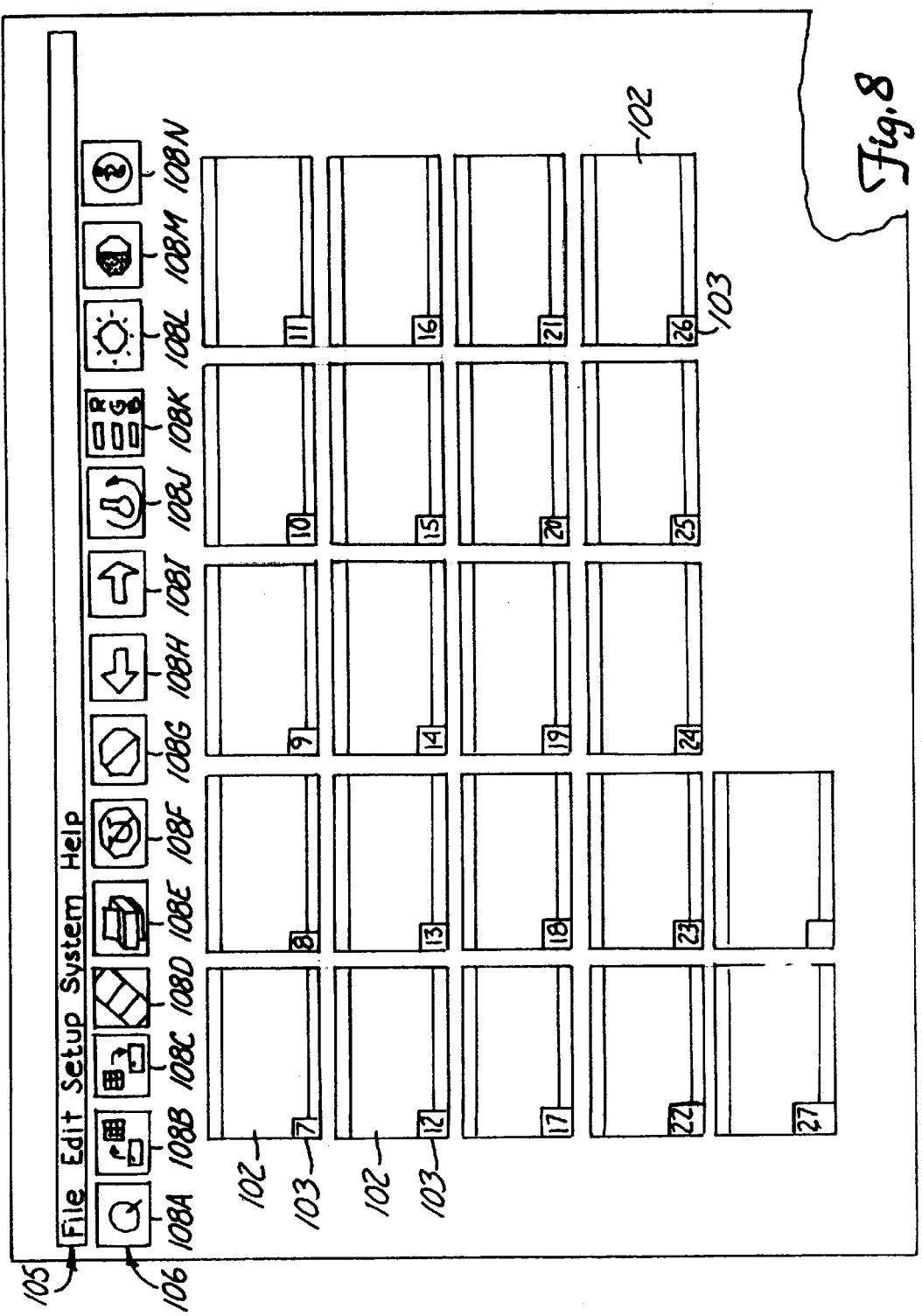
FIG. 8 shows digital images being displayed on the interactive touch screen monitor used in a preferred embodiment.

FIG. 8 shows screen 55 of monitor 54 displaying various digital images 102 which represent photographic images scanned from a strip of film. Frame numbers 103 are displayed along with images 102 to facilitate the location of the corresponding negatives on the film strip. Menu bar 105 and menu bar 106 are displayed on screen 55. Menu bar 105 includes five pull-down menus labeled "File", "Edit", "Setup", "System", and "Help". When a user touches one of the pull-down menus, a series of menu items (not shown) appears on screen 55. A menu item may be selected by touching that item. The menu items allow a user to perform a variety of modifications on images 102. For example, a user can modify the color, brightness, contrast, and orientation of the images. A user can also delete images, save images to a disk, and print images.

Some of the more frequently used menu items are represented by icons 108A through 108N (collectively referred to as icons 108) in menu bar 106. Thus, a user may select a menu item by touching the icon 108 that represents the menu item. Icon 108A represents a "Scanning Information" menu item that allows a user to specify the starting frame number of the images, and the orientation of the film when it is entered into the scanner. The Scanning Information menu item also includes an option to begin scanning. Icon 108B represents a "Retrieve" menu item that allows a user to retrieve and display previously stored images. Icon 108C represents a "Save" menu item that allows a user to save images 102 to a disk. Icon 108D represents a "Format" menu item that allows a user to specify the format of the film that is to be scanned. For example, a user may specify that the film is a full length film, or that the film is divided into multiple strips. Icon 108E represents a "Print" menu item that allows a user to print images 102 in a variety of formats such as on an envelope, on an index sheet, and on a sleeve that holds the negatives. Icon 108F represents an "Undelete" menu item that allows a user to redisplay an image that was previously deleted. Icon 108G represents a "Delete" menu item that allows a user to delete selected images. An image is selected for deletion by touching the image. Icon 108H represents a "Left Border" menu item that allows a user to change the position of the left border of selected images. Icon 108I represents a "Right Border" menu item that allows a user to change the position of the right border of selected images. Icon 108J represents a "Rotate Images" menu item that allows a user to rotate the images. Icon 108K represents a "Color" menu item that allows a user to change the red, green, and blue intensity level of selected images. Icon 108L represents a "Brightness" menu item that allows a user to modify the brightness of selected images. Icon 108M represents a "Contrast" menu item that allows a user to modify the contrast of selected images. Icon 108N represents an "About" menu item that displays information about the scanning system.

If a user touches icon 108D and then selects multiple strips, the film drive will continue to operate for a short period of time after a strip is scanned in order to facilitate the loading of multiple strips. As long as another film strip is loaded during this period of time, the film drive will continue to operate. If a film strip is not inserted within this time period, the film drive will stop. When photographic film is scanned in multiple strips, the images from each strip can be displayed together (as shown in FIG. 8) as if the images were scanned from a single roll of film. Also, the image data from each strip can be combined to calculate color corrections that require image data from the entire film. For example, when doing a preliminary expansion, the lowest and highest intensity values for the entire film image are determined. If multiple strips are scanned, the image data from each strip is combined to determine the lowest and the highest intensity values overall. Also, the same gamma correction would be applied to all images that came from the same film even though the images were entered in separate strips.

Figure 9:
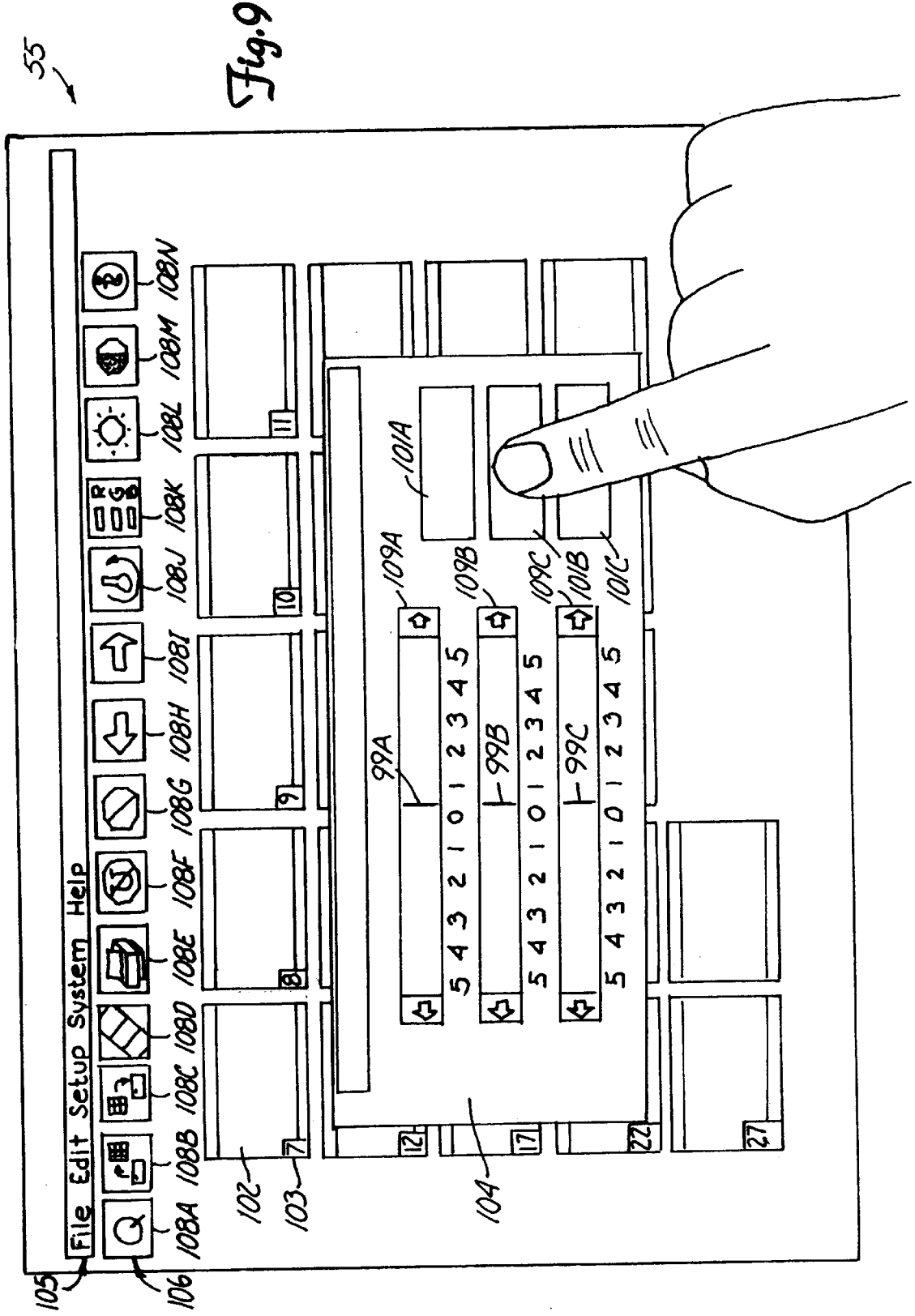
FIG. 9 shows a user interacting with the touch screen monitor.

FIG. 9 shows a user interacting with screen 55 of monitor 54. Whenever a user touches one of the icons 108, a window will typically appear which allows a user to input information. Window 104 is displayed as a result of the user pushing icon 108K, which represents a "Color" menu item. Similar windows appear when other icons are pressed. A user can input information in window 104 to change the red, green, and blue intensity of selected images. Window 104 has three slide bars 109A, 109B, 109C, three markers 99A, 99B, and 99C, and three buttons 101A, 109B, and 101C. The red intensity of selected images can be modified by moving marker 99A left or right along slide bar 109A. Similarly, the green or blue intensity of selected images can be modified by moving marker 99B or 99C, respectively. After the desired changes have been made, a user can view the changes by pushing preview button 101A. If the images do not appear as desired, further color changes can be made. When the user is done making color changes, the user can touch "OK" button 101B and window 104 will disappear. If the user touches icon 108K and window 104 appears, but the user then decides not to make any color changes, the user can touch "Cancel" button 101C and window 104 will disappear and no changes will be made to the images.

III. MECHANICAL CONSTRUCTION OF THE SCANNER

Figure 10:
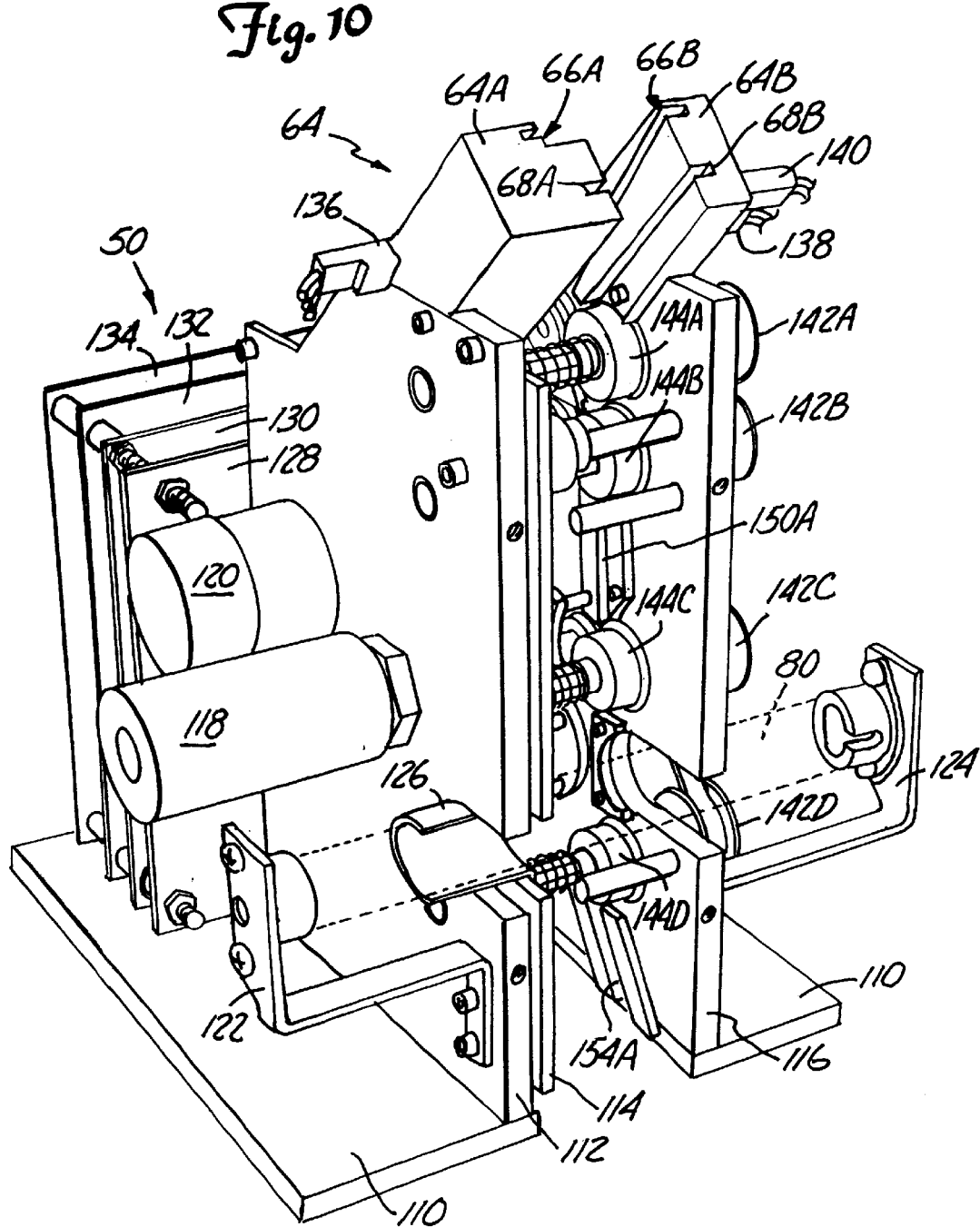
FIG. 10 is a perspective view of the left side of a preferred embodiment of the scanner with the front and rear covers removed.

FIG. 10 shows scanner 50 with front and rear covers 60 and 62 removed. Scanner 50 includes film loading platform 64, optical sensors 136, 138, and 140, base 110, left side plate 112, slide plate 114, right side plate 116, solenoid 118, motor 120, S-brackets 122 and 124, light source 80, light shield 126, right rollers 144A, 144B, 144C, and 144D (collectively referred to as right rollers 144), and right guides 150A, 152A, and 154A. Although scanner 50 is shown oriented vertically in FIG. 10, so that film is entered at the top of the scanner and film exits at the bottom of the scanner, scanner 50 may also be oriented horizontally so that film is entered at the front of the scanner and film exits at the back of the scanner.

Left side plate 112 and right side plate 116 are mounted to base 110. Slide plate 114 is slidably mounted between left side plate 112 and right side plate 116. S-bracket 122 is mounted to left side plate 112 and S-bracket 124 is mounted to right side plate 116. Light source 80 (shown with hidden lines) is mounted between S-bracket 122 and S-bracket 124. Light shield 126 is attached to slide plate 114 and helps prevent light from being projected in the space between left side plate 112 and slide plate 114.

Film loading platform 64 is mounted at the upper end of scanner 50. Film loading platform 64 is made up of left platform 64A and right platform 64B. Left platform 64A is mounted to left side plate 112 and right platform 64B is mounted to right side plate 116. Inlet tracks 66 and 68 are formed in film loading platform 64. Inlet track 66 consists of left guide 66A formed in left platform 64A, and right guide 66B formed in right platform 64B. Inlet track 68 consists of left guide 68A formed in left platform 64A, and right guide 68B formed in right platform 64B.

Optical sensors 136, 138, and 140, are attached to film loading platform 64. Optical sensor 136 indicates whether film is located in left guide 66A and optical sensor 138 indicates whether film is located in right guide 66B. Optical sensor 140 indicates whether film is located in right guide 68B. One optical sensor is needed on each side of inlet track 66 because the optical sensors only detect whether film is present at the very edge of the inlet track. Thus, if APS film (which is narrower than 35 mm film) were inserted in inlet track 66, one sensor may indicate that film is present, but the APS film is not wide enough to trigger the other sensor. In contrast, only one optical sensor is needed for the narrower inlet track 68, because 35 mm film is too wide to fit into inlet track 68.

Figure 13:
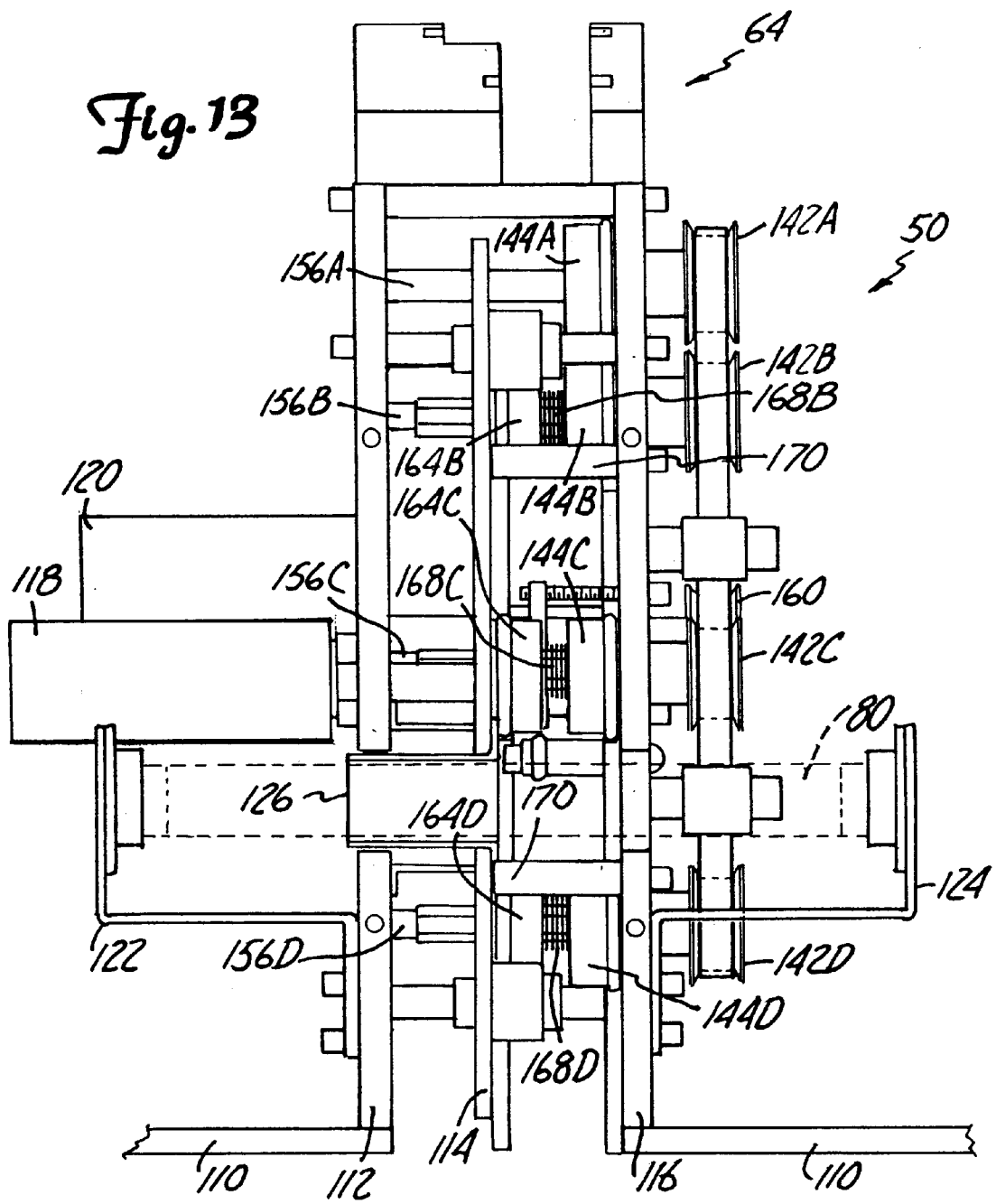
FIG. 13 is a front view of the scanner with the covers removed and the solenoid energized.
Figure 19:
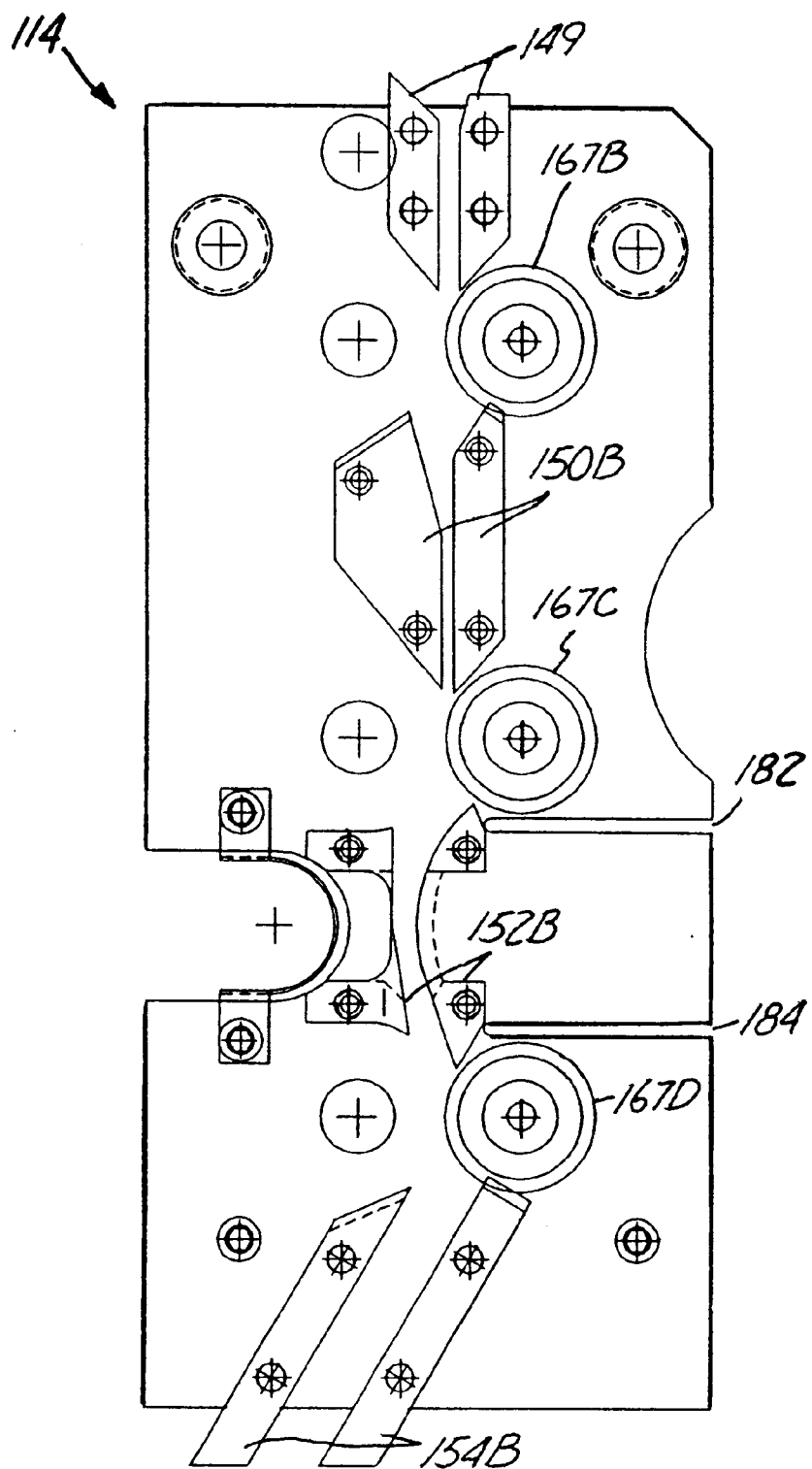
FIG. 19 shows the slide plate of the scanner viewed along section 19—19 of FIG. 12.

After a film strip is entered through one of the inlet tracks, it is guided through scanner 50 by common guide track 76 (the right side of common guide track 76 is shown in FIG. 10, and the left side is shown in FIG. 19). Common guide track 76 is formed by guides 150A, 152A, and 154A (all attached to right side plate 116), and a set of corresponding guides located on slide plate 114 (guides 149, 150B, 152B, and 154B, shown in FIG. 19). The common guide track may also be formed by one continuous guide (rather than three or four separate guides) attached to right side plate 116, and one continuous guide attached to slide plate 114. The width of common guide track 76 is defined by the distance between slide plate 114 and right side plate 116. The width of the common guide track can be adjusted by sliding slide plate 114 between left side plate 112 and right side plate 116. The movement of slide plate 114 is performed by solenoid 118. Solenoid 118 is mounted to left side plate 112. Solenoid 118 also extends through left side plate 112 and is attached to slide plate 114. When optical sensor 140 detects that APS film is present in inlet track 68, solenoid 118 is energized. When solenoid 118 is energized, it pushes slide plate 114 toward right side plate 116 thereby narrowing the common guide track (as shown in FIG. 13). When optical sensors 136 and 138 detect that 35 mm film is present in inlet track 66, solenoid 118 is deenergized. When solenoid 118 is deenergized, slide plate 114 slides back towards left side plate 112 thereby widening the common guide track. In FIG. 10, the solenoid is deenergized so slide plate 114 is located beside left side plate 112. Although only two inlet tracks are shown in FIG. 10, additional inlet tracks can be added to accommodate film of any width. If more than two inlet tracks are used, a linear actuator may be used to adjust the width of the common guide track according to the width of the film being scanned.

Pulleys 142A, 142B, 142C, and 142D (collectively referred to as pulleys 142) are rotatably mounted on right side plate 116. Right rollers 144 are also rotatably mounted on right side plate 116. Directly across from right rollers 144B, 144C, and 144D (but not visible in FIG. 10) are left rollers 164B, 164C, and 164D (which are best shown in FIGS. 12 and 16, and are collectively referred to as left rollers 164). Left rollers 164 are rotatably mounted against slide plate 114 (as shown in FIG. 12). Shafts 156A, 156B, 156C, and 156D (collectively referred to as shafts 156) extend from pulleys 142, through right rollers 144, and through left rollers 164. Motor 120 is mounted to left side plate 112 and drives the pulleys, shafts, and rollers. Motor 120, pulleys 142, shafts 156, right rollers 144, and left rollers 164, make up film drive 88 which is shown in block form in FIG. 4. The operation of film drive 88 will be described in more detail in the discussion of FIG. 11 through FIG. 20.

Figure 11:
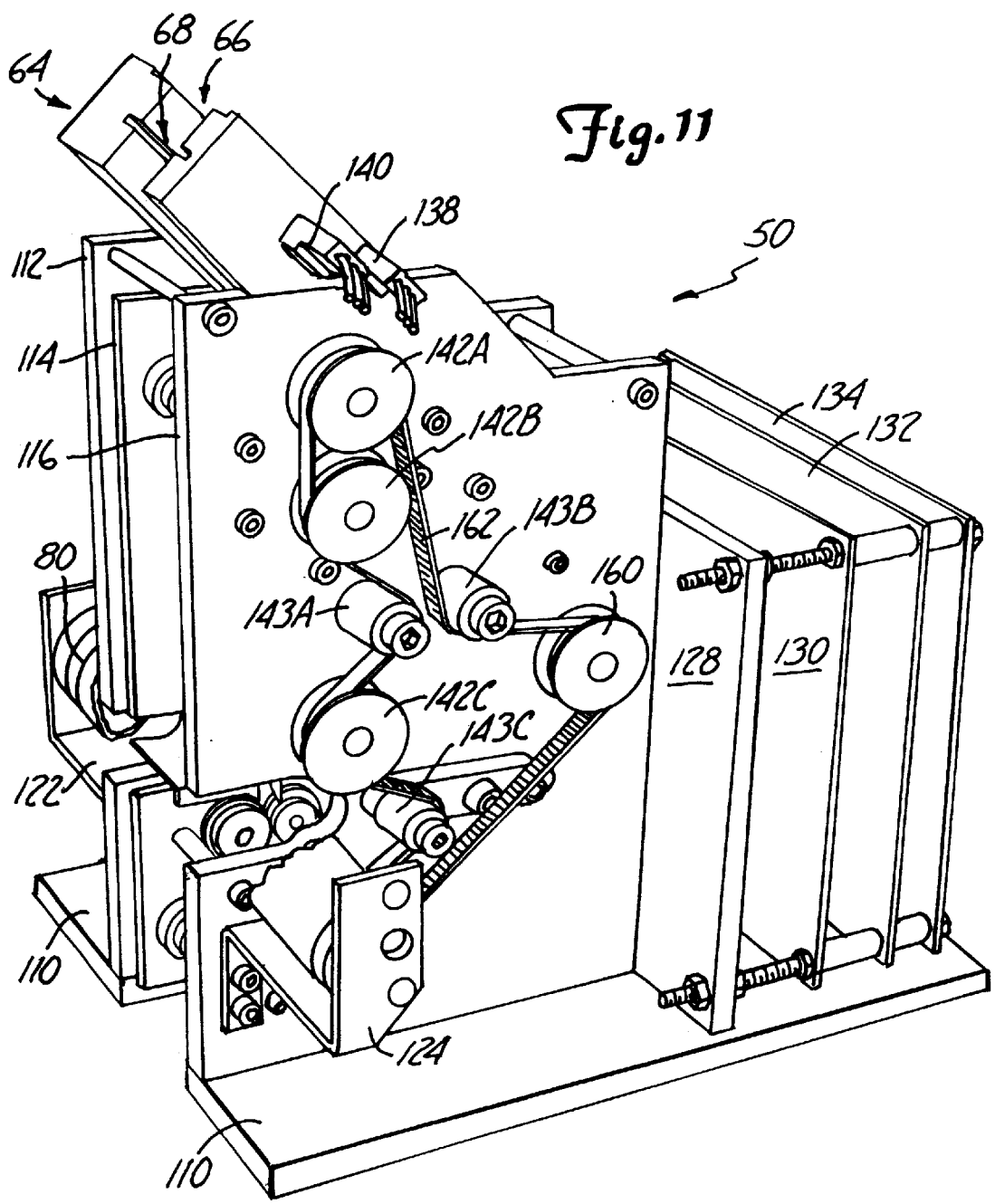
FIG. 11 is a perspective view of the right side of the scanner with the covers removed.
Figure 12:
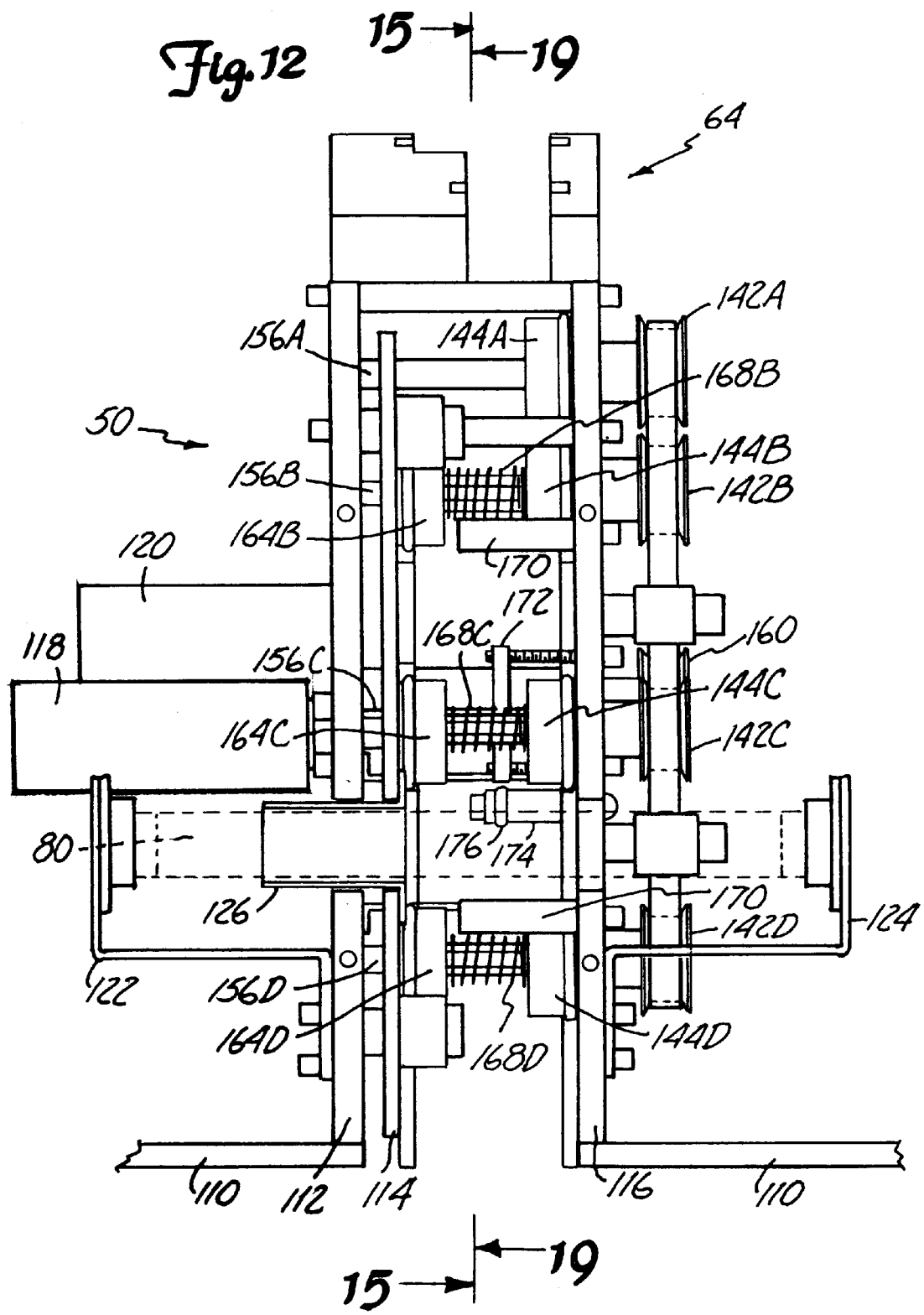
FIG. 12 is a front view of the scanner with the covers removed and the solenoid deenergized.

FIG. 11 shows the right side of scanner 50 with cover plates 60 and 62 removed. Back plate 128 is mounted to the back of left side plate 112 and the back of right side plate 116, and it is also mounted to base 110. Circuit boards 130, 132, and 134 are bolted to each other and to back plate 128. Back plate 128 and circuit board 130 make up a portion of lens assembly 186 (shown in FIGS. 21 and 22). Circuit boards 132 and 134 contain a variety of components including A/D converter 92, buffer 94, and controller 96 (shown in FIG. 4).

Pulleys 142 and drive wheel 160 are rotatably mounted to right side plate 116. In operation, motor 120 (shown in FIG. 10) causes drive wheel 160 to rotate at a substantially constant angular velocity. When drive wheel 160 rotates, belt 162 causes pulleys 142 to rotate at the same angular velocity as the drive wheel. Belt guides 143A, 143B, and 143C are rotatably mounted on right side plate 116, and help maintain the proper tension on belt 162. A film strip must be driven through the scanner at a substantially constant velocity because the film is sampled one line at a time and the time between samples is a constant. Thus, if the advancement of the film speeds up or slows down, the space between samples will vary and the resulting image will be blurry.

FIG. 12 shows the front of the scanner with cover plates 60 and 62 removed. Shafts 156 are attached to pulleys 142 and extend therefrom through right side plate 116, through right rollers 144 and left rollers 164, through slide plate 114, and are rotatably mounted to left side plate 112. Right rollers 144 are rotatably mounted to right side plate 116. Left rollers 164 are slidably mounted on shafts 156. Springs 168B, 168C, and 168D (collectively referred to as springs 168) surround shafts 156 and are located between right rollers 144 and left rollers 164. Springs 168 help maintain the proper spacing between right rollers 144 and left rollers 164 by pressing left rollers 164 against slide plate 114. When solenoid 118 is energized and slide plate 114 moves toward right side plate 116, slide plate 114 pushes left rollers 164 toward right rollers 144 and compresses springs 168 (as shown in FIG. 13). When solenoid 118 is deenergized, springs 168 help force left rollers 164 and slide plate 114 back toward left side plate 112.

FIG. 13 shows the front of the scanner with the solenoid energized so that slide plate 114 has slid from left side plate 112 toward right side plate 116. Arms 170 are attached to right side plate 116 and extend outwardly toward slide plate 114. Arms 170 provide a stopping point for slide plate 114. When solenoid 118 is energized, slide plate 114 slides toward right side plate 116 until it comes in contact with arms 170 at which point it can slide no further. When slide plate 114 slides toward right side plate 116, light shield 126 moves along with slide plate 114 and prevents light from being projected through the gap between left side plate 112 and slide plate 114. Light shield 126 helps ensure that the only light reaching light sensor 86 (shown in FIG. 21), is the light projected through a film strip and down light tunnel 82 (shown in FIG. 16). If other light were to reach the light sensor, it would corrupt the digital image of the film.

Figure 14:
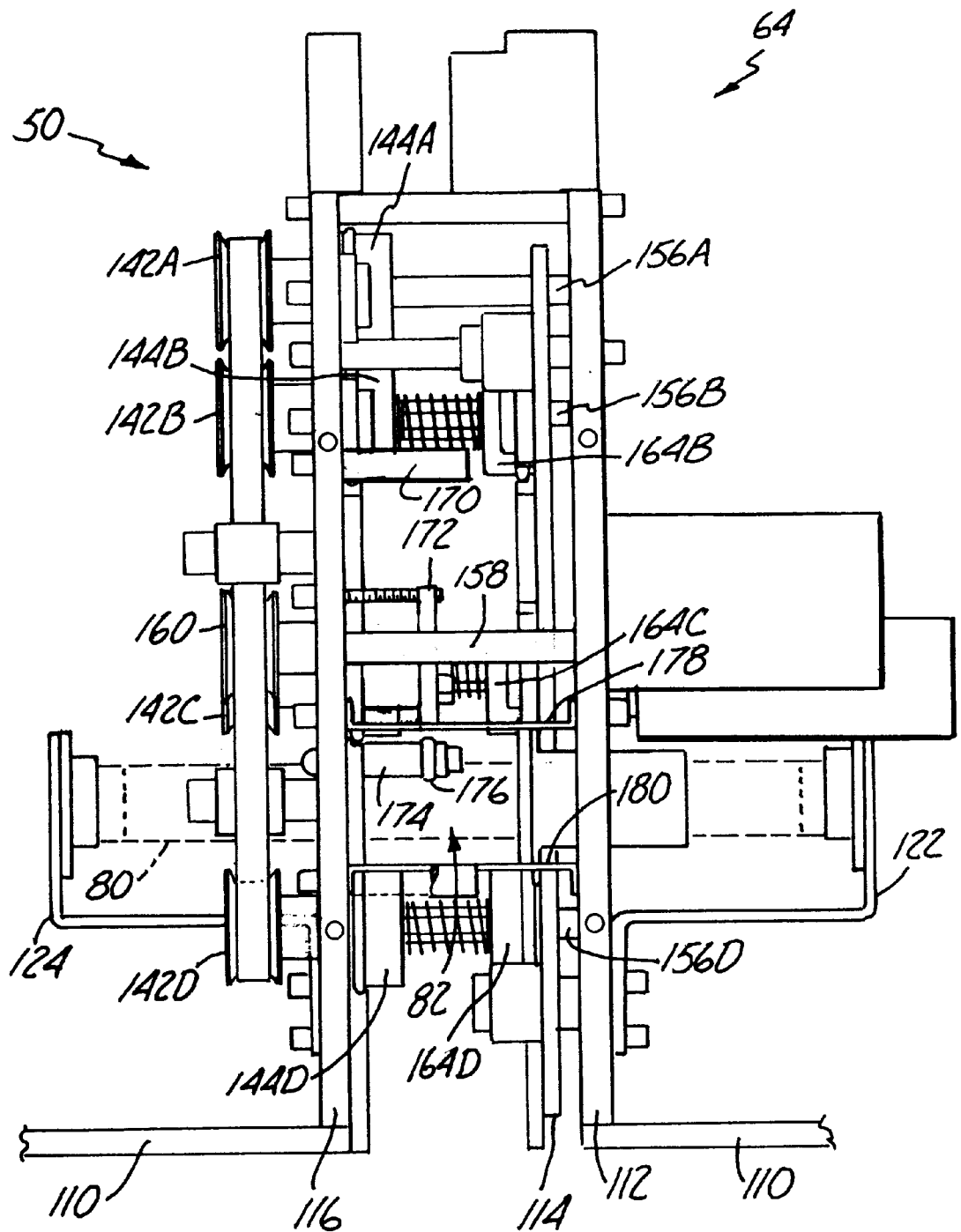
FIG. 14 shows the back side of the scanner with the back plate and circuit boards removed.

FIG. 14 shows the backside of the scanner with back plate 128 and circuit boards 130, 132, 134 removed. Upper tunnel plate 178 and lower tunnel plate 180 are attached between left side plate 112 and right side plate 116. Light tunnel 82 is defined by the region below upper tunnel plate 178, above lower tunnel plate 180, and between right side plate 116 and slide plate 114. Thus, the width of the light tunnel gets narrower when slide plate 114 slides toward right side plate 116, and it gets wider when slide plate 114 slides toward left side plate 112.

FIG. 15 shows right side plate 116 viewed from section 15—15 shown in FIG. 12. Right guides 66B and 68B formed in right platform 64B merge together near right roller 144A and right pressure roller 148A. Right pressure rollers 148A, 148B, 148C, and 148D (collectively referred to as right pressure rollers 148) are rotatably mounted on right side plate 116. Right O-rings 146A, 146B, 146C, and 146D (collectively referred to as right O-rings 146) surround outer surface of right rollers 144. Right pressure rollers 148 are in contact with right O-rings 146. When right rollers 144 rotate, the frictional force between right O-rings 146 and right pressure rollers 148 causes right pressure rollers 148 to rotate. Thus, if right rollers 144 are rotating counterclockwise, this will cause right pressure rollers 148 to rotate clockwise. When a strip of film is placed between a rotating roller 144 and a rotating pressure roller 148, the edge of the film is squeezed between the pressure roller 148 and the O-ring 146 on the roller 144, and the film is advanced between the roller 144 and the pressure roller 148.

Right guides 150A, 152A, and 154A are attached to right side plate 116, and guide the film into and out of right rollers 144 and right pressure rollers 148. Guide roller 174 is rotatably mounted on right side plate 116. Guide plate 172 is mounted on right side plate 116 above right pressure roller 148C. Guide roller 174 and guide plate 172 extend out approximately one inch from right side plate 116 and guide the middle portion, or image portion, of the film into right guide 152A (and into a corresponding left guide 152B shown in FIG. 19). Guide roller 174 and guide plate 172 push against the image portion of the film so as to help eliminate any transverse curvature in the film. Guide roller 174, guide plate 172, and right guide 152A, bend the film longitudinally in a C-shape, with the opening of the "C" facing away from opening 81. This longitudinal bending of the film helps eliminate any transverse bending and provides for a clearer scan of the film. As shown in FIG. 14, guide roller 174 is located toward the upper portion of light tunnel 82. An additional guide roller 174 may be placed toward the lower portion of light tunnel 82, or below light tunnel 82, to ensure that film strips remain flat during the entire scan, and do not snap back into a curved position prior to the last frame being scanned.

Optical sensor 141 is mounted at the bottom of right side plate 116 over pressure roller 148D by optical sensor mount 228. Optical sensor 141 detects whether film is in the bottom of the scanner. If a roll of 35 mm film is being scanned and the user attempts to enter a roll of APS film, optical sensor 141 will detect that the 35 mm film is still in the scanner and slide plate 114 will not be allowed to slide until the 35 mm film has exited scanner 50.

FIG. 16 shows a perspective view of right side plate 116. Spacers 171A, 171B, 171C, 171D, and 171E (collectively referred to as spacers 171) are attached at one end to right side plate 116 and, when the scanner is assembled, the other end of the spacers are attached to left side plate 112 (shown in FIG. 10). O-ring 176 surrounds the outer surface of guide roller 174 and helps protect the image portion of the film when it comes in contact with the guide roller. Tunnel plates 178 and 180 are attached to right side plate 116 and extend out therefrom forming the upper and lower boundaries of light tunnel 82. The right boundary of light tunnel 82 is defined by right side plate 116. The left boundary of light tunnel 82 is defined by slide plate 114 (shown in FIG. 19). The left boundary of light tunnel 82 is adjustable and is dependent on the position of slide plate 114. In FIG. 16, two left boundaries are shown with hidden lines. One left boundary is at a distance A from right side plate 116, and the other is at a distance B from right side plate 116.

Shafts 156 extend through the inner surface of left rollers 164. The inner surface of left rollers 164 is hexagonally shaped. Shafts 156 have a circular cross-section near the ends of the shafts, and have a hex portion 159 towards the middle of the shafts which is hexagonal in cross section. The hexagonal outer surface of shafts 156 and the hexagonal inner surface of left rollers 164 are spaced enough to allow left rollers 164 to slide along shafts 156, but the spacing between these surfaces is small enough so that when the shafts rotate, the outer surface of the shafts come in contact with the inner surface of the rollers causing the rollers to rotate. Left O-rings 166B, 166C, and 166D (collectively referred to as left O-rings 166) surround the outer surface of left rollers 164.

Right pressure rollers 148 and right O-rings 146 extend out only about an eighth of an inch from the surface of right side plate 116. Thus only the outer edge of the film is squeezed between right O-rings 146 and right pressure rollers 148. This prevents damage to the middle of the film where the images are located. Similarly, guides 150A, 152A, and 154A also extend out only about an eighth of an inch from right side plate 116 so that only the edge of the film is touched by the guides. Preferably, guide 152A is made of a transparent material so that light can be projected through the guide 152A and through the outer edge of a film strip, thereby allowing the entire width of the film strip to be scanned. Also, guide 152A has openings 232A and 232B to facilitate scanning the outer edge of a film strip.

FIG. 17 is an exploded assembly drawing of right side plate 116. Shafts 156 have a circular cross-section except at hex portion 159 where the cross-section is hexagonal. Each of right rollers 144 has groove 145 surrounding the outer surface of the roller. When assembled, right O-rings 146 are placed in groove 145 of right rollers 144 (as shown in FIG. 18). Sensor holder 138H holds sensor 138 (shown in FIG. 10), and sensor holder 140H holds sensor 140 (shown in FIG. 10). Pads 173 are attached to the end of arms 170 and provide a cushioned surface for slide plate 114 (shown in FIG. 10) to bump into when slide plate 114 slides toward right side plate 116. When assembled, idler pivot 212, roller idler 214A, and pin 216A make up belt guide 143A (shown in FIG. 11). When assembled, idler arm 218, roller idler 214B, spacer 220, and pin 216B make up belt guide 143C (shown in FIG. 11). Socket 217 is attached to S-bracket 124. The various elements are attached to right side plate 116 by fasteners 219.

FIG. 18 shows an assembled pulley, shaft, and roller. Shaft 156 extends through right roller 144, through right side plate 116, through bearing 147, and is attached to pulley 142. Pulley 142 is pressed against bearing 147. Right roller 144 is attached to shaft 156 on the right side of hex portion 159.

FIG. 19 shows slide plate 114 viewed from section 19—19 shown in FIG. 12. Left pressure rollers 167 are rotatably mounted on the slide plate. When assembled, left rollers 164 (shown in FIG. 16) are pressed against slide plate 114 adjacent to left pressure rollers 167. When assembled, left pressure rollers 167 are in contact with left O-rings 166 surrounding left rollers 164. Thus, just as one edge of the film is squeezed between right pressure rollers 148 and right O-rings 146 on right rollers 144, the other edge of the film is squeezed between left pressure rollers 167 and left O-rings 166 on left rollers 164, and the film is advanced when left rollers 164 and left pressure rollers 167 rotate. Left guides 149, 150B, 152B, and 154B, are attached to slide plate 114, and guide the film into and out of left rollers 164 and left pressure rollers 167. When assembled, upper tunnel plate 178 (shown in FIG. 16) is located within upper slit 182 of slide plate 114, and lower tunnel plate 180 (also shown in FIG. 16) is located within lower slit 184 of slide plate 114. There is a loose fit between the tunnel plates and the slits so that slide plate 114 is free to slide back and forth between left side plate 112 and right side plate 116 (shown in FIG. 10).

FIG. 20 shows a perspective view of slide plate 114. Left Guides 149, 150B, 152B, and 154B extend out only about an eighth of an inch from slide plate 114 so that only the edges of a film strip come in contact with the guides. Preferably, guide 152B is made of a transparent material so that light can be projected through guide 152B and through the outer edge of a film strip, thereby allowing the entire width of the film strip to be scanned. Also, guide 152B has openings 234A and 234B to facilitate scanning of the outer edge of a film. Bearings 169A, 169B, 169C, and 169D, extend out from slide plate 114. Although there are four bearings shown in FIG. 20, the slide plate may also be used with only two bearings, particularly, bearings 169A and 169B. When assembled, spacers 171A, 171B, 171C, and 171D (shown in FIG. 16 attached to right side plate 116), extend through bearings 169A, 169B, 169C, 169D.

In summary, film 56 is inserted either in inlet track 66 or inlet track 68 (as shown in FIG. 2). Optical sensors 136, 138, and 140, which are mounted on film loading platform 64 (as shown in FIG. 10), detect which inlet track contains film 56. Scanner 50 has a common guide track 76 which consists of right guides 150A, 152A, and 154A, mounted to right side plate 116 (as shown in FIG. 15), and left guides 149, 150B, 152B, and 154B, mounted to slide plate 114 (as shown in FIG. 19). The width of common guide track 76 is defined as the distance between slide plate 114, and right side plate 116. Solenoid 118 (shown in FIG. 10) adjusts the width of common guide track 76 by causing slide plate 114 to slide between left side plate 112 and right side plate 116. If optical sensors 136 and 138 detect that film was inserted in inlet track 66, solenoid 118 adjusts the width of common guide track 76 so that it is the same as the width of inlet track 66. If optical sensor 140 detects that film was inserted in inlet track 68, solenoid 118 adjusts the width of common guide track 76 so that it is the same as the width of inlet track 68. After the width of the common guide track has been adjusted, light source 80 (shown in FIG. 10) is turned on, and film drive 88 (shown in block form in FIG. 4) drives the film through the common guide track. Film drive 88 includes motor 120 (shown in FIG. 10), right rollers 144 (shown in FIG. 15), right pressure rollers 148 (shown in FIG. 15), left rollers 164 (shown in FIG. 16) and left pressure rollers 167 (shown in FIG. 19). The right edge of film 56 is squeezed between right rollers 144 and right pressure rollers 148, and the left edge of film 56 is squeezed between left rollers 164 and left pressure rollers 167. Motor 120 causes right rollers 144, right pressure rollers 148, left rollers 164, and left pressure rollers 167 to rotate, and thereby advance film 56 through common guide track 76. When film 56 advances towards right guide 152A (shown in FIG. 15) and left guide 152B (shown in FIG. 19), light source 80 (shown in FIG. 10) projects light through film 56 and down light tunnel 82 (shown in FIG. 16). At the end of light tunnel 82 is lens assembly 186 which is discussed below.

IV. LENS ASSEMBLY

FIG. 21 shows an exploded perspective view of lens assembly 186. Light sensor 86 is mounted on circuit board 130. Spacer 188 is located above light sensor 86. Spacer 188 has groove 190 and opening 192. An infrared light filter 230 (not shown) is located within opening 192 of spacer 188. The infrared light filter prevents infrared light from getting through to light sensor 86. Lens 84 is contained within lens holder 196. Lens 84 and lens holder 196 fit within groove 190 of spacer 188. Spacer 188 serves three important functions: It provides the necessary pacing between lens 84 and light sensor 86, it filters out infrared light, and the raised edges 194 of spacer 188 serve as a light tunnel so that the only light entering opening 192 is the light passing through lens 84. Spacer 188, lens 84, and lens holder 196 are clamped to circuit board 130 by clamp 198. Clamp 198 has front face 200 and opening 202.

Circuit board 130 may mounted to back plate 128 either by nuts and bolts as shown in FIG. 11, or as shown in FIG. 21 by spacers 206 and 207, washers 208, and fasteners 209. When assembled, springs 210 surround spacers 206. When spacers 206 are inserted into circuit board 130, springs 210 are compressed and exert a force against circuit board 130. The distance between light sensor 86 and lens 84 is a critical dimension and must be maintained constant to ensure proper focus. Using spacer 207 and providing a force against circuit board 130 using springs 210 compensates for warping of circuit board 130 and for manufacturing tolerances of the various components and helps to maintain this critical dimension constant.

FIG. 22 shows an assembled lens assembly 186. Back plate 128 of the lens assembly is mounted to the back of the scanner (as shown in FIG. 11). Window 204 of back plate 128 is aligned with light tunnel 82 (shown in FIG. 16) of the film scanner.

V. ADJUSTABLE SCANNING RESOLUTION

Figure 23A:
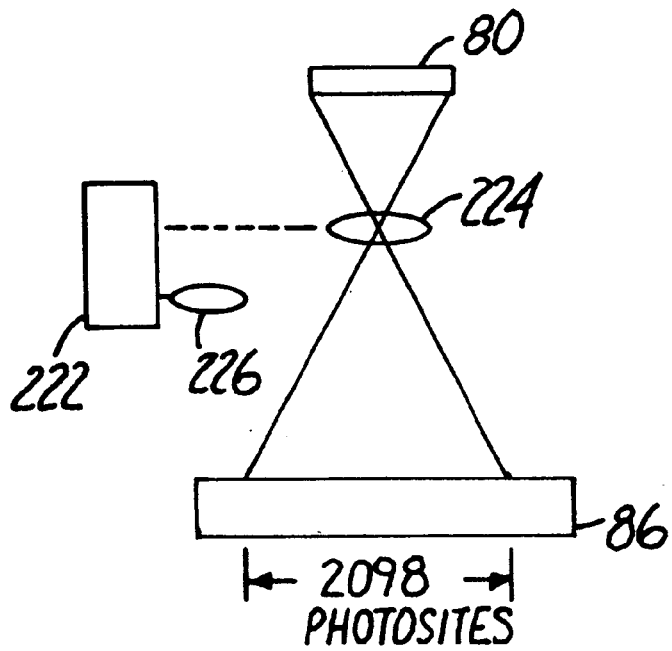
FIGS. 23A–23B show an adjustable resolution feature of the scanner.
Figure 23B:
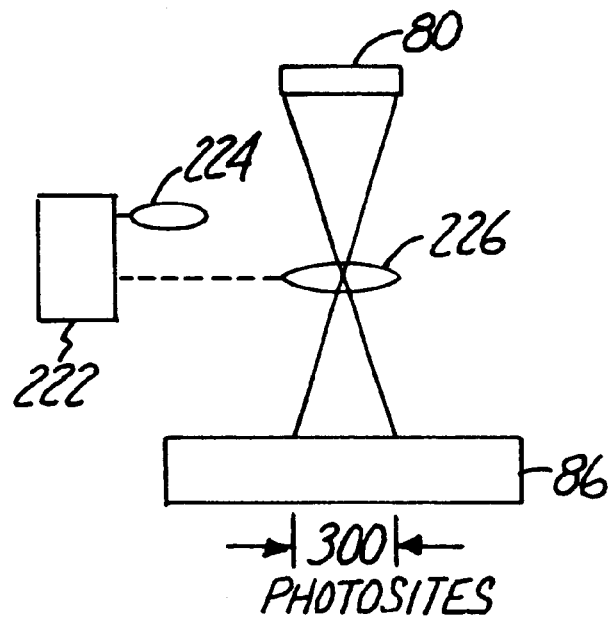

In a preferred embodiment, the scanning resolution is adjustable. The resolution is determined by how many photosites on light sensor 86 are utilized. Typically, the lens focuses the film image on a subset of the photosites such as the 300 photosites in the middle of each array. However, different lenses can be used to focus the film image on any desired number of photosites. Thus, as shown in FIG. 23A and FIG. 23B, adjustable resolution is obtained by using multiple lenses (lens 224 and lens 226) along with actuator 222 to switch the desired lens into place. In FIG. 23A, actuator 222 has moved lens 224 into place, and light source 80 is shown projecting light through lens 224. Lens 224 focuses the light on 2098 photosites of light sensor 86. In FIG. 23B, actuator 222 has moved lens 226 into place, and light source 80 is shown projecting light through lens 226. Lens 226 focuses the light on 300 photosites of light sensor 86. The desired resolution can be chosen either through a switch on the scanner or it can be entered with a software command.

An alternative method of obtaining adjustable resolution, is to first focus the film image on a set of photosites, and this number of photosites would determine the maximum resolution. Lower resolution images would then be obtained by using the output of only a subset of the photosites. For example, the output of every other photosite, or the output of every third photosite, would be used to create lower resolution images.

Another means for obtaining adjustable resolution is discussed below with respect to FIGS. 25–36. The embodiments shown in FIGS. 25–36 use a movable lens and light sensor to obtain adjustable resolution.

A further aspect of the adjustable resolution feature is that a film strip can be quickly scanned at a low resolution, and then the scanner can find selected images on the film strip and rescan them at a higher resolution. This is accomplished by first scanning a film strip at a low resolution. The end of the film strip is then retained in the scanner and is held between right roller 144D and right pressure roller 148D (shown in FIG. 16), and between left roller 164D and left pressure roller 167D (shown in FIGS. 16 and 19). The digital images are examined to determine which images should be scanned at a higher resolution, and these images are selected to be rescanned. The direction of rotation of the rollers is then reversed and the film strip is brought back into the scanner. The location of each image was determined and stored during the initial scan, so when the scanner pulls the film strip back into the scanner, it is able to rescan only the selected images at a higher resolution.

VI. DX CODE DETECTION

In another preferred embodiment, the pixel data representing the outer edges of the film strip is examined to obtain the DX-Code or other coded data. The outer edges of a film strip typically contain a series of symbols which provide information about the film such as frame numbers, aspect ratios, and the value of gamma for the film. A pattern matching algorithm analyzes the pixel data representing the outer edges of the film strip and locates all coded data. The pattern matching algorithm then compares the images of the coded data to stored images of coded data to determine which codes are present. Various adjustments are then made to the digital images in accordance with the coded data For example, the frame numbers can be obtained from the coded data and displayed along with the digital images. The digital images can be adjusted based on the aspect ratios contained in the coded data. Also, the location and orientation of the coded data will indicate the direction that the film was inserted in the scanner, and this information is then used in determining which direction an image must be rotated before being displayed.

VII. ADDITIONAL PREFERRED EMBODIMENTS

Figure 24:
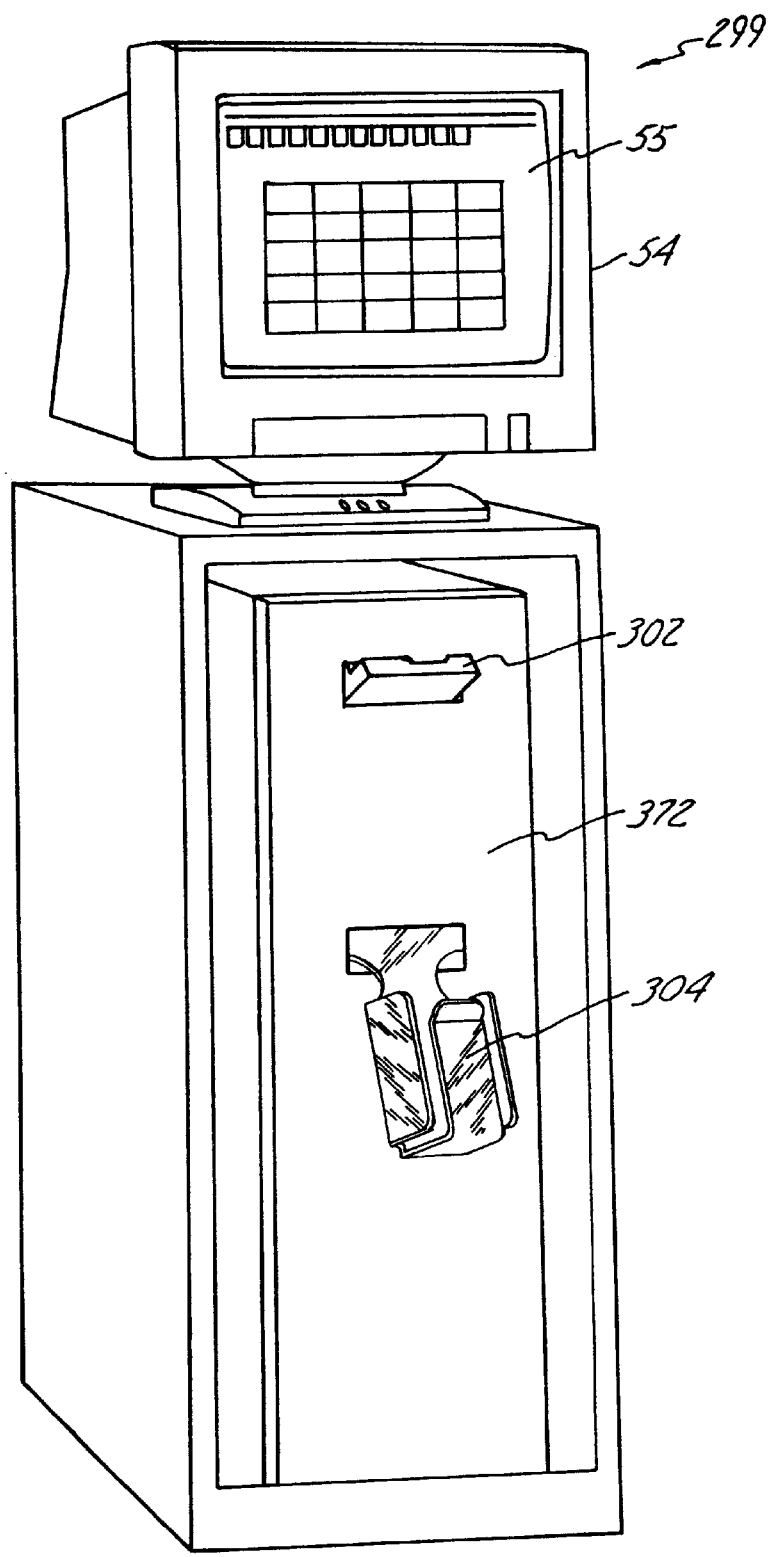
FIG. 24 shows a preferred embodiment of the film scanning system including a catch basket for smaller strips of film.

Additional preferred embodiments are shown in FIGS. 24–36. FIG. 24 shows film scanning system 299, which includes catch basket 304 for catching smaller strips of film as they exit the scanner. Catch basket 304 is smaller than basket 58 (shown in FIG. 1), and keeps the film strips neatly organized in the order in which they were scanned to facilitate identification of the photographic negatives that correspond to the digital images displayed on monitor 54. Catch basket 304 is detachable for easy removal when longer film strips are scanned.

Figure 25:
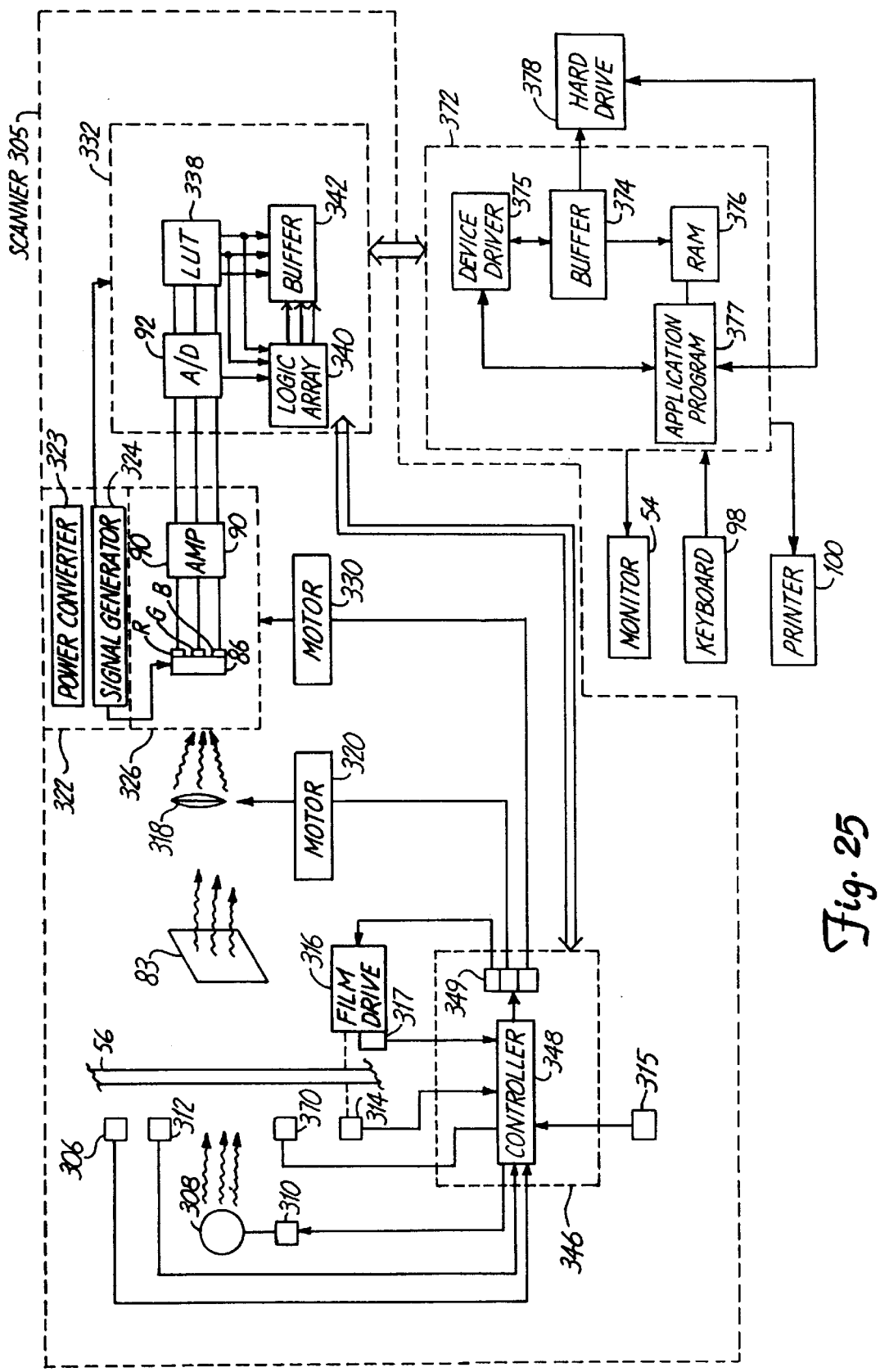
FIG. 25 is a block diagram of a preferred embodiment of the film scanning system with means for adjusting the scanning resolution.

FIG. 25 is a block diagram of a preferred embodiment of the film scanning system 299 with means for adjusting the scanning resolution. FIG. 25 is similar to FIG. 4, but includes a few additions and changes that will be described in detail below. Scanning system 299 includes scanner 305, computer 372, monitor 54, keyboard 98, printer 100 and hard drive 378. Scanner 305 includes film entry sensors 306, light source 308, ballast 310, DX code sensors 312, film exit sensor 314, position sensors 315, film drive 316, lens 318, motor 320, motor 330, signal generator board 322, light sensor board 326, digitizer board 332, controller board 346, and solenoids 370.

The embodiments shown in FIGS. 25–36 provide adjustable scanning resolution by movement of lens 318 and light sensor board 326 to focus image 83 onto a desired number of photosites of light sensor 86. The resolution can be set anywhere in the range from about 400 dots per inch (dpi) to 2000 dpi. The mechanical details of the movement of lens 318 and light sensor board 326 are described below with reference to FIGS. 27–36.

Controller board 346 includes controller 348 and motor drivers 349. Controller board 346 monitors and controls various components of scanner 305, including light source 308, film entry sensors 306, DX code sensors 312, film exit sensor 314, position sensors 315, film drive 316, encoder 317, lens 318, motors 320 and 330, and solenoids 370. Controller board 346 communicates with digitizer board 332, preferably through a ribbon cable. Controller board 346 communicates with computer 372 indirectly through digitizer board 332. Controller 348 on controller board 346 is preferably a Motorola 68HC711 microcontroller. Controller 348 includes a plurality of A/D converters that each convert an analog input to 8-bit digital output values that are used by the controller. Each of sensors 306, 312, 314 and 315 on scanner 305 is coupled to an A/D converter on controller

348. Motor drivers 349 are actually three separate motor drivers—349A, 349B and 349C. Motor driver 349A is coupled to film drive 316, motor driver 349B is coupled to motor 320 and motor driver 349C is coupled to motor 330. Motor drivers 349 amplify motor control signals received from controller 348, and send the signals to their corresponding motor. A detailed discussion of the operations performed by controller board 346 is discussed below following a discussion of boards 322, 326 and 332.

Light sensor board 326 includes light sensor 86 and amplifier 90. As in the embodiments discussed above, light sensor 86 is preferably a Kodak KLI-2103 image sensor. Light sensor 86 converts image 83, which is created by projecting light through film strip 56, into a series of analog intensity signals (red, green and blue). Amplifier 90 is actually multiple amplifiers, so that each output of light sensor 86 is coupled to at least one amplifier. Amplifier 90 is coupled to light sensor 86 and A/D converter 92 on digitizer board 332. The position of light sensor board 326 is adjustable, and is controlled by motor 330 (See FIG. 27 and corresponding discussion).

Signal generator board 322 includes power converter 323, and signal generator circuit 324. Signal generator circuit 324 controls the length of the integration period of light sensor 86, and generates signals to clock data out of light sensor 86 at the end of each integration period. Signal generator circuit 324 also provides a synchronization signal to digitizer board 332, notifying the digitizer board of the location of each new line of intensity data. Power converter 323 is coupled to signal generator circuit 324. Power converter 323 converts a 12 volt input voltage into a plurality of output voltages, and supplies these output voltages to signal generator circuit 324.

Digitizer board 332 includes A/D converter 92, look-up-table (LUT) circuit 338, logic array 340 and buffer 342. A/D converter 92 is coupled to LUT circuit 338 and is also coupled to amplifier 90 on light sensor board 326. LUT 338 is coupled to A/D converter 92, logic array 340 and buffer 342. Logic array 340 is coupled to LUT 338 and buffer 342. Buffer 342 is preferably a plurality of first-in-first-out (FIFO) buffers. Digitizer board 332 communicates with computer 372 through a 32-bit PCI bus, and communicates with controller board 346 through a ribbon cable, although other well-known means for communication may be used. Digitizer board 332 is preferably adapted to fit directly into the motherboard of computer 372. Digitizer board 332 is responsible for converting the analog intensity signals from light sensor board 326 to digital image intensity data, and transferring the data to computer 372. Digitizer board 332 also acts as an interface between computer 372 and controller board 346.

After the intensity signals from light sensor board 326 are converted to digital image intensity data by digitizer board 332, the digital data is transferred to computer 372 via the PCI bus. Computer 372 preferably includes a Pentium processor, and operates in a 32-bit Windows NT environment. Computer 372 also includes device driver 375, buffer 374, low-resolution buffer 376, and application program 377. Computer 372 communicates with digitizer board 332 with the aid of device driver 375. Device driver 375 converts signals that are received from digitizer 332 to a format that can be understood and used by computer 372, and converts data that is sent from computer 372 to signals that can be understood and used by digitizer board 332. Application program 377 running on computer 372 receives and processes commands entered by a user, manages and manipulates image intensity data, and outputs digital images to monitor 54 and/or printer 100. For commands that require communication with scanner 305, application program 377 passes the commands to device driver 375, which converts the commands to signals that can be understood by digitizer board 332.

Figures 26A, 26B:
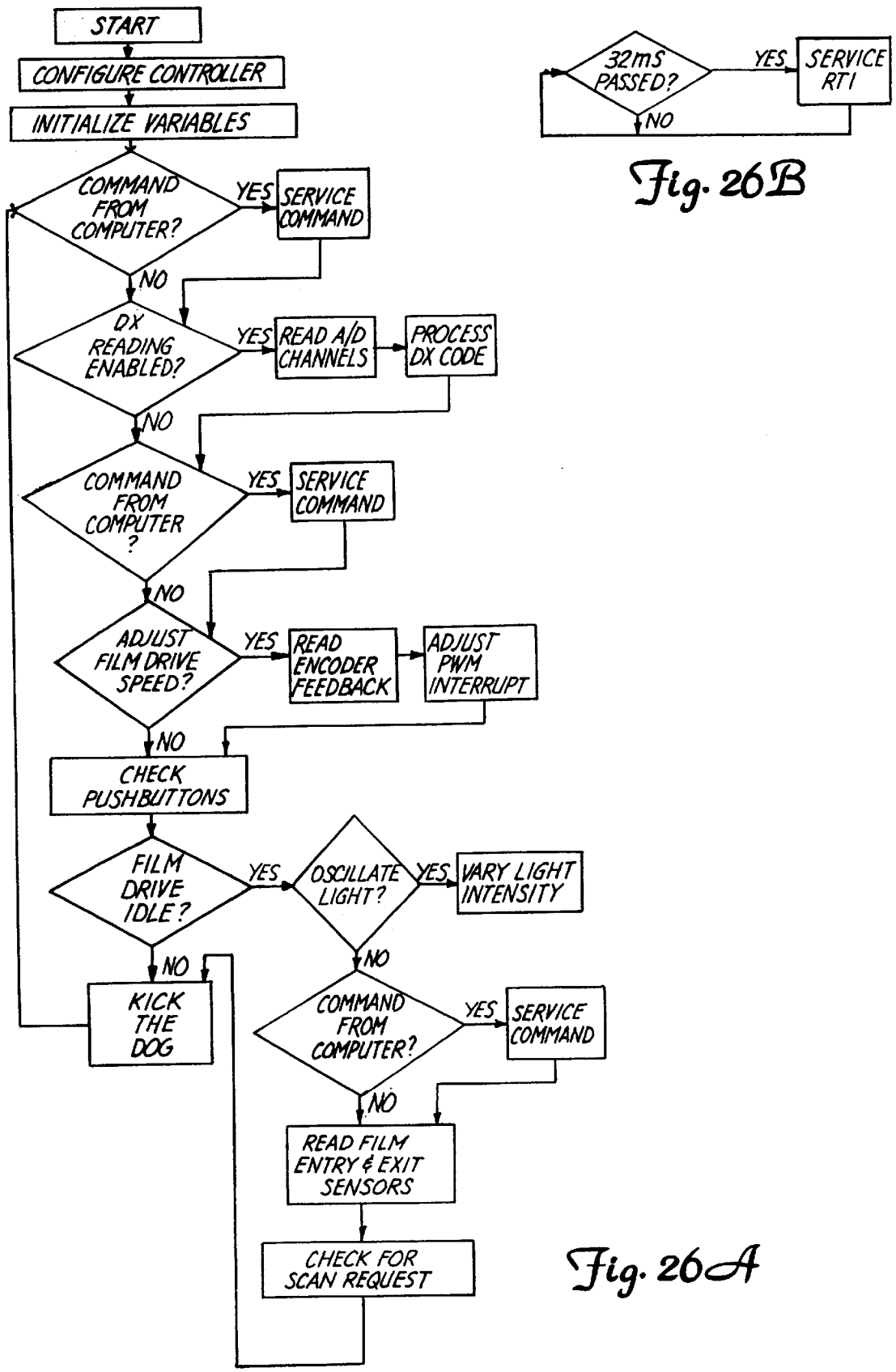
FIG. 26 is a flowchart of the functions performed by the controller in the film scanning system with adjustable resolution.

Controller board 346 is responsible for controlling a substantial number of functions of scanner 305. The operation of controller 348 on controller board 346 is controlled by a controller program stored on controller 348. A block diagram of the controller program is shown in FIG. 26A. The controller program is preferably written in C language, compiled into assembly language, and stored on controller 348. The controller program will be discussed with reference to FIGS. 25, 26A and 26B.

As shown in FIG. 26A, the first operation performed by the controller program after the controller is powered-up is to configure controller 348. During the configuration step, controller 348 is prepared for operation by identifying the mode of operation that will be used, identifying the registers that can be written to and read from, and performing other basic set-up operations. The next step in the flow chart of FIG. 26A is to initialize variables. The variables in the controller program keep track of the status of the scanner components, such as the current locations of lens 318 and light sensor board 326, the current intensity of light source 308, whether DX code sensors 312 are enabled or disabled, and the current speed of film drive 316. When the controller program starts, these variables as well as other variables are set to their initial values.

After controller 348 is configured and the controller program variables are initialized, the controller program checks to see if any commands have been entered by computer 372. If so, the controller program services those commands. When a user enters a request or a command in computer 372 via touch-screen monitor 54 (shown in FIG. 9) or keyboard 98, such as a request for scanner 305 to adjust the scanning resolution, computer 372 sends corresponding commands through digitizer board 332 to controller board 346. These commands are stored on the controller board for later servicing by the controller program. For example, before scanning begins, a user typically enters the desired scanning resolution through keyboard 98 or monitor 54. The scanning resolution data is then sent through device driver 375 to digitizer board 332. Digitizer board 332 relays the scanning resolution data to controller board 346. Controller 348 receives the scanning resolution data and generates motor control signals and light intensity signals based on the scanning resolution data Controller 348 sends the motor control signals to motor drivers 349B and 349C, and sends the light intensity signals to ballast 310.

When motor drivers 349B and 349C receive motor control signals from controller 348, the motor drivers drive motors 320 and 330 to move lens 318 and light sensor board 326 to the appropriate positions to obtain the desired resolution. (See FIG. 27 and corresponding discussion). Motors 320 and 330 are preferably stepper motors with zero backlash so that the lens and light sensor board can be quickly and accurately positioned.

When ballast 310 receives light intensity signals from controller 348, it adjusts the intensity of light projected from light source 308. The signals sent to ballast 310 by controller 348 are preferably DC signals in the range of 0 to 12 volts. Ballast 310 drives light source 308 with an AC signal that varies in amplitude based on the amplitude of the DC signal received from controller 348. Controller 348 adjusts the intensity of the light from light source 308 in accordance with the scanning resolution entered by the user. The light intensity is greater for higher resolutions. For higher resolutions, more image data must be processed than for lower resolutions. To avoid a slow down of the scanning process caused by the increased processing required for higher resolutions, the integration period of the light sensor is reduced. To obtain the same signal level from the light sensor as is obtained for low resolution scans, the intensity of light incident on the light sensor must be increased to make up for the smaller integration period. In addition, a higher intensity is desirable at higher resolutions because the light is spread out over a greater number of photosites than for low resolution scanning. The intensity of light projected on light sensor 86 could alternatively be adjusted with a light restricting iris.

As shown in FIG. 26A, after any commands from computer 372 have been serviced, the controller program next checks whether DX code reading is enabled. If DX code reading is enabled, the controller program reads the A/D channels on controller 348 that are coupled to the DX code sensors 312.

DX code consists of two long, narrow strips of data that extend the length of a film strip. The two strips are located adjacent to one another at one edge of a film strip. Each strip of data consists of a series of black dots. The two strips of DX code data for a film strip are located on either the right edge of the film strip or the left edge, depending on the orientation of the film strip as it is inserted in the scanner. Also, APS film typically includes an additional strip of data on the other edge of the film strip. Thus, there are two pairs of DX code sensors 312 on scanner 305—i.e., two sensors for each edge of a film strip.

Figure 31:
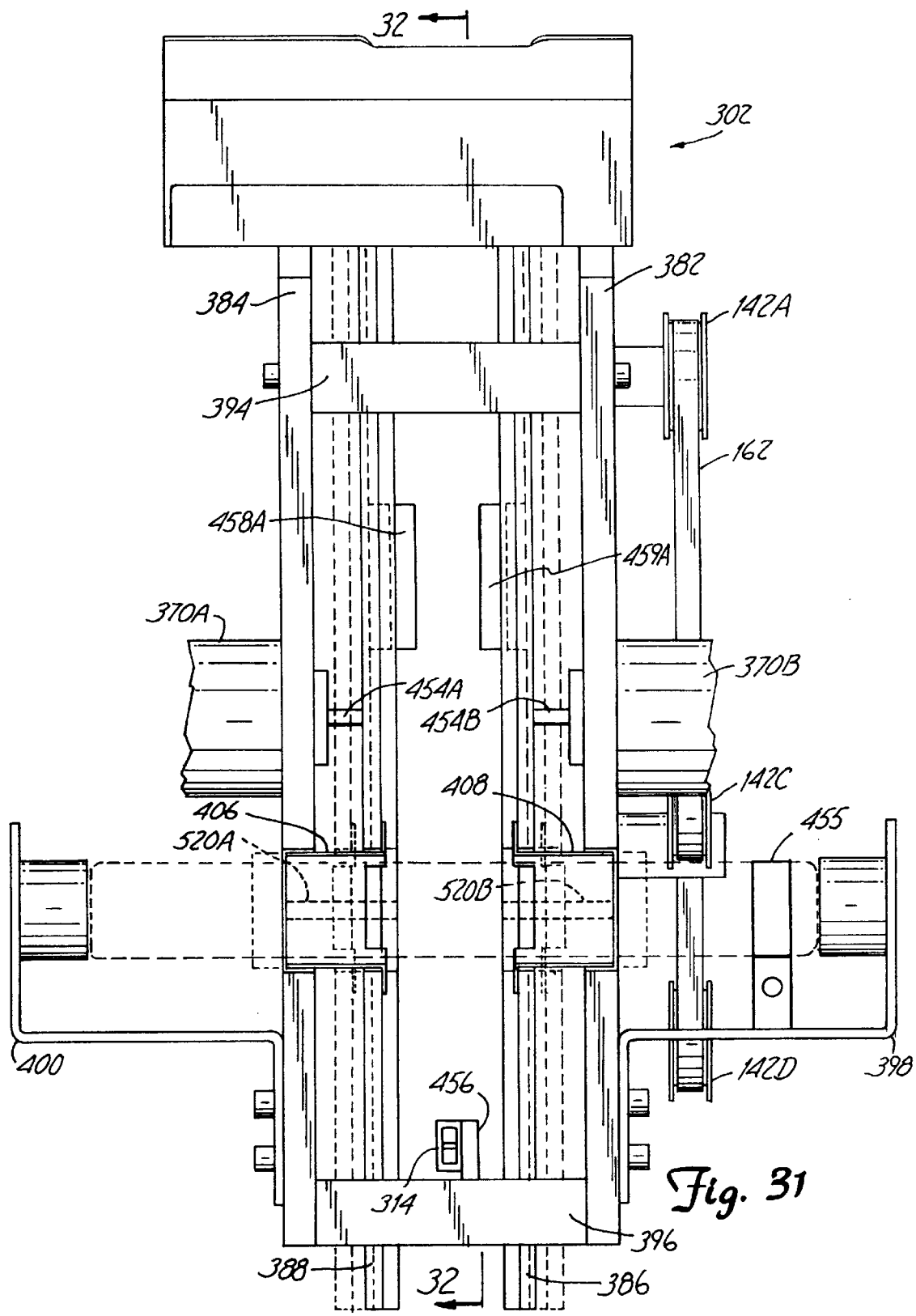
FIG. 31 is a front view of the scanner with adjustable resolution.
Figure 32:
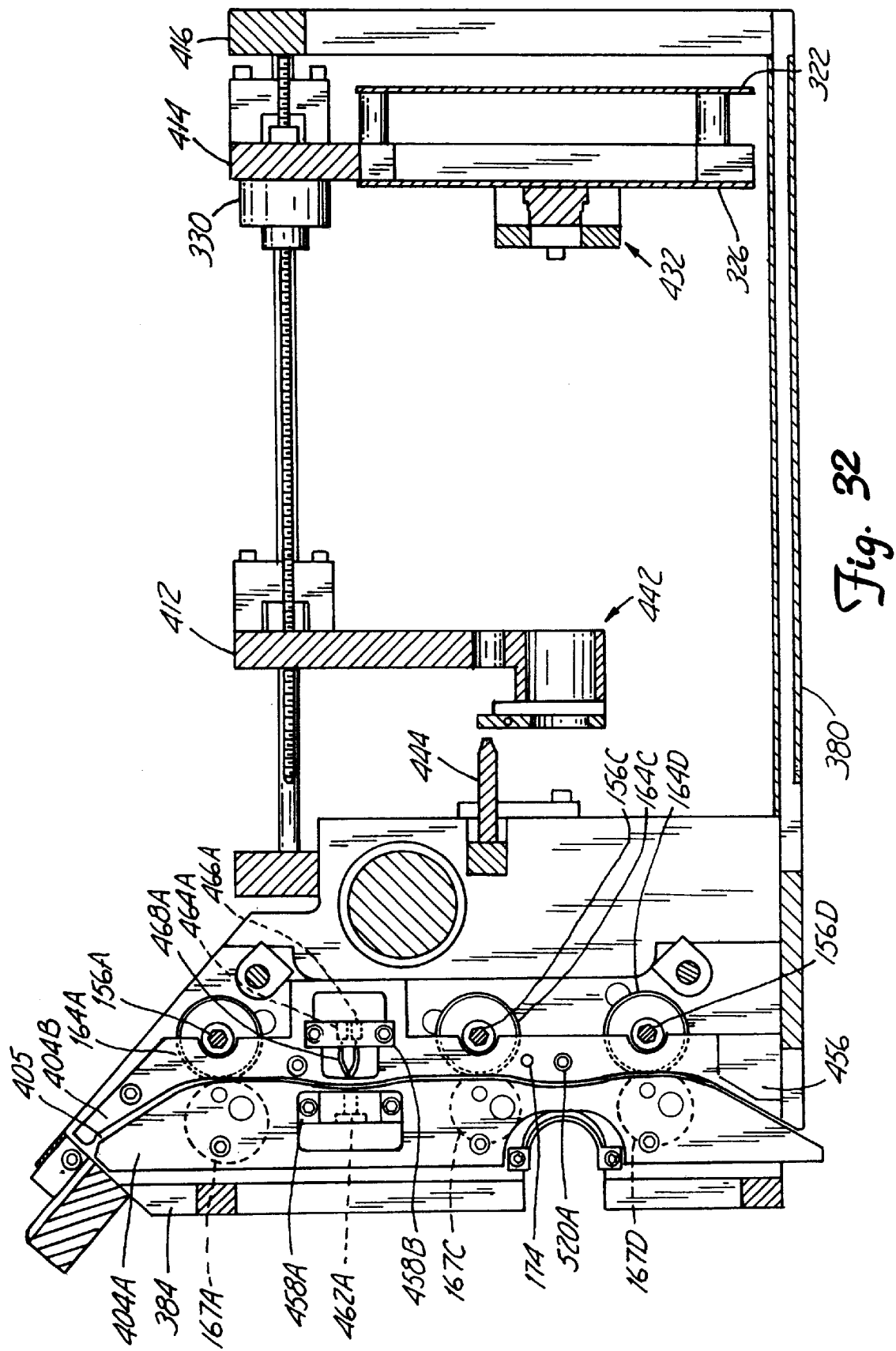
FIG. 32 is a sectional view of the scanner with adjustable resolution viewed along section 32—32 of FIG. 31.

The position of DX code sensors 312 on scanner 305 is shown in FIGS. 31 and 32. Each pair of DX code sensors 312 includes a light emitting diode (LED) 462 and two phototransistors 464 and 466. Although a single LED 462 is shared by two phototransistors 464 and 466 in the embodiment shown in FIG. 32, each phototransistor could have its own LED. Since DX code is typically located on only one edge of a film strip, only one pair of DX code sensors 312 typically detects DX code at a time. Some film strips do, however, have DX code on both edges, and in such instances, both sets of codes are read simultaneously. The LED 462 of one pair of DX code sensors 312 transmits light through the edge of a film strip where the strips of DX code are located, and each phototransistor 464 and 466 detects the light transmitted through one of the DX code strips. Phototransistors 464 and 466 output signals to A/D converters on controller 348. The signal output by a phototransistor is based upon the intensity of light sensed by that phototransistor.

The A/D converters convert the analog signals output by the phototransistors to 8-bit digital data that can be stored and processed by controller 348. Since there are two paths or two strips of DX code data, two 8-bit bytes of DX code data are received by controller 348 at a time. Each 8-bit digital sample is compared to a threshold to determine whether the data is a logical 1 or 0. Controller 348 periodically updates the threshold that defines whether a DX code data sample is a logical 1 or 0. Updating of the threshold is desirable because the output level of the phototransistors 464 and 466 can vary over time. For example, the outputs of the phototransistors 464 and 466 change with changes in temperature, with changes in LED brightness, with changes in transistor bias points, when fiber optic cables 468 and 470 (discussed below with respect to FIG. 32) become dirty or scratched, or when the direction in which fiber optic cables 468 and 470 are aimed changes. Also, the various types of negative films available in the market allow different amounts of light to pass through both the film substrate and the dark bars that make up the DX code. Thus, controller 348 automatically updates the threshold that defines whether a DX code data sample is a logical 1 or 0 each time a film strip is passed through the scanner and DX codes are read. If problems arise in the reading of a DX code, controller 348 preferably automatically resets the threshold to a default state that works for most film strip types.

Controller 348 stores and processes the received DX code. The processing of the DX code involves, first, searching for an accurate starting pattern. The DX code in each film strip includes a unique pattern that indicates the start of a DX code sequence. Once the unique pattern is detected, controller 348 begins decoding the DX codes that follow. The DX codes are read and decoded until controller 348 detects and ending pattern. Like the starting pattern, each film strip also includes a unique ending pattern that indicates the end of a DX code sequence. The use of the starting and ending patterns allows controller 348 to read DX codes of differing lengths. Controller 348 preferably performs an error check, such as a parity check, on the DX codes that have been read to ensure the accuracy of the received data From the DX code, controller 348 identifies the frame number of each photographic negative and the manufacturer of the film. Controller board 346 transfers the information obtained from the DX code to computer 372 through digitizer board 332.

As shown in FIG. 26A, after the DX code has been processed, the controller program again checks whether computer 372 has issued any more commands. If commands have been issued, controller 348 services those commands as described above.

After controller 348 finishes servicing commands, it determines whether the speed of film drive 316 is correct. Controller 348 monitors the speed of film drive 316 by storing and counting pulses that are sent from encoder 317 on film drive 316 to controller 348. Encoder 317 generates approximately 1000 pulses per revolution. The controller counts the number of pulses received from the encoder in a specified time period and determines whether the film drive is running at the proper speed. The specified time period is preferably 32 milliseconds, as shown in FIG. 26B. FIG. 26B shows a loop that is continuously executed by controller 348. Every 32 milliseconds, controller 348 services a real-time interrupt. Thus, the number of pulses received between each real-time interrupt is counted to obtain the speed of film drive 316. If the film drive is not running at the proper speed, controller 348 changes the speed of the film drive by adjusting the width of the digital pulses controller 348 sends to motor driver 349A, and correspondingly to film drive 316. The adjustment of the pulse width is referred to as pulse width modulation (PWM). The PWM step is represented in FIG. 26A as "Adjust PWM Interrupt".

The next function performed by the controller program, as shown in FIG. 26A, is to check pushbuttons. Scanner 305 includes various pushbuttons, similar to buttons 70 and 74 of scanner 50 (shown in FIG. 2), for controlling the direction of film drive 316, for stopping film drive 316, and for beginning a scan. When a pushbutton is pushed, controller 348 identifies which button was pushed and takes appropriate action. If a button to advance the film forward is pushed, controller 348 sends a command to motor driver 349A, instructing it to drive film drive 316 in the forward direction. Similarly, if a button to advance the film in the reverse direction is pushed, controller 348 sends a command to motor driver 349A, instructing it to drive film drive 316 in the reverse direction. If a button to stop the film advancement is pushed, controller 348 sends a command to motor driver 349A, instructing it to stop film drive 316. If a button to begin scanning is pushed, controller 348 sends a signal to computer 372 through digitizer board 332, informing the computer that the start scan button has been pushed. Computer 372 responds by displaying a dialog box on touch-screen monitor 54, requesting that the user insert a film strip and press a "begin scan" button that is displayed on the touch-screen monitor. When a user presses the "begin scan" button, a begin scan signal is sent from computer 372 to controller board 346, where it is stored and later processed as described below.

As shown in FIG. 26A, the next step after the pushbuttons are checked is to check whether film drive 316 is idle. If film drive 316 is not idle, the scanner is in the middle of a scan and the controller program jumps to the "kick the dog" block. "Kick the dog" means that a watchdog timer is reset. A watchdog timer is continuously running during operation of controller 348. If the watchdog timer exceeds a predetermined amount of time, controller 348 is reset and the controller program is executed from the beginning. The purpose of the watchdog timer is to prevent controller 348 from getting hung up in an endless loop. Thus, during normal program execution, the watchdog timer is periodically reset before it reaches the predetermined amount of time.

If film drive 316 is idle, controller 348 checks whether light source 308 is strobing. Strobing is an undesirable effect that occasionally occurs in flourescent light bulbs where light bands appear to be moving back and forth along the length of the bulb. If the light source is strobing, controller 348 varies the intensity of the light source slightly, which typically eliminates the strobing effect.

Figure 34:
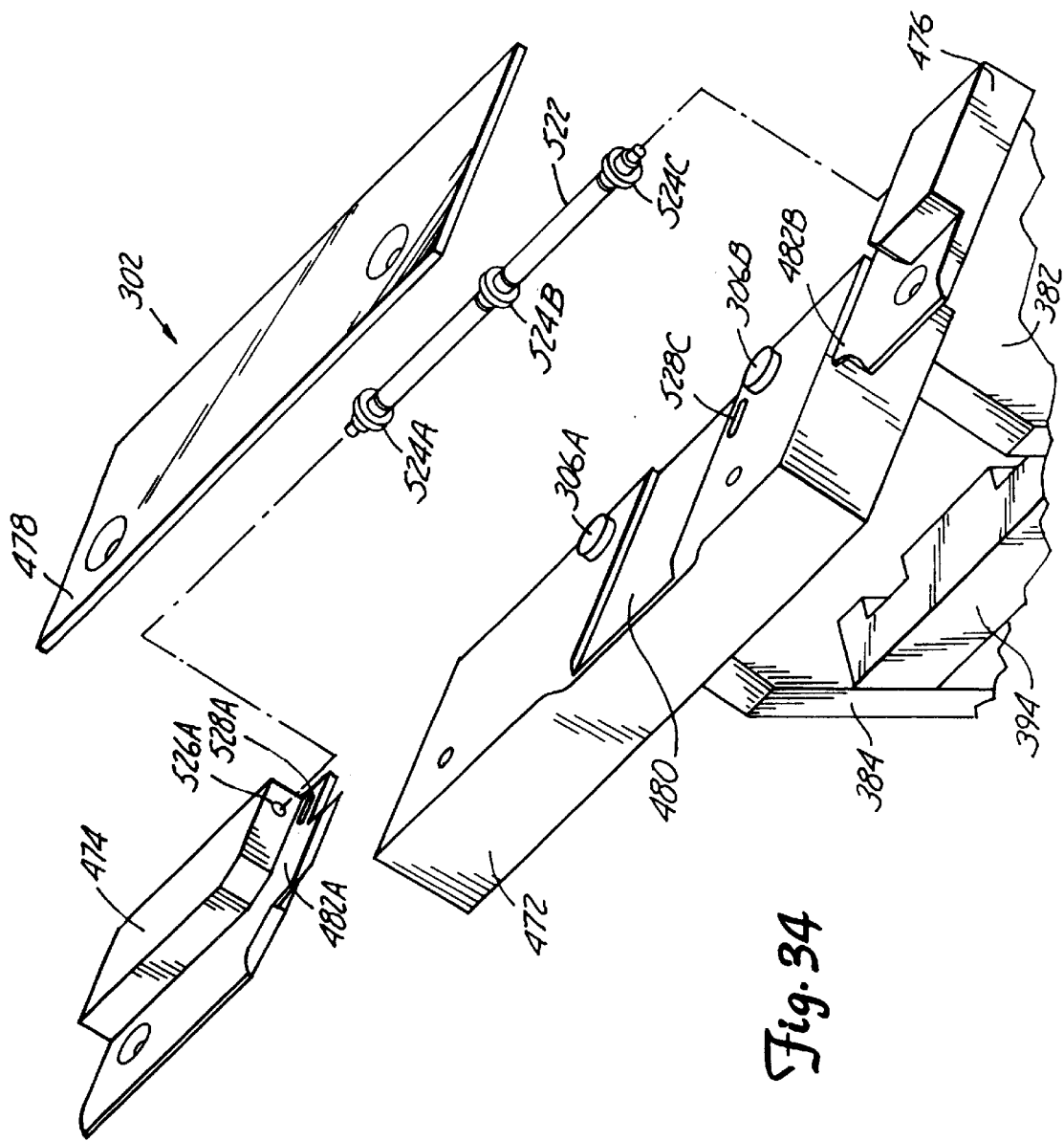
FIG. 34 is an exploded perspective view of the film loading platform of the scanner with adjustable resolution.

After the light intensity has been varied, if necessary, the next step executed by controller 348 is to check for a command from computer 372. If a command has been entered, controller 348 services the command as described above. If no command has been entered, controller 348 reads the film entry sensors 306 and film exit sensor 314. When a film strip is inserted into scanner 305, film entry sensors 306 detect what type of film is present. The location of film entry sensors 306 on scanner 305 is shown in FIG. 34. Film entry sensors 306 are photodiodes that emit light and also detect the emitted light when it is reflected back toward the photodiode. If a film strip is placed in front of one of film entry sensors 306, the light is reflected off the film strip and detected by the film entry sensor. If there is no film strip in front of one of film entry sensors 306, the light emitted by the film entry sensor will not be reflected. Each film entry sensor 306 provides an analog signal to an A/D converter on controller 348. Controller 348 converts the analog signals from film entry sensors 306 to digital values and examines the digital values to determine what type of film is present. Controller 348 then determines whether the common guide track 407 (consisting of right guide track 403, shown in FIG. 27, and left guide track 405, shown in FIG. 32) is the proper width for the type of film present in the scanner. If common guide track 407 is not at the proper width, controller 348 sends a signal to solenoids 370 (shown in FIG. 27), which respond by adjusting the width of the common guide track (as discussed with respect to FIG. 27).

After the common guide track is adjusted to the proper width, the next step executed by controller 348, as shown in FIG. 26A, is to check for a scan request. As described above, a scan is typically initiated by pushing a start scan button on scanner 305. This results in a dialogue box being displayed on monitor 54. If a user selects "begin scan" from the dialogue box, computer 372 generates a scan request that is sent through digitizer board 332, to controller board 346 where it is stored. When controller board 346 receives a scan request, controller 348 sends a signal to film drive 316, commanding the film drive to begin operating at a specified speed. In response, film drive 316 begins driving the film strip through the scanner at the specified speed.

As a film strip is advanced past light source 308, an image 83 (shown in FIG. 25) is created. Image 83 is directed onto light sensor 86 by lens 318. The conversion of image 83 to digital data is similar to the process described above with reference to FIG. 4. Red, green and blue intensity signals are generated by light sensor 86 and sent to amplifier 90. Signal generator 324 sends a synchronization signal to digitizer board 332, identifying each new line of intensity signals. Amplifier 90 amplifies the analog intensity signals and outputs the amplified signals to A/D converter 92. A/D converter 92 converts the analog intensity signals to 10 bit digital intensity values. A/D converter 92 outputs the digital intensity values to LUT circuit 338. LUT circuit 338 maps the 10-bit intensity values to 8-bit values. The 8-bit values are then stored in buffer 342. The 8-bit intensity values are also output from LUT circuit 338 to logic array 340. Logic array 340 performs various calculations on the intensity values, such as calculating the minimum and maximum values, and the average intensity of rows and columns of intensity values. The results of the calculations performed by logic arrary 340 are stored in buffer 342. Computer 372 obtains the 8-bit intensity data and the results of the calculations performed by logic array 340 by polling buffer 342 over the PCI bus. In response to the polling, buffer 342 transfers the data to computer 372 over the PCI bus.

As shown in FIG. 26A, the next step after checking for a scan request is to "kick the dog". The "kick the dog" step was described above, and simply means that the watch dog timer is reset. The controller program then loops back and again checks whether commands have been entered at computer 372.

When computer 372 receives image intensity data from digitizer board 332, the image intensity data is initially stored in buffer 374. Image intensity data enters computer 372 too quickly to store the data immediately to hard drive 378 or low resolution buffer 376. Buffer 374, therefore, provides a temporary storage place for the image intensity data as it enters computer 372. If the resolution of a particular scan is below a specified threshold (i.e., if it is a low resolution scan), the intensity data is transferred from buffer 374 to low resolution buffer 376, which is a plurality of RAM chips in the preferred embodiment. If the resolution of a particular scan is above the specified threshold (i.e., if it is a high resolution scan), there is too much intensity data to store in buffer 376, so the intensity data is transferred from buffer 374 to hard drive 378. A portion of hard drive 378 acts as virtual memory for computer 372. The image intensity data transferred to hard drive 378 is preferably stored in virtual memory.

Application program 377 performs a variety of operations on the image intensity data stored in buffer 376 or 378. Application program 377 operates substantially the same as the algorithm shown above in FIG. 5 and the corresponding discussion of that figure, with the exception that less calculations are performed by application program 377. Instead, many of the required calculations are performed in hardware. More particularly, many of the required calculations are performed by logic array 340 (see FIG. 25 and corresponding discussion). The results of these calculations are then transferred to, and used by, application 377, to perform the functions shown in FIG. 5 (e.g., boundary identification, gamma correction, color correction, and intensity range expansions). By using dedicated hardware to perform these time-consuming calculations, the overall speed of scanning system 299 is greatly increased. After the various manipulations have been made to the image intensity data, the digital images are displayed on monitor 54 and/or printed with printer 100.

Figure 27:
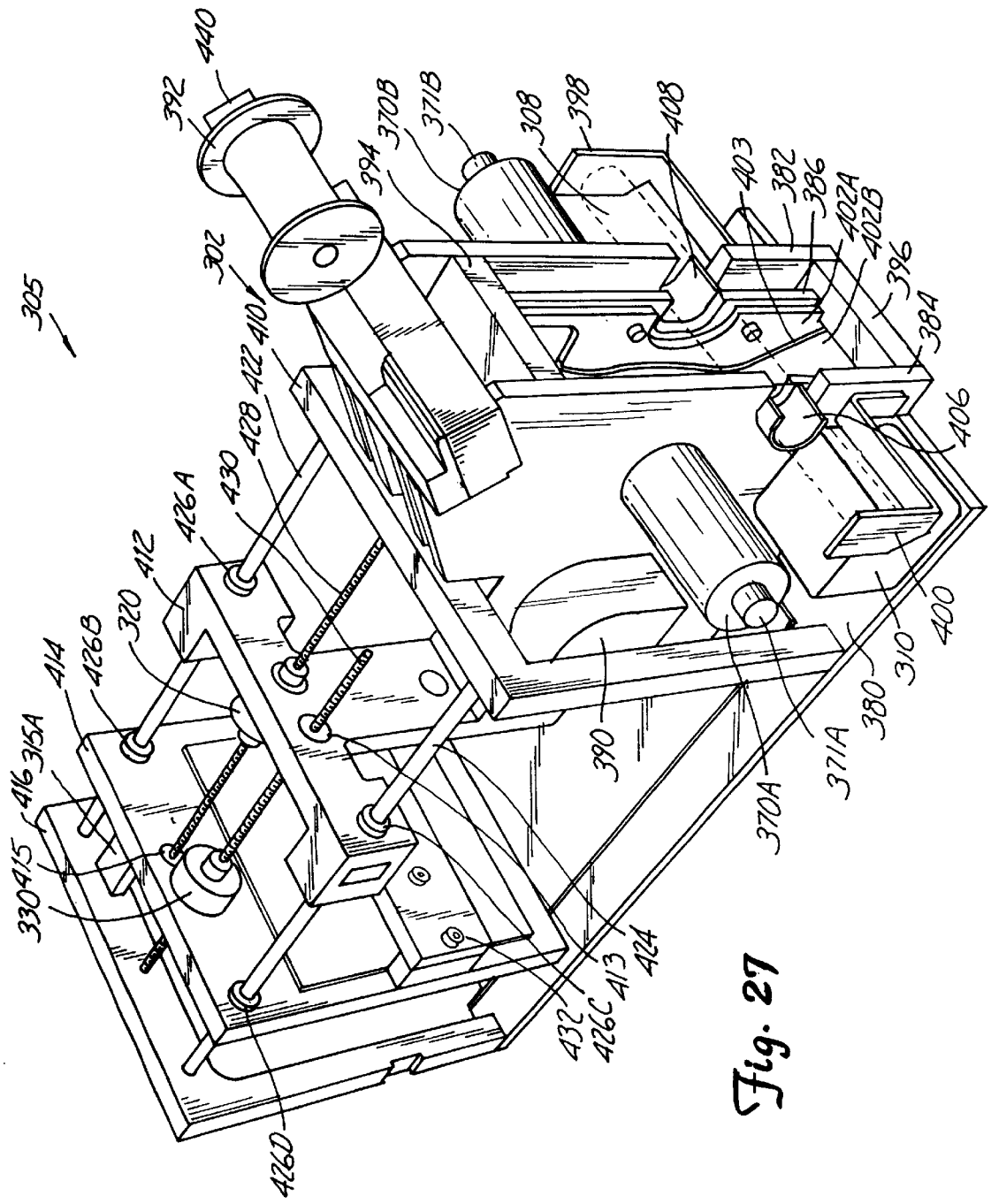
FIG. 27 is a perspective view of the left side of the scanner with adjustable resolution.

FIGS. 27–36 show the mechanical construction of scanner 305. FIG. 27 is a perspective view of the left side of scanner 305. Scanner 305 includes film entry platform 302, light source 308 (shown in hidden lines), base plate 380, right side plate 382, left side plate 384, right slide plate 386, left slide plate 388, spool 392, separator 394, separator 396, right S-bracket 398, left S-bracket 400, right guides 402A and 402B (collectively referred to as right guides 402), left guides 404A and 404B (shown in FIG. 32), light shields 406 and 408, front frame 410, lens support 412, light sensor support 414, back frame 416, support rods 422 and 424, bearings 426A–D (collectively referred to as bearings 426), motor guides 428 and 430, light sensor assembly 432, ballast 310, solenoids 370A and 370B (collectively referred to as solenoids 370), light sensor board 326, motor 320, motor 330, motor 390, and position sensor 315A.

Left side plate 384 and right side plate 382 are mounted to base plate 380, and are attached together by separators 394 and 396. Solenoid 370A is mounted to left side plate 384, and solenoid 370B is mounted to right side plate 382. Solenoid 370A includes shaft 371A that extends through an opening in left side plate 384 and is attached to left slide plate 388. Solenoid 370B includes shaft 371B that extends through an opening in right side plate 382 and is attached to right slide plate 386. Right guides 402A and 402B are attached to right slide plate 386, and left guides 404A and 404B (shown in FIG. 32) are similarly attached to left slide plate 388. Right guide 402A and left guide 404A are preferably made of a substantially transparent material to allow light from light source 308 and from LEDs 462 (shown in FIG. 32) to pass through the guides. Right guide track 403 is a narrow channel formed between right guides 402A and 402B. Similarly, left guide track 405 is a narrow channel formed between left guides 404A and 404B. Right guide track 403 and left guide track 405 make up common guide track 407, and guide a film strip through scanner 305. Right guide 402A and left guide 404A are preferably spring-loaded to maintain a constant pressure against a film strip. Thus, when a thick film strip is inserted in scanner 305, the film strip pushes guides 402A and 404A outward and expands guide tracks 403 and 405. When a thin film strip is inserted in scanner 305, the springs in right guide 402A and left guide 404A push these guides back toward guides 402B and 404B to narrow guide tracks 403 and 405, and maintain a constant pressure on the film strip. The use of continuous guides as shown in FIG. 27 helps prevent a film strip from getting jammed in scanner 305, especially when a film strip is brought back into the scanner in the reverse direction.

The width of common guide track 407 (i.e., the distance between right guides 402 and left guides 404) is adjustable by solenoids 370. The width of common guide track 407 is adjusted similarity to the embodiment described above with reference to FIG. 10. Instead of adjusting only one slide plate as described above, however, scanner 305 adjusts both left slide plate 388 and right slide plate 386. Adjusting both slide plates rather than a single slide plate allows scanner 305 to focus a film image on the full range of photosites of light sensor 86, rather than just the photosites on one side of the light sensor.

Ballast 310 is mounted to base plate 380. Ballast 310 provides an AC signal to light source 308 that varies in amplitude in accordance with the amplitude of a DC signal received from controller 348 (shown in FIG. 25).

Motor 390 is mounted to left side plate 384. Motor 390 is preferably a stepper motor that is driven by pulses generated by controller 348. Motor 390 drives a shaft (not visible) that extends through scanner 305 and is attached to drive wheel 160 (shown in FIG. 28), which is mounted on right side plate 382. When motor 390 drives the shaft connected to it, the shaft causes drive wheel 160 to rotate.

Left S-bracket 400 is attached to left side plate 384, and right S-bracket 398 is attached to right side plate 382. Light source 308 is mounted between left S-bracket 400 and right S-bracket 398. Light source 308 is preferably a fluorescent bulb that includes a reflective coating over substantially the entire inner surface of the bulb, except for a rectangular section or aperture, which faces light sensor 86. Since the aperture of light source 308 is not covered by a reflective coating, most of the light generated by light source 308 is projected through the aperture. The aperture is located between slide plates 386 and 388. The opening of the aperture is preferably around 30 degrees. The use of the reflective coating and aperture results in a more intense light being generated by light source 308. A higher intensity is desirable for higher resolution scans because the light is spread out over a larger number of photosites. Also, the higher intensity allows for faster scanning of a film strip because a smaller integration period for light sensor 86 can be used. Clamp 455 (shown in FIG. 31) holds light source 308 in place, and ensures that the aperture of the light source is directed at light sensor 86.

Light shield 406 is attached to left slide plate 388 and light shield 408 is attached to right slide plate 386. Light shields 406 and 408 are substantially circular in cross section, and have a slightly larger radius than light source 308 so as not to come in contact with the light source when slide plates 386 and 388 are moved. When slide plates 386 and 388 are pushed towards each other by solenoids 370, light shields 406 and 408 also move closer together and prevent light from being projected through the space between left side plate 384 and left slide plate 388, and the space between right side plate 382 and right slide plate 386. Thus, the only light projected on light sensor 86 is the light projected through a film strip.

Film entry platform 302 is mounted to left side plate 384 and right side plate 382. Film strips are inserted into scanner 305 through film entry platform 302. Film entry platform 302 detects what type of film is being inserted (by film entry sensors 306 shown in FIG. 34) and then guides the film toward common guide track 407. Film entry platform 302 is described in more detail with reference to FIGS. 33 and 34.

Spool 392 is rotatably mounted to film loading platform 302 by bracket 440. Spool 392 facilitates the feeding of long strips of film, or reels of film, into film entry platform 302. Spool 392 may be coated with a sticky substance for removal of dust and other particles from a film strip prior to scanning. Alternatively, a separate roller containing a sticky substance may be placed within scanner 305 to facilitate the removal of dust.

Front frame 410 and back frame 416 are mounted to base plate 380. Support rods 422 and 424 are mounted between front frame 410 and back frame 416. Lens support 412 and light sensor support 414 are slidably mounted to support rods 422 and 424. Lens support 412 includes bearings 426A and 426C to reduce the friction between the lens support and support rods 422 and 424. Similarly, light sensor support 414 includes bearings 426B and 426D to facilitate movement of light sensor support 414 over rods 422 and 424.

Motor 320 is mounted to lens support 412. Motor 330 is mounted to light sensor support 414. Motor guide 428 is mounted to front frame 410, extends through lens support 412, extends through motor 320 and also extends through hole 415 on light sensor support 414. Motor guide 430 is mounted to back frame 416, extends through light sensor support 414, extends through motor 330, and extends through hole 413 on lens support 412. Motor guides 428 and 430 are threaded. Motor 320 engages the threads on motor guide 428 and moves lens support 412 along motor guide 428 when motor 320 is driven. When motor 330 is driven, it engages the threads on motor guide 430 and moves light sensor support 414 along motor guide 430. Motors 320 and 330 are controlled by controller 348 (shown in FIG. 25). Controller 348 drives motors 320 and 330 to move light sensor 86 (attached to light sensor support 414) and lens 318 (contained within lens support 412) into the appropriate positions to obtain the proper focus and resolution.

Light sensor board 326 is mounted to light sensor support 414. Light sensor assembly 432 is mounted to light sensor support 414 and to light sensor board 326. Light sensor assembly 432 includes light sensor 86 (not visible). Light sensor assembly 432 is shown in more detail in FIG. 36.

Position sensor 315A is attached to the top of back frame 416. Position sensor 315B (shown in FIG. 29) is attached to the top of front frame 410. When light sensor support 414 comes in contact with position sensor 315A, the position sensor sends a signal to controller board 346, informing the controller board that light sensor support 414 has reached the end of its allowable movement. In response, controller board 346 generates a signal to stop motor 330. Similarly, when lens support 412 comes in contact with position sensor 315B, the position sensor sends a signal to controller board 346, which informs the controller board that lens support 412 has reached the end of its allowable movement. Controller board 346 then generates a signal to stop motor 320. When scanner 305 first starts up, light sensor support 414 and lens support 412 are preferably moved until they come in contact with their respective position sensors. The position of supports 412 and 414 when they come in contact with their respective position sensors is referred to as the starting positions of the supports. When a particular scanning resolution is entered in computer 372, supports 412 and 414 are preferably moved from their starting positions to the correct position to obtain the desired resolution.

Figure 28:
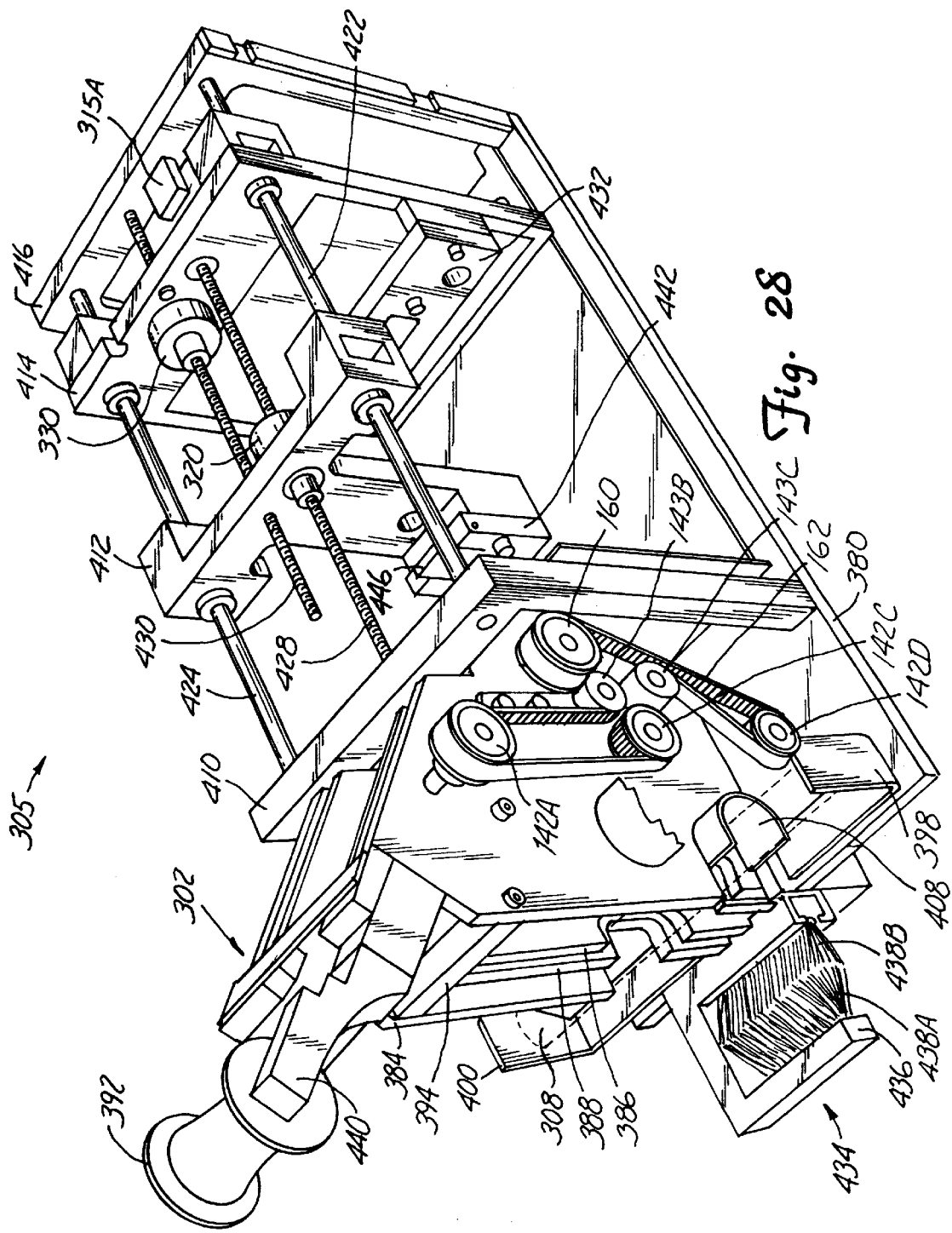
FIG. 28 is a perspective view of the right side of the scanner with adjustable resolution.

FIG. 28 is a perspective view of the right side of scanner 305. Scanner 305 includes pulleys 142, drive wheel 160, belt guides 143 and belt 162, all of which operate as described with reference to FIG. 11. Pulleys 142, drive wheel 160, belt guides 143 and belt 162 make up a portion of film drive 316 (shown in FIG. 25). Film drive 316 also includes motor 390 (shown in FIG. 27), right rollers 144 (not visible), left rollers 164 (shown in FIG. 32), and shafts 156 (shown in FIG. 32). Film drive 316 operates similarly to film drive 88 described above with respect to FIG. 10. When pulleys 142 are rotated by drive wheel 160 and belt 162, shafts 156 cause left rollers 144 and right rollers 164 to rotate. The left edge of a film strip is squeezed between left rollers 144 and left pressure rollers 167 (shown in FIG. 32), and the right edge of a film strip is squeezed between right rollers 144 and right pressure rollers 148 (not visible). The film strip is driven through the scanner when rollers 144 and 164 are rotated.

Brush assembly 434 consists of brush frame 436 and bristles 438A and 438B. Brush frame 436 is mounted to right side plate 382 and left side plate 384. Bristles 438A and 438B are attached to brush frame 436, extend out therefrom and meet at the center of the brush frame. Bristles 438A and 438B are made from a flexible, conductive material. Brush assembly 434 is preferably used when long strips of film or reels of film are scanned. Brush assembly 434 removes static electricity from a film strip prior to scanning. Before a film strip is scanned, it passes between bristles 438A and 438B, wraps around spool 392, and then enters scanner 305 through film entry platform 302. As the film strip is driven through scanner 305, bristles 438A and 438B contact the film strip and remove static electricity from it by providing a conductive path from the film strip to ground.

Figure 30:
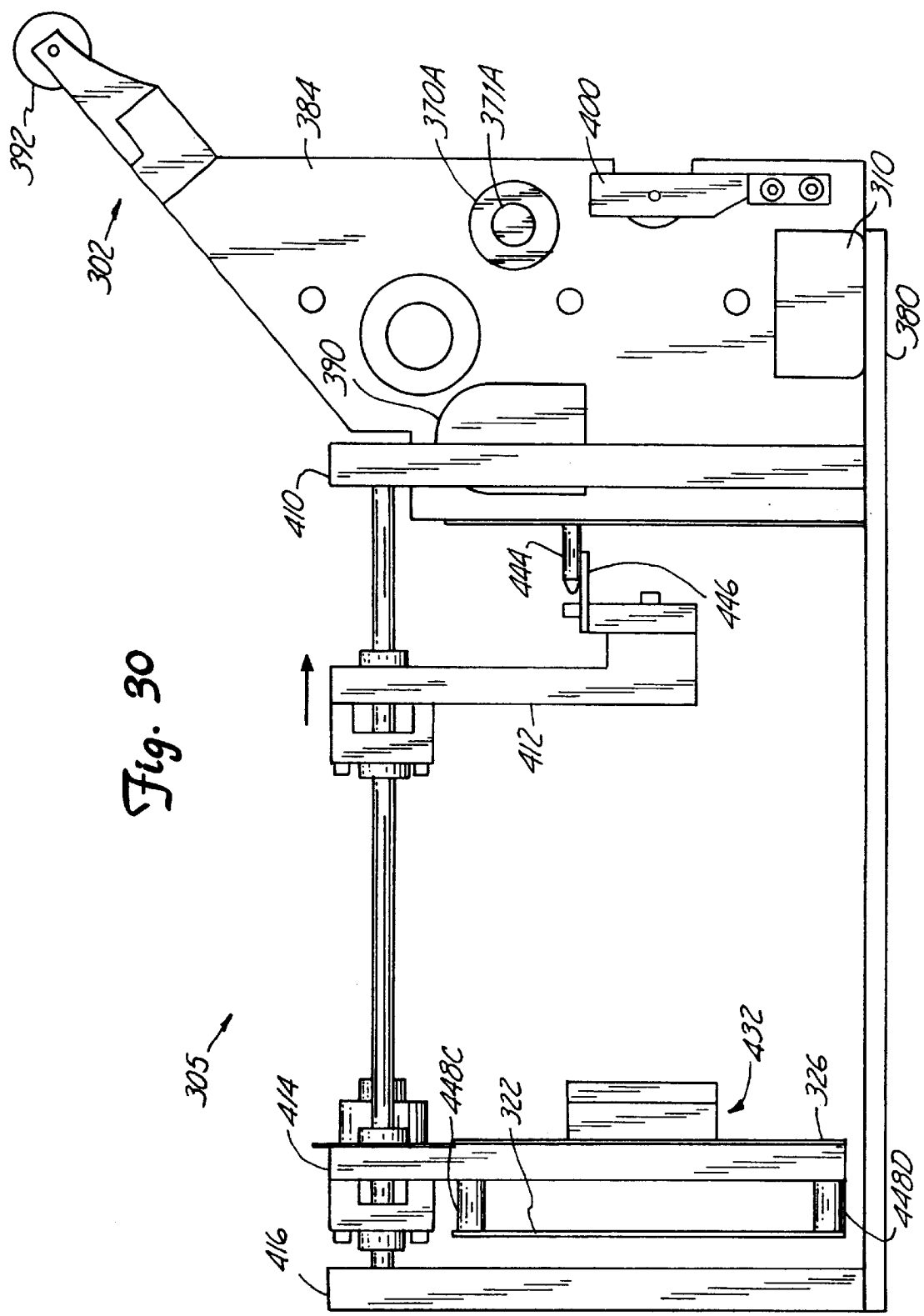
FIG. 30 is a side view of the left side of the scanner with adjustable resolution.

FIG. 28 also shows filter assembly 442. Filter assembly 442 is located in front of lens 318 (not visible), which is contained within lens support 412. Filter assembly 442 includes filter holder 446 and filter 450 (not visible). Filter 450 is contained within filter holder 446. Filter 450 limits the intensity of light that is projected through lens 318 and onto light sensor assembly 432. Filter 450 is only used for lower resolution scans, which do not require as high of a light intensity as high resolution scans. For higher resolution scans, filter 450 is lifted away from lens 318 by post 444 (as shown in FIG. 30). Filter assembly 442 is shown in greater detail in FIG. 35. Alternatively, an adjustable aperture could be used in place of filter assembly 442 to limit the intensity of light projected onto light sensor 86. The adjustable aperture allows more light to be projected onto light sensor 86 for higher resolution scans, and less light for lower resolution scans.

Figure 29:
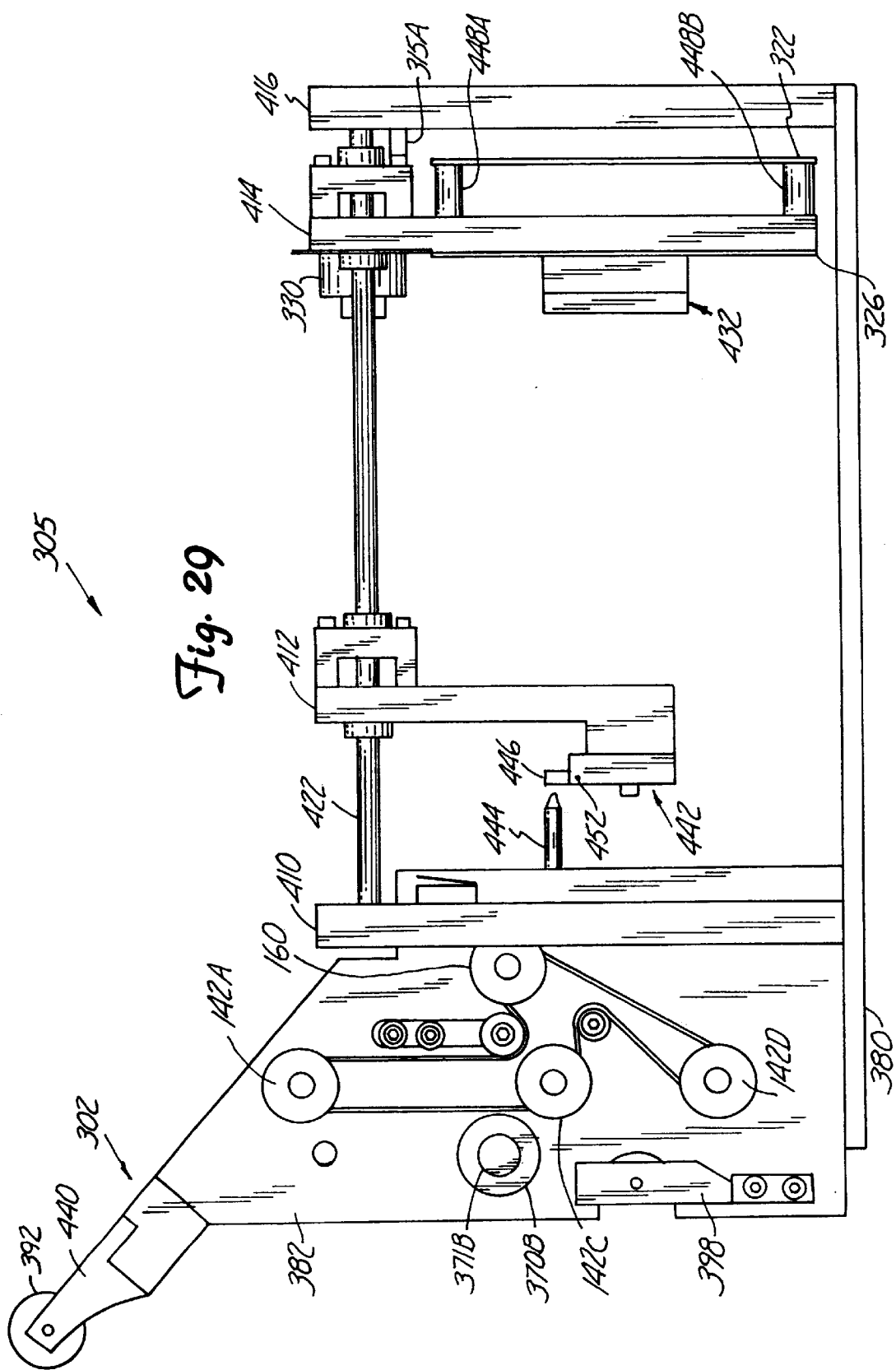
FIG. 29 is a side view of the right side of the scanner with adjustable resolution.

FIG. 29 is side view of the right side of scanner 305. Post 444 extends out from front frame 410 and is aligned with the top of filter holder 446. When lens support 412 moves sufficiently close to front frame 410, post 444 comes in contact with filter holder 446. As lens support 412 moves closer to front frame 410, post 444 pushes against filter holder 446, causing filter holder 446 to rotate clockwise around pin 452 and be positioned parallel to, and directly under, post 444 (as shown in FIG. 30). When filter holder 446 is pushed parallel to post 444, filter 450, which is within filter holder 446, is pushed away from lens 318 (which is contained within lens support 412) and no longer limits the intensity of light projected through lens 318 and onto light sensor assembly 432.

FIG. 29 also shows signal generator board 322, which is mounted to light sensor support 414. Signal generator board 322 is separated from light sensor support 414 by spacers 448. Signal generator board 322 moves along with light sensor board 326 when light sensor support 414 is driven by motor 330.

FIG. 30 is a side view of the left side of scanner 305. As seen in FIG. 30, lens support 412 has moved sufficiently close to front frame 410 to cause post 444 to come in contact with filter holder 446 and push it parallel to the post.

FIG. 31 is a front view of scanner 305. Solenoid 370A is mounted to left side plate 384 and solenoid 370B is mounted to right side plate 382. Solenoid 370A includes rod 454A which extends through left side plate 384 and is attached to left slide plate 388. Solenoid 370B includes rod 454B which extends through right side plate 382 and is attached to right slide plate 386. When solenoids 370 are energized, rods 454 push slide plates 386 and 388 toward each other, thereby narrowing common guide track 407. When solenoids 370 are deenergied, rods 454 pull slide plates 386 and 388 away from each other, thereby widening common guide track 407. The hidden lines in FIG. 31 indicate the position of slide plates 386 and 388 when solenoids 370 are deenergized. Rather than attaching rods 454 to slide plates 386 and 388, springs 168 (shown in FIGS. 13 and 14) can be placed between slide plates 386 and 388, such that the springs push slide plates 386 and 388 away from each other when solenoids 370 are deenergized (as opposed to slide plates 386 and 388 being pulled by rods 454). Alternatively, rods 454 could remain attached to slide plates 386 and 388, and work in conjunction with springs 168 to push the slide plates away from each other when solenoids 370 are deenergized.

Sensor support 456 is mounted to base plate 380 (shown in FIG. 27), and extends upward therefrom. Film exit sensor 314 is attached to sensor support 456. As discussed above, film exit sensor 314 detects whether a film strip is present at the bottom of film scanner 305. Film exit sensor 314 helps ensure that there is no film in the scanner when the width of the common guide track is adjusted. Thus, if a first film strip is being scanned, and a second film strip, which requires an adjustment in the width of the common guide track, is inserted in scanner 305, film exit sensor 314 will detect the presence of the first film strip, and the width of common guide track 407 will not be adjusted until the first film strip has exited the scanner.

FIG. 31 also shows sensor supports 458A and 459A. Sensor support 458A is mounted to left slide plate 388 and sensor support 459A is mounted to right slide plate 386. LED 462A of DX code sensor 312 is attached to sensor support 458A. LED 462B (not shown) of DX code sensor 312 is attached to sensor support 459A. As described above, DX code sensors 312 detect any DX codes contained on a film strip.

Screws 520A and 520B, as shown in FIG. 31, are attached to left side plate 384 and right side plate 382, respectively. Screws 520 protrude out from side plates 382 and 384 and extend through holes in slide plates 386 and 388 near common guide track 407 (see FIG. 32 showing the position of screw 520A with respect to guide track 405). When APS film is being scanned, screws 520 do not extend far enough through slide plates 382 and 384 to affect the scan. However, when 35 mm film is being scanned, slide plates 386 and 388 are closer to side plates 382 and 384 (as shown with hidden lines), and screws 520 extend past slide plates 386 and 388 about a quarter of an inch. When light is projected through a 35 mm film strip, screws 520 block the light projected through the sprocket holes of the film strip. It is desirable to block the light projected through the sprocket holes to prevent corruption of the digital image of the film strip. The light projected through the sprocket holes is pure white light and may cause light sensor 86 to become saturated and create a bleeding effect. The use of screws 520 to block this pure white light helps prevent a bleeding effect.

Clamp 455 is attached to right S-bracket 398 and is wrapped around light source 308. Clamp 455 prevents light source 308 from rotating, and thereby ensures that the aperture of light source 308 is aligned with light sensor 86.

FIG. 32 is a sectional view of scanner 305 viewed along section 32–32 of FIG. 31. Left rollers 164 and left pressure rollers 167 are rotatably mounted to left slide plate 388. Shafts 156 extend through left rollers 164, and cause left rollers 164 to rotate when shafts 156 are driven by motor 390 (shown in FIG. 27). The left edge of a film strip is guided through scanner 305 by left guide track 405 formed between left guides 404A and 404B. The left edge of a film strip is squeezed between left rollers 164 and left pressure rollers 167, and the film strip is advanced when the rollers rotate. Similarly, right rollers 144 and right pressure rollers 148 (not shown) are rotatably mounted to right slide plate 386 in the same manner as described above with respect to left rollers 164 and left pressure rollers 167.

Left guides 404A and 404B are mounted to left slide plate 388. Left guide 404A covers left pressure rollers 167, and left guide 404B partially covers left rollers 164. Right guides 402A and 402B (shown in FIG. 27) are similarly mounted to right slide plate 386. Guide rollers 174 and 460 are mounted to left slide plate 388, extend through left guides 404, and extend out therefrom approximately one inch. Guide rollers 174 and 460 guide the middle portion, or image portion, of a film strip, and help eliminate any transverse curvature in the film.

Sensor support 458A is mounted to left slide plate 388 and protrudes through an opening in left guide 404A. LED 462A is attached to sensor support 458A. Sensor support 458B is also mounted to left slide plate 388 and protrudes through left guide 404B. Phototransistors 464A and 466A are attached to sensor support 458B. LED 462A and phototransistors 464A and 466A make up a portion of DX code sensors 312 (shown in FIG. 25). The remainder of DX code sensors 312 consists of LED 462B and phototransistors 464B and 466B (not shown), which are all attached to right slide plate 386 in the same manner as LED 462A and phototransistors 464A and 466A are attached to left slide plate 388. LED 462B is attached to sensor support 459A (shown in FIG. 31), and phototransistors 464B and 466B are attached to sensor support 459B (not shown).

Due to the narrowness of DX code strips, phototransistors 464 and 466 can not be positioned directly in line with the strips of DX code data. Thus, tiny fiber optic cables 468 and 470 are used to guide the light projected through the DX code strips to phototransistors 464 and 466. Fiber optic cable 468A is attached to phototransistor 464A and extends out therefrom to left guide track 405. Fiber optic cable 470A is attached to phototransistor 466A and extends out therefrom to left guide track 405. Although fiber optic cables 468A and 470A appear to merge together near left guide track 405, they are actually positioned adjacent to each other so that each is aligned with the expected position of a line of DX code data from a film strip. Fiber optic cables 468B and 470B (not shown) are similarly attached to right slide plate 386. As discussed above, LEDs 462A and 462B project light through the edge of a film strip where DX code data is located. The projected light is received by fiber optic cables 468A, 468B, 470A and 470B, and guided to their corresponding phototransistors. Each phototransistor sends signals to controller 348 (shown in FIG. 25) indicating the intensity of light received from its corresponding fiber optic cable. Controller 348 then identifies the DX code contained on the film based on the signals received from the phototransistors.

Figure 33:
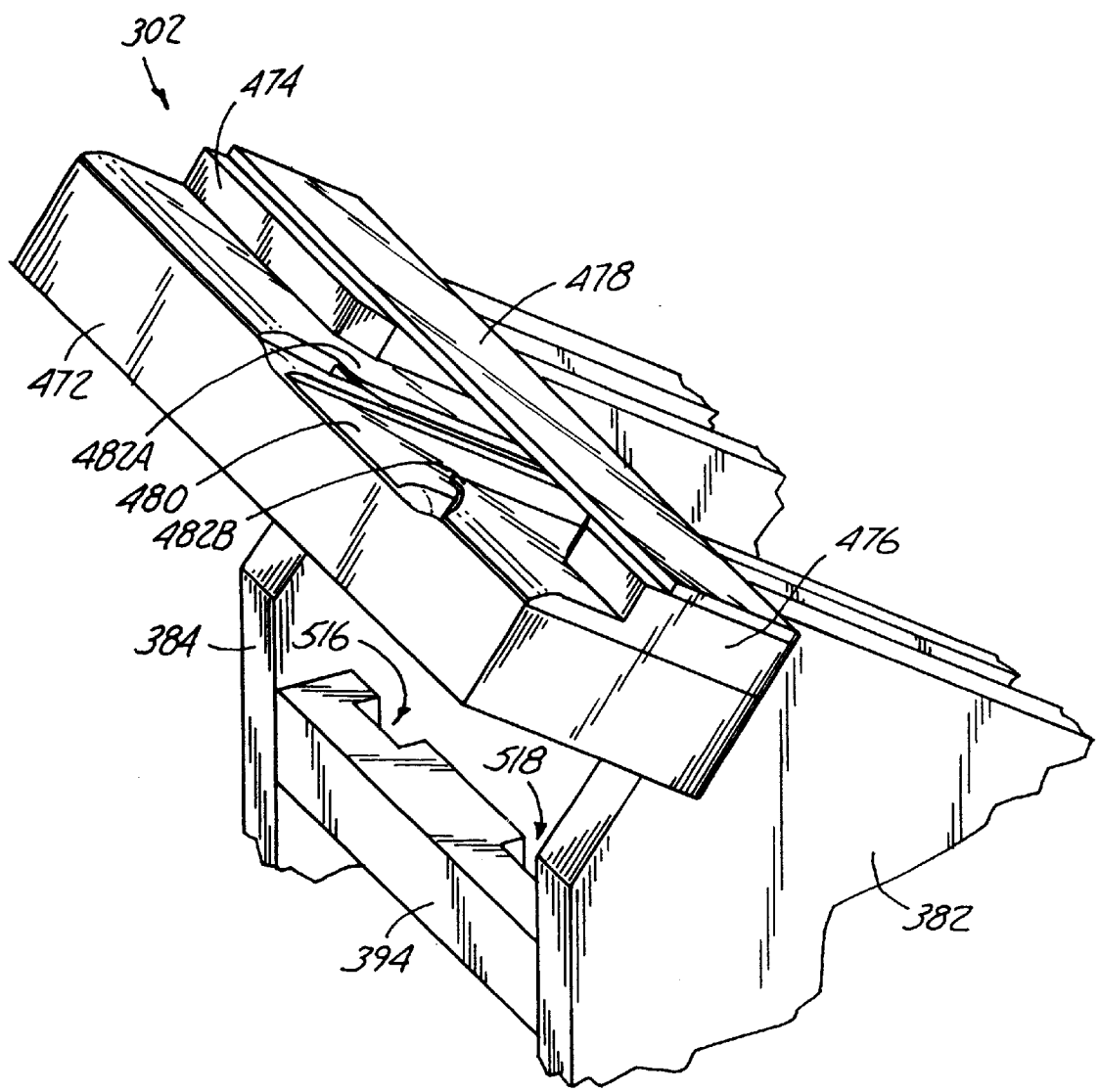
FIG. 33 is a perspective view of the film loading platform of the scanner with adjustable resolution.

FIG. 33 is a perspective view of film entry platform 302. Film entry platform 302 includes base 472, guide 474, guide 476 and cover 478. Base 472 is mounted to left side plate 384 and right side plate 382. Guides 474 and 476 are attached to base 472. Cover 478 is attached to guides 474 and 476. Channel 480 is formed in base 472. Guide 474 includes flange 482A, and guide 476 includes flange 482B. Narrow film strips, such as APS film, are inserted in film entry platform 302 between channel 480 and flanges 482. Wider film strips, such as 35 mm film, are inserted in film entry platform 302 above flanges 482 and below cover 478.

Separator 394 is mounted between left side plate 384 and right side plate 382. Separator 394 includes notches 516 and 518 that face inward toward scanner 305. Notches 516 and 518 define stopping points for slide plates 386 and 388. An edge of left slide plate 388 fits in notch 516 and an edge of right slide plate 386 fits in notch 518. When 35 mm film is inserted in scanner 305, slide plates 386 and 388 are pushed outward and are stopped by the outer edges of notches 516 and 518. When APS film is inserted in scanner 305, slide plates 386 and 388 are pushed toward each other and are stopped by the inner edges of notches 516 and 518. Similar notches are formed in separator 396 shown in FIG. 27.

FIG. 34 is an exploded perspective view of film entry platform 302. With cover 478 removed, guide rod 522 is visible. Guide rod 522 is rotatably mounted between bore 526A formed in guide 474, and bore 526B (not visible) formed in guide 476. O-rings 524A–524C surround guide rod 522 and are engaged with guide rod 522 such that they cause guide rod 522 to rotate when the O-rings rotate. O-rings 524A–524C are located over channel 480 and help eliminate any transverse curvature of a film strip as it is inserted in scanner 305. Also visible in FIG. 34 are film entry sensors 306. Film entry sensors 306A and 306B are located in base 472. When film entry platform 302 is assembled, hole 528A formed in guide 474 is aligned directly over film entry sensor 306A. Similarly, hole 528B (not visible) formed in guide 476 is aligned directly over film entry sensor 306B. Film entry sensors 306A and 306B detect whether 35 mm film is present in film entry platform 302. The left edge of a 35 mm film strip is detected when it passes over hole 528A in guide 474. The right edge of a 35 mm film strip is detected when it passes over hole 528B in guide 476. Film entry sensor 306C is located within base 472 directly under hole 528C. Film entry sensor 306C detects whether APS film is present in film entry platform 302.

Figure 35:
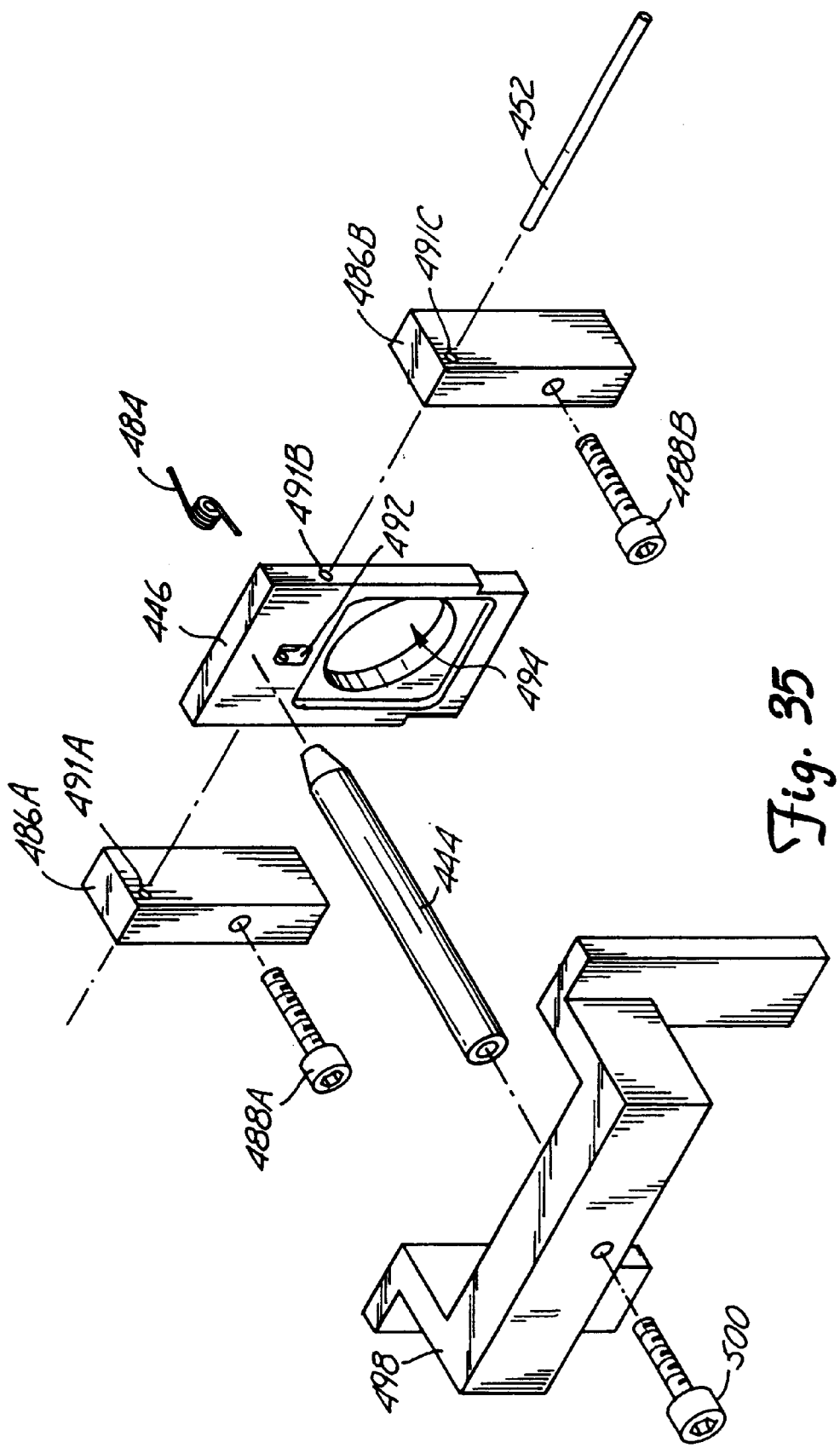
FIG. 35 is an exploded perspective view of the filter assembly of the scanner with adjustable resolution.

FIG. 35 is an exploded perspective view of filter assembly 442. Filter assembly 442 includes filter holder 446, spring 484, blocks 486A and 486B, screws 488A and 488B, and pin 452. When assembled, blocks 486 are directly adjacent to filter holder 446, and filter holder 446 is rotatably mounted between blocks 486 by pin 452. Spring 484 is located in opening 492 of filter holder 446. Pin 452 extends through bore 491C of block 486B, extends through bore 491B of filter holder 446, extends through spring 484, and also extends through bore 491A of block 486A. Blocks 486 are attached to lens support 412 (shown in FIG. 27) by screws 488. Filter 494 (not shown) is located in hole 496 of filter holder 446. Filter holder 446 is rotated about pin 452 by post 444, which pushes against the top of filter holder 446 when filter assembly 442 comes sufficiently close to post 444. Post 444 is mounted to post support 498 by screw 500. Post support 498 is mounted to front frame 410 (shown in FIG. 27). When post 444 comes in contact with filter holder 446, post 444 causes the bottom of filter holder 446 to lift up so that filter holder 446 is positioned directly below and parallel to post 444 (as shown in FIG. 30). Spring 484 rests against lens support 412 (shown in FIG. 27) such that it causes filter holder 446 to return to its lowered position after post 444 is no longer in contact with filter holder 446.

FIG. 36 is an exploded perspective view of light sensor assembly 432. Light sensor assembly 432 includes cover 505, blocks 502A and 502B, spacer 504 and screws 506A and 506B. Spacer 504 fits over light sensor 86 (shown in FIG. 25) and holds light sensor 86 in place against light sensor board 326 (shown in FIG. 27). Spacer 504 includes opening 512 which is positioned over the photosites of light sensor 86. Cover 505 fits snugly against spacer 504. Cover 505 is mounted to light sensor board 326 by screws 506A and 506B, which are inserted through bores 508A and 508B of cover 505, and through bores 510A and 510B of spacer 504. Cover 505 includes opening 514 which is substantially the same size as opening 512 of spacer 504. Cover 505 is separated from light sensor board 326 by blocks 502A and 502B.

FIG. 37 shows another embodiment of the present invention. Film scanner 550 is substantially similar to the embodiments described above, except that it has fixed resolution and an autofocus feature. Scanner 550 includes base plate 380, autofocus apparatus 551, frame 564, light sensor board 566 and light sensor 86. Frame 564 is mounted to base plate 380. Light sensor board 566 is attached to frame 564. Light sensor 86 is mounted on light sensor board 566.

Autofocus apparatus 551 includes motor 552, motor support 554, shaft support 556, shaft 558, bearing 560, and lens assembly 562. Motor support 554 is mounted to base plate 380. Shaft support 556 is also mounted to base plate 380. Shaft 558 is mounted between motor support 554 and shaft support 556. Bearing 560 is slidably mounted on shaft 558. Lens assembly 562 is mounted to bearing 560. Lens assembly 562 includes aperture 568. Aperture 568 is approximately a quarter of an inch in diameter at its narrowest point, and preferably becomes wider so that the angle of the opening is about 82 degrees. Shaft 563 is mounted between lens assembly 562 and motor 552. Motor 552 is mounted to motor support 554. Motor 552 drives shaft 563 back and forth, and correspondingly drives lens assembly 562 and bearing 560 back and forth along shaft 558. The range of motion of bearing 560 is limited by shaft support 556 and motor support 554.

The autofocus feature of film scanner 550 allows the focus to be easily and accurately adjusted after the scanner is constructed. The focus is preferably adjusted using a calibration film strip that has a series of black lines running parallel to each other along the length of a film strip. The black lines are separated from each other by white space. As the calibration film strip is being scanned, motor 552 periodically moves lens assembly 562 to different positions. Thus, the digital image of the film strip (which is obtained as described above), will effectively be divided up into a series of rectangular sections, with each section having a different focus. The optimum focus is obtained by analyzing the image intensity data as the film strip is being scanned. For each position of lens assembly 562, the image intensity data is analyzed and the contrast between each black line and the white space adjacent to that black line is determined. If lens assembly 562 is moving in a particular direction, and the contrast is decreasing in that direction, the direction of the lens assembly is reversed. The position of lens assembly 562 is adjusted until the maximum contrast between the lines and the white space is obtained. When the position of lens assembly 562 is such that the maximum contrast is obtained, the focus of scanner 550 is optimized.

After the focus of scanner 550 has been optimized, it is ready for normal operation. Since scanner 550 is a fixed resolution scanner, lens assembly 562 remains stationary during normal operation of the scanner. If the scanner later becomes out of focus, the above-described autofocus process may again be performed.

Although the present invention has been described with reference to preferred embodiments, workers skilled in the art will recognize that changes may be made in form and detail without departing from the spirit and scope of the invention.

What is claimed is:

1. A photographic film scanning system for scanning a film strip containing a plurality of photographic images and for creating a corresponding plurality of digital representations of the photographic images, the system comprising:

a light source for projecting light through the film strip;

a light sensor for sensing the light projected through the film strip and for generating pixel data, the light sensor located at a first light sensor position;

a film drive for advancing the film strip between the light source and the light sensor;

a lens located between the film strip and the light sensor for directing the light projected through the film strip onto the light sensor, the lens located at a first lens position;

adjustable resolution means for changing the position of the lens to a second lens position and for changing the position of the light sensor to a second light sensor position, wherein the change in positions of the lens and the light sensor results in a change in the scanning resolution;

means for generating a digital image of the film strip from the generated pixel data, the digital image of the film strip including the plurality of digital representations of the photographic images; and means for locating the plurality of digital representations of the photographic images in the digital image of the film strip.

2. A scanning system as claimed in claim 1 further comprising a code sensor having a light emitter, a fiber optic cable and a light detector, wherein the light emitter projects light through an edge of a film strip where coded data is located, the light projected through the film strip is guided to the light detector with the fiber optic cable, and the light detector generates signals that are representative of the coded data on the film strip.

3. A scanning system as claimed in claim 2 further comprising conversion means for converting the signals generated by the light detector into binary values, the conversion means comparing the signals generated by the light detector to a first threshold value to obtain the binary values.

4. A scanning system as claimed in claim 3 wherein the conversion means automatically adjusts the threshold value.

5. A scanning system as claimed in claim 1 wherein the film drive further comprises means for reversing the direction of advancement of the film strip so that selected images can be rescanned.

6. A scanning system as claimed in claim 1 further comprising a light filter located between the light source and the light sensor, wherein the light filter reduces the intensity of light projected on the light sensor, and means for automatically moving the light filter away from the path of light projected on the light sensor when the scanning resolution reaches a predetermined threshold.

7. A scanning system as claimed in claim 1 further comprising means for displaying the plurality of digital representations of the photographic images.

8. A scanning system as claimed in claim 1 further comprising first and second position sensors, wherein the first position sensor detects when the lens reaches a first predetermined position, and the second position sensor detects when the light sensor reaches a second predetermined position.

9. A scanning system as claimed in claim 1 wherein the light source includes a cylindrical flourescent bulb having a reflective coating over substantially the entire surface of the bulb except for an aperture portion facing the light sensor.

10. The scanning system of claim 9 further comprising a clamp attached to the cylindrical flourescent bulb to maintain the bulb in place and to ensure that the aperture portion continuously faces the light sensor.

11. A scanning system as claimed in claim 1 further comprising an anti-static electricity mechanism having a multiplicity of brush bristles electrically connected to ground, wherein static electricity is removed from a film strip prior to scanning by rubbing the film strip against the brush bristles.

12. A scanning system as claimed in claim 1 further comprising a detachable basket for catching small film strips and keeping the film strips in the same order as they were scanned.

13. A scanning system as claimed in claim 1 further comprising adjustable intensity means for changing the intensity of light generated by the light source.

14. A scanning system as claimed in claim 13 wherein the adjustable intensity means automatically changes the intensity of light generated by the light source when the adjustable resolution means changes the scanning resolution.

15. A scanning system as claimed in claim 1 further comprising means for blocking the light projected through the outer edges of a film strip where the film strip has perforations or sprocket holes, so that substantially the only light reaching the light sensor is the light projected through the portion of the film strip containing photographic images.

16. A scanning system as claimed in claim 1 further comprising means for bending the film strip longitudinally as it passes between the light source and the light sensor.

17. A scanning system as claimed in claim 1 further comprising a guide track consisting of a continuous left guide to guide a first edge of the film and a continuous right guide to guide a second edge of the film.

18. A scanning system as claimed in claim 17 wherein the left guide and right guide are spring loaded to maintain constant pressure on the edges of a film strip regardless of the thickness of the film strip.

19. A scanning system as claimed in claim 1 further comprising:

means for locating images of coded data in the digital image of the film strip; and means for identifying the located images of coded data by comparing the located images of coded data to stored image data.

20. A scanner for generating pixel data from a photographic film, the scanner comprising:

multiple inlet tracks, each inlet track adapted to receive a photographic film;

an outlet through which the film exits the scanner;

a common guide track located between the inlet tracks and the outlet, the common guide track for guiding the film from the inlet tracks to the outlet;

a film drive mechanism for advancing the film through the common guide track;

a light source for projecting light through the film;

a light sensor for sensing the light projected through the film and for generating pixel data based upon the intensity of the light sensed, the light sensor located at a first light sensor position;

a lens located between the film strip and the light sensor for directing the light projected through the film strip onto the light sensor, the lens located at a first lens position;

a lens drive mechanism for changing the position of the lens to a second lens position;

a light sensor drive mechanism for changing the position of the light sensor to a second light sensor position; and a controller for receiving scanning resolution data and sending control signals to the lens drive mechanism and the light sensor drive mechanism to position the lens and the light sensor in accordance with the scanning resolution data.

21. A scanner as claimed in claim 20 wherein the common guide track includes a left guide for guiding a first edge of the film, a right guide for guiding a second edge of the film, and distance adjusting means for adjusting the distance between the left guide and the right guide.

22. A scanner as claimed in claim 21 wherein the left guide and right guide are continuous and spring loaded to maintain constant pressure on the edges of a film strip regardless of the thickness of the film strip.

23. A scanner as claimed in claim 21 wherein each inlet track includes a film entry sensor that output signals indicating whether film is present in that inlet track, and wherein the distance adjusting means moves the right guide and the left guide in accordance with the signals output by the film entry sensors, thereby changing the distance between the left guide and the right guide to accommodate the film detected by the film entry sensor.

24. A scanner as claimed in claim 21 wherein the scanner includes a film exit sensor located adjacent to the outlet of the scanner, the film exit sensor outputs signals indicating whether film is in the outlet of the scanner, and wherein the distance between the left guide and the right guide cannot be adjusted when the film exit sensor indicates that film is in the scanner.

25. A scanner as claimed in claim 20 further comprising a code sensor having a light emitter, a fiber optic cable and a light detector, wherein the light emitter projects light through an edge of a film strip where coded data is located, the light projected through the film strip is guided to the light detector with the fiber optic cable, and the light detector generates signals that are representative of the coded data on the film strip.

26. A scanner as claimed in claim 25 further comprising conversion means for converting the signals generated by the light detector into binary values, the conversion means comparing the signals generated by the light detector to a first threshold value to obtain the binary values.

27. A scanner as claimed in claim 26 wherein the conversion means automatically adjusts the threshold value.

28. A scanner as claimed in claim 20 wherein the film drive mechanism further comprises means for reversing the direction of advancement of the film strip so that selected images can be rescanned.

29. A scanner as claimed in claim 20 further comprising a light filter located between the light source and the light sensor, wherein the light filter reduces the intensity of light projected on the light sensor, and means for automatically moving the light filter away from the path of light projected on the light sensor when the scanning resolution reaches a predetermined threshold.

30. A scanner as claimed in claim 20 further comprising first and second position sensors, wherein the first position sensor detects when the lens reaches a first predetermined position, and the second position sensor detects when the light sensor reaches a second predetermined position.

31. A scanner as claimed in claim 20 wherein the light source includes a cylindrical flourescent bulb having a reflective coating over substantially the entire surface of the bulb except for an aperture portion facing the light sensor.

32. The scanner of claim 31 further comprising a clamp attached to the cylindrical flourescent bulb to maintain the bulb in place and to ensure that the aperture portion continuously faces the light sensor.

33. A scanner as claimed in claim 20 further comprising an anti-static electricity mechanism having a multiplicity of brush bristles electrically connected to ground, wherein static electricity is removed from a film strip prior to scanning by rubbing the film strip against the brush bristles.

34. A scanner as claimed in claim 20 further comprising a detachable basket for catching small film strips and keeping the film strips in the same order as they were scanned.

35. A scanner as claimed in claim 20 further comprising adjustable intensity means for changing the intensity of light generated by the light source.

36. A scanner as claimed in claim 35 wherein the adjustable intensity means automatically changes the intensity of light generated by the light source when the adjustable resolution means changes the scanning resolution.

37. A scanner as claimed in claim 20 further comprising means for blocking the light projected through the outer edges of a film strip where the film strip has perforations or sprocket holes, so that substantially the only light reaching the light sensor is the light projected through the portion of the film strip containing photographic images.

38. A scanner as claimed in claim 20 further comprising means for bending the film strip longitudinally as it passes between the light source and the light sensor.

39. A scanner as claimed in claim 20 further comprising:
means for locating images of coded data in the generated pixel data; and
means for identifying the located images of coded data by comparing the located images of coded data to stored image data.

40. A method of scanning a photographic film and creating pixel data that is representative of the photographic film, the method comprising:
advancing the film between a light source and a light sensor, the light sensor located at a first light sensor position;
projecting light through the film with the light source;
directing the light projected through the film onto the light sensor with a lens, the lens located at a first lens position;
receiving scanning resolution data;
changing the position of the lens to a second lens position and changing the position of the light sensor to a second light sensor position, the change in positions made in accordance with the received scanning resolution data;
sensing the light projected through the film with the light sensor; and
generating pixel data based upon the light sensed by the light sensor, wherein the pixel data is representative of the film.

41. A method of automatically adjusting the focus of a film scanner prior to scanning a film strip, the method comprising:
inserting a calibration film strip into the scanner, the calibration film strip having a plurality of dark lines extending longitudinally along the length of the film strip;
projecting light through the calibration film strip with a light source;
generating pixel data representative of the light projected through the calibration film strip with a light sensor;
advancing the calibration film strip between the light source and the light sensor;
directing the light projected through the calibration film strip onto the light sensor with a lens, the lens located at a first lens position;
calculating the contrast between a dark line on the film strip and the space adjacent to the dark line from the generated pixel data; and
changing the position of the lens and recalculating the contrast between the dark line and the space adjacent to the dark line.

* * * * *